US009860571B2

(12) United States Patent
Kwak et al.

(10) Patent No.: US 9,860,571 B2
(45) Date of Patent: Jan. 2, 2018

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Minsung Kwak, Seoul (KR); Kyoungsoo Moon, Seoul (KR); Jangwon Lee, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 14/909,882

(22) PCT Filed: Dec. 1, 2015

(86) PCT No.: PCT/KR2015/012976
§ 371 (c)(1),
(2) Date: Feb. 3, 2016

(87) PCT Pub. No.: WO2016/093537
PCT Pub. Date: Jun. 16, 2016

(65) Prior Publication Data
US 2016/0345033 A1  Nov. 24, 2016

Related U.S. Application Data

(60) Provisional application No. 62/090,351, filed on Dec. 10, 2014.

(51) Int. Cl.
*H04N 5/445* (2011.01)
*H04N 21/2343* (2011.01)
(Continued)

(52) U.S. Cl.
CPC ........ *H04N 21/2343* (2013.01); *H04H 20/28* (2013.01); *H04H 20/93* (2013.01);
(Continued)

(58) Field of Classification Search
USPC .......................................... 725/54
See application file for complete search history.

(56) References Cited

U.S. PATENT DOCUMENTS 8,613,016 B2  12/2013  Kim et al.
2010/0290459 A1  11/2010  Lee et al.
(Continued)

FOREIGN PATENT DOCUMENTS

KR  10-2011-0083722 A  7/2011
KR  10-2012-0088810 A  8/2012
(Continued)

*Primary Examiner* — James R Sheleheda
(74) *Attorney, Agent, or Firm* — Birch, Stewart, Kolasch & Birch, LLP

(57) ABSTRACT

The present invention provides a method for transmitting a broadcast signal. The method for transmitting a broadcast signal according to the present invention supports future broadcast services in an environment supporting future hybrid broadcasting using terrestrial broadcast networks and the Internet. In addition, the present invention provides efficient signaling methods capable of using both terrestrial broadcast networks and the Internet in the environment supporting future hybrid broadcasting.

12 Claims, 74 Drawing Sheets

(51) Int. Cl.

| | | |
|---|---|---|
| *H04N 21/61* | (2011.01) | |
| *H04N 21/84* | (2011.01) | |
| *H04N 21/2362* | (2011.01) | |
| *H04N 21/6338* | (2011.01) | |
| *H04N 21/6408* | (2011.01) | |
| *H04N 21/6437* | (2011.01) | |
| *H04H 20/28* | (2008.01) | |
| *H04H 20/93* | (2008.01) | |

(52) U.S. Cl.
CPC ..... *H04N 21/2362* (2013.01); *H04N 21/6106* (2013.01); *H04N 21/6112* (2013.01); *H04N 21/6125* (2013.01); *H04N 21/6162* (2013.01); *H04N 21/6175* (2013.01); *H04N 21/6338* (2013.01); *H04N 21/6408* (2013.01); *H04N 21/6437* (2013.01); *H04N 21/84* (2013.01)

(56) References Cited

U.S. PATENT DOCUMENTS

| | | | |
|---|---|---|---|
| 2012/0076127 A1 | 3/2012 | Mourad et al. | |
| 2014/0372624 A1* | 12/2014 | Wang | H04L 65/60 709/231 |
| 2015/0269629 A1* | 9/2015 | Lo | G06Q 30/0269 705/14.66 |
| 2016/0205158 A1* | 7/2016 | Lo | H04L 65/4076 709/219 |
| 2016/0205449 A1* | 7/2016 | Kitazato | H04N 21/8166 725/110 |
| 2016/0234355 A1* | 8/2016 | Lee | H04L 65/80 |
| 2016/0234532 A1* | 8/2016 | Lee | H04N 21/2347 |
| 2016/0241924 A1* | 8/2016 | Kwak | H04N 21/8586 |
| 2016/0248828 A1* | 8/2016 | Kitahara | H04H 60/73 |
| 2016/0330490 A1* | 11/2016 | Kitahara | H04N 21/235 |
| 2016/0345033 A1* | 11/2016 | Kwak | H04N 21/2343 |
| 2016/0353136 A1* | 12/2016 | Lee | H04N 21/43 |
| 2016/0359574 A1* | 12/2016 | Lee | H04H 20/95 |
| 2016/0359744 A1* | 12/2016 | Kwak | H04N 7/08 |
| 2016/0373489 A1* | 12/2016 | Lee | H04L 29/06 |
| 2016/0373807 A1* | 12/2016 | Kwak | H04H 60/72 |
| 2017/0013026 A1* | 1/2017 | Kwak | H04L 29/06 |
| 2017/0034066 A1* | 2/2017 | Kitahara | H04H 20/28 |
| 2017/0048294 A1* | 2/2017 | Kwak | H04N 21/2362 |
| 2017/0180077 A1* | 6/2017 | Kwak | H04L 1/0042 |
| 2017/0195153 A1* | 7/2017 | Kwak | H04L 27/2602 |

FOREIGN PATENT DOCUMENTS

| | | |
|---|---|---|
| KR | 10-2013-0124559 A | 11/2013 |
| WO | WO 2008/108570 A1 | 9/2008 |
| WO | WO 2012/173396 A2 | 12/2012 |
| WO | WO 2013/162305 A1 | 10/2013 |

\* cited by examiner

FIG. 2

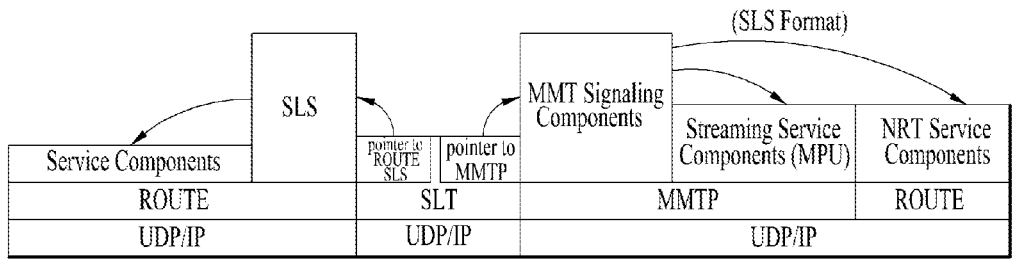

FIG. 3

| Element or Attribute Name | Use |
|---|---|
| SLT | |
|   @bsid | 1 |
|   @sltSectionVersion | 1 |
|   @sltSectionNumber | 0..1 |
|   @totalSltSectionNumbers | 0..1 |
|   @language | 0..1 |
|   @capabilities | 0..1 |
|   InetSigLoc | 0..1 |
|   Service | 1..N |
|     @serviceId | 1 |
|     @SLT serviceSeqNumber | 1 |
|     @protected | 0..1 |
|     @majorChannelNo | 1 |
|     @minorChannelNo | 1 |
|     @serviceCategory | 1 |
|     @shortServiceName | 1 |
|     @hidden | 0..1 |
|     @sls ProtocolType | 1 |
|     BroadcastSignaling | 0..1 |
|     @slsPlpId | 0..1 |
|     @slsDestinationIpAddress | 0..1 |
|     @slsDestinationUdpPort | 0..1 |
|     @slsSourceIpAddress | 0..1 |
|     @slsMajorProtocolVersion | 0..1 |
|     @SlsMinorProtocolVersion | 0..1 |
|     @serviceLanguage | 0..1 |
|     @broadbandAccessRequired | 0..1 |
|     @capabilities | 0..1 |
|     InetSigLoc | 0..1 |

FIG. 5

| Element or Attribute Name | | | | Use |
|---|---|---|---|---|
| bundleDescription | | | | |
| | userServiceDescription | | | |
| | | @serviceId | | M |
| | | @atsc: serviceId | | M |
| | | @atsc: serviceStatus | | OD |
| | | @atsc: fullMPDUri | | M |
| | | @atsc: sTSIDUri | | M |
| | | name | | 0..N |
| | | | lang | CM |
| | | serviceLanguage | | 0...N |
| | | atsc : capabilityCode | | 0...1 |
| | | deliveryMethod | | 1..N |
| | | | r12: broadcastAppService | 1..N |
| | | | basePattern | 1..N |
| | | | r12: unicastAppService | 0..N |
| | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
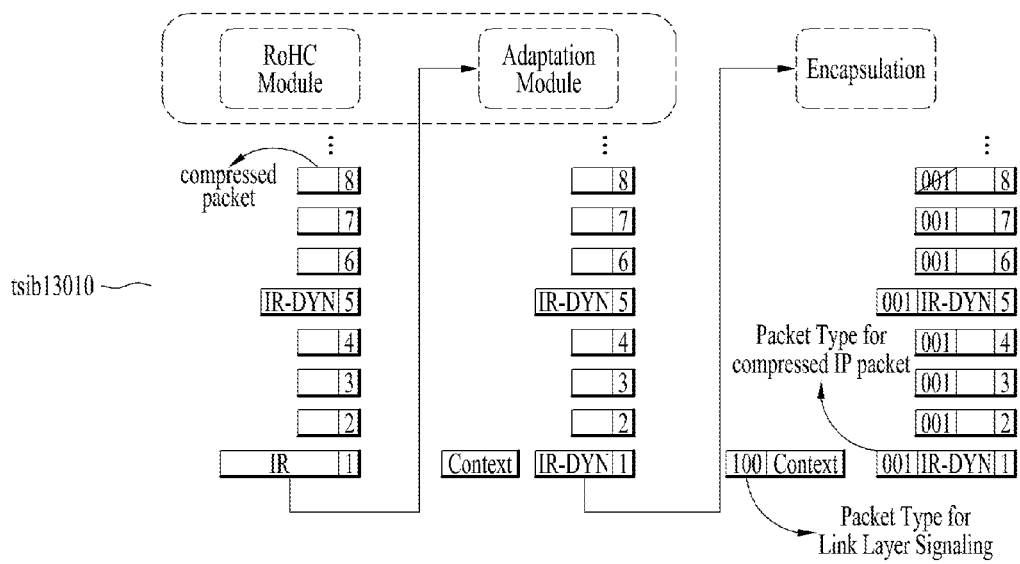
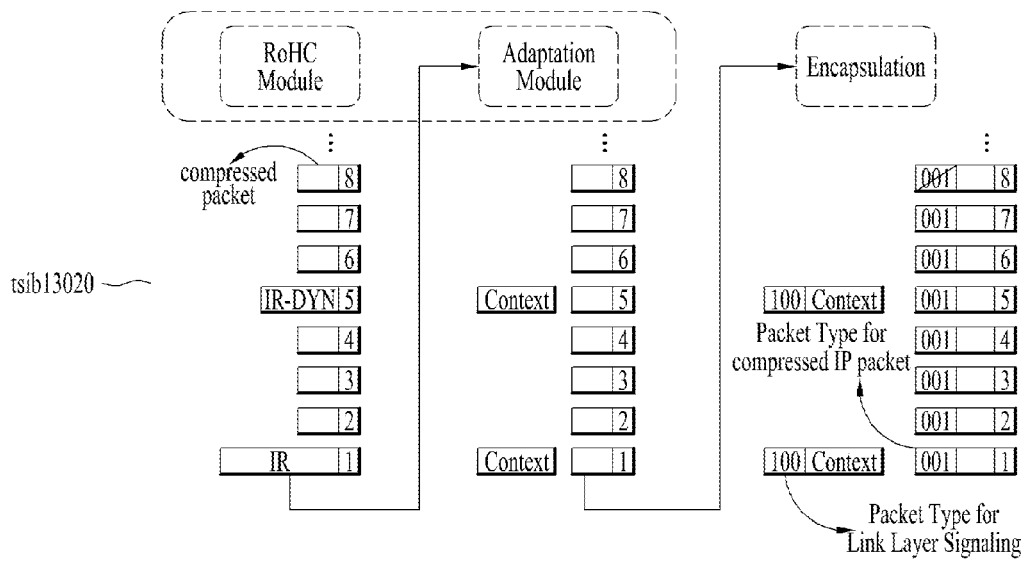

FIG. 14

| Syntax | Number of bits | Mnemonic |
|---|---|---|
| Link_Mapping_Table() { | | |
|   signaling_type | 8 | "0x01" |
|   PLP_ID | 6 | uimsbf |
|   Reserved | 2 | |
|   num_session | 8 | uimsbf |
|   for(i = 0 ; i < num_session ; i++) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '000000' |
|     if(SID_flag == "1") { | | |
|       SID | 8 | uimsbf |
|     } | | |
|     if(compressed_flag == "1") { | | |
|       context_id | 8 | uimsbf |
|     } | | |
|   } | | |
| } | | |

—tsib14010

| Syntax | Number of bits | Mnemonic |
|---|---|---|
| ROHC-U_description_table { | | |
|   signaling_type | 8 | "0x02" |
|   PLP_ID | 6 | uimsbf |
|   adaptation_mode | 2 | uimsbf |
|   context_config | 2 | bslbf |
|   reserved | 6 | bslbf |
|   context_id | 8 | uimsbf |
|   context_profile | 8 | uimsbf |
|   if(context_config = 0x01) { | | |
|     context_length | 8 | uimsbf |
|     static_chain_byte () | var | uimsbf |
|   } | | |
|   else if (context_config = 0X02) { | | |
|     context_length | 8 | uimsbf |
|     dynamic_chain_byte () | var | uimsbf |
|   } | | |
|   else if (context_config = 0x03) { | | |
|     context_length | 8 | uimsbf |
|     static_chain_byte () | var | uimsbf |
|     dynamic_chain_byte () | var | uimsbf |
|   } | | |
| } | | |

—tsib14020

(a)

$S_{demux\_in}(i) = \{b_i(0), b_i(1), b_i(2), ..., b_i(\eta_{MOD}-1)\},$ $S_{demux\_out}(i) = \{c_i(0), c_i(1), c_i(2), ..., c_i(\eta_{MOD}-1)\},$ $c_i(1) = b_i(i \% \eta_{MOD}), c_i(2) = b_i((i+1)\%\eta_{MOD}), ..., c_i(\eta_{MOD}-1) = b_i((i+1)\%\eta_{MOD})$ a) Bit-Interleaving Output b) Bit-Demultiplexer Output (b)

FIG. 24

| Content | Bits |
|---|---|
| PREAMBLE_DATA<br>NUM_FRAME_FRU<br>PAYLOAD_TYPE<br>NUM_FSS<br>SYSTEM_VERSION | 20<br>2<br>3<br>2<br>8 |
| CELL_ID<br>NETWORK_ID<br>SYSTEM_ID | 16<br>16<br>16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE<br>PLS2_MOD<br>PLS2_SIZE_CELL<br>PLS2_STAT_SIZE_BIT<br>PLS2_DYN_SIZE_BIT<br>PLS2_REP_FLAG<br>PLS2_REP_SIZE_CELL<br>PLS2_NEXT_FEC_TYPE<br>PLS2_NEXT_MODE<br>PLS2_NEXT_REP_FLAG<br>PLS2_NEXT_REP_SIZE_CELL<br>PLS2_NEXT_REP_STAT_SIZE_BIT<br>PLS2_NEXT_REP_DYN_SIZE_BIT<br>PLS2_AP_MODE<br>PLS2_AP_SIZE_CELL<br>PLS2_NEXT_AP_MODE<br>PLS2_NEXT_AP_SIZE_CELL | 2<br>3<br>15<br>14<br>14<br>1<br>15<br>2<br>3<br>1<br>15<br>14<br>14<br>2<br>15<br>2<br>15 |
| RESERVED<br>CRC 32 | 32<br>32 |

FIG. 25

| Content | Bits |
|---|---|
| FIC_FLAG | 1 |
| AUX_FLAG | 1 |
| NUM_DP | 6 |
| for i = 1 : NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

| Content | Bit |
|---|---|
| FRAME_INDEX | 5 |
| PLS_CHANGE_COUNTER | 4 |
| FIC_CHANGE_COUNTER | 4 |
| RESERVED | 16 |
| for i = 1: NUM_DP | |
| DP_ID | 6 |
| DP_START | 15 (or13) |
| DP_NUM_BLOCK | 10 |
| end   RESERVED | 8 |
| EAC_FLAG | 1 |
| EAS_WAKE_UP_VERSION_NUM | 8 |
| if EAC_FLAG == 1 | |
| EAC_LENGTH_BYTE | 12 |
| else | |
| EAC_COUNTER | 12 |
| end | |
| for i=1:NUM_AUX | |
| AUX_PRIVATE_DYN | 48 |
| end | |
| CRC 32 | 32 |

FIG. 29
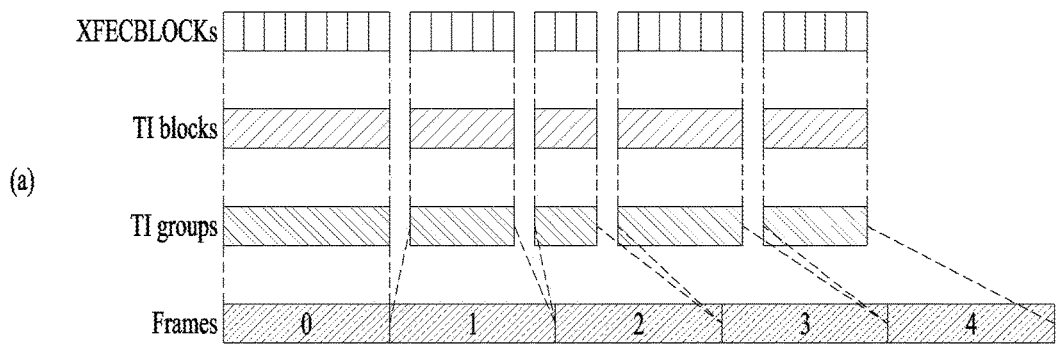
(a)
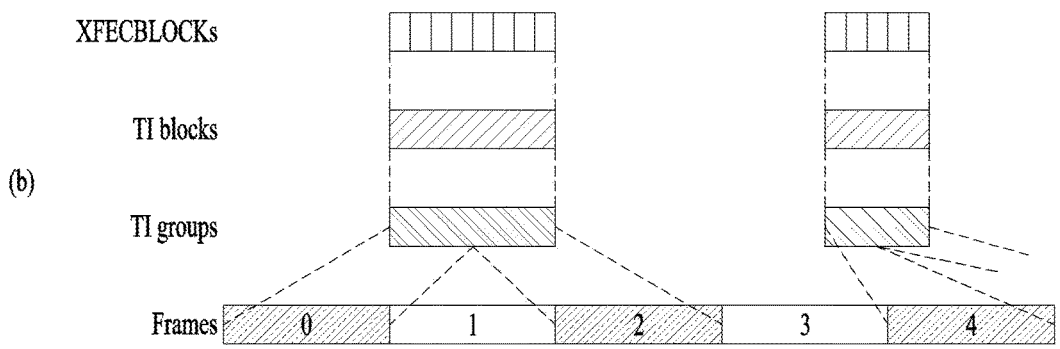
(b)
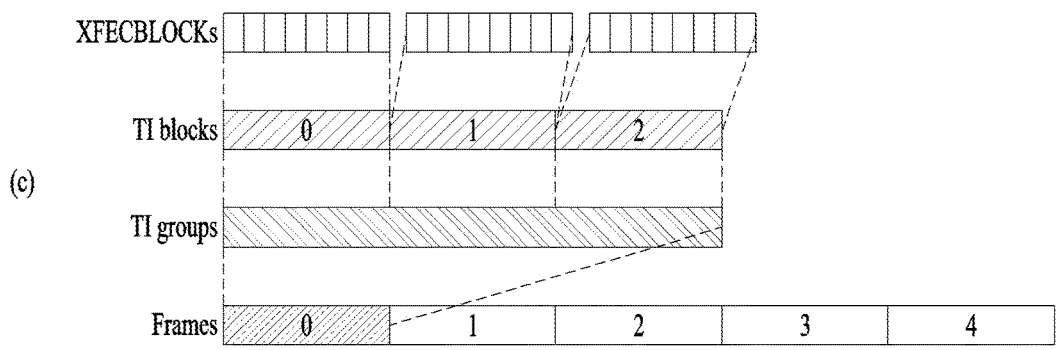
(c)

FIG. 33

The main-PRBS generator is defined based on the $(N_a-1)$-bit binary word sequence $R_n$ with $N_a = \log_2 N_{max}$ $0 \leq n < 2$
$\quad R_n[N_a-2, N_a-3, \ldots, 1, 0] = 0, 0, \ldots, 0, 0$
$n = 2$
$\quad R_n[N_a-2, N_a-3, \ldots, 1, 0] = 0, 0, \ldots, 0, 1$
$2 < n < N_{max}$
$\quad R_n[N_a-3, N_a-4, \ldots, 1, 0] = R_n[N_a-2, N_a-3, \ldots, 2, 1]$
where
$R_n[N_a-2]$ is defined as:

in 8K FFT mode: $R_n[11] = R_{n-1}[0] \oplus R_{n-1}[1] \oplus R_{n-1}[4] \oplus R_{n-1}[6]$
in 16K FFT mode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$
in 32K FFT mode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b = \log_2(0.5 N_{max})$ $0 \leq k < 4$
$\quad G_k[N_b-2, N_b-3, \ldots, 1, 0] = 0, 0, \ldots, 0, 0$
$k = 4$
$\quad G_k[N_b-2, N_b-3, \ldots, 1, 0] = 1, 1, \ldots, 1, 1$
$4 < k < N_{max}$
$\quad G_k[N_b-3, N_b-4, \ldots, 1, 0] = G_k[N_b-2, N_b-3, \ldots, 2, 1]$ where
$\quad G_k[N_b-2]$ is defined as:

in 8K FFT mode: $G_k[10] = G_{k-1}[0] \oplus G_{k-1}[2]$
in 16K FFT mode: $G_k[11] = G_{k-1}[0] \oplus G_{k-1}[1] \oplus G_{k-1}[4] \oplus G_{k-1}[6]$
in 32K FFT mode: $G_k[12] = G_{k-1}[0] \oplus G_{k-1}[1] \oplus G_{k-1}[4] \oplus G_{k-1}[5] \oplus G_{k-1}[9] \oplus G_{k-1}[11]$ (a)

$p = 0;$
$\textit{for } (n = 0; n < N_{max}; n = n+1)$
$\quad \{T(n) = (n \bmod 2) \cdot 2^{N_a - 1} + \sum_{i=0}^{N_a - 2} (2^i \, ?R_n[i]);$
$\quad S_l(n) = (T(n) + A_{\lfloor l/2 \rfloor}) \bmod N_{max};$
$\quad \textit{if } S_l(n) < N_{data}$
$\quad\quad \{H_l(p) = S_l(n);$
$\quad\quad p = p+1; \}$
$\}$ $(n \bmod 2) \cdot 2^{N_a - 1}$ denotes 1-bit toggling, i.e., $R_n[N_a - 1] = 0, 1, 0, 1, \ldots$ and
the cyclic-shifting value $A_{\lfloor l/2 \rfloor}$ is calculated for every OFDM symbol pair (b)

FIG. 35

FIG. 36
| PLP_NUM | 1 | >1 |
|---|---|---|
| Interleaving type | CI | CI+BI |
FIG. 37
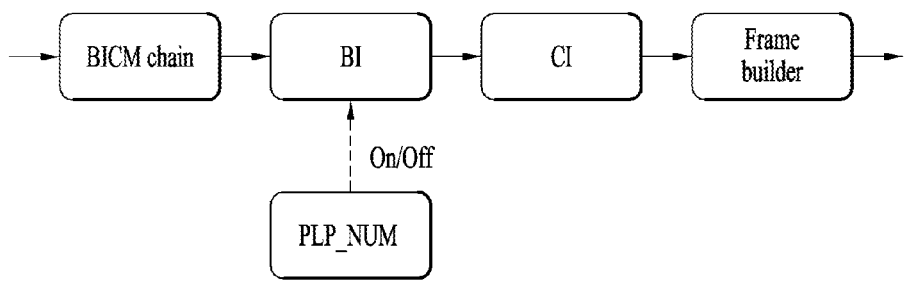
<Hybrid TI structure: example-1>
FIG. 38
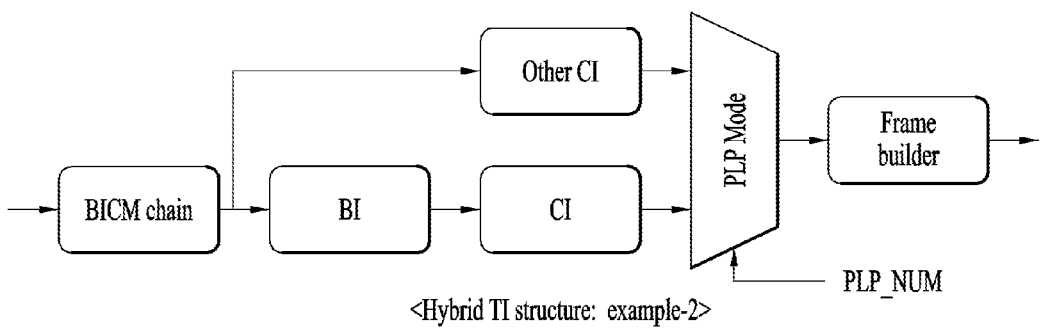
<Hybrid TI structure: example-2>

<Hybrid TI structure: example-1>

<Hybrid TI structure: example-2>

FIG. 42
(a)
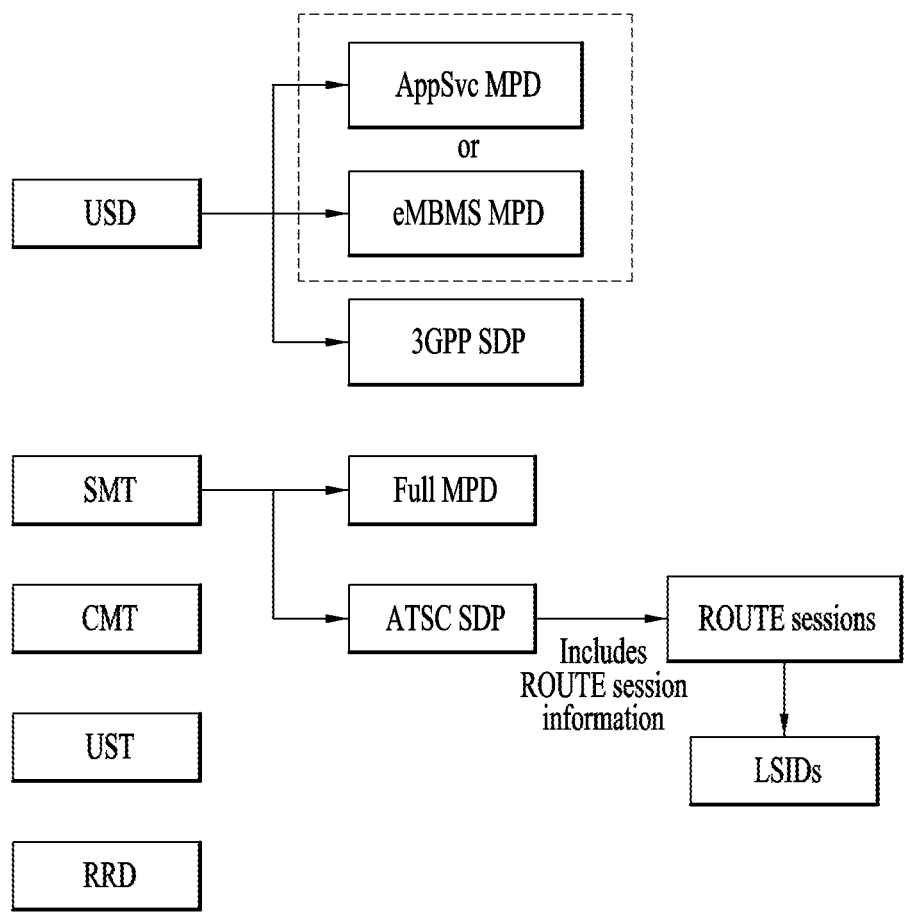
(b)

FIG. 43
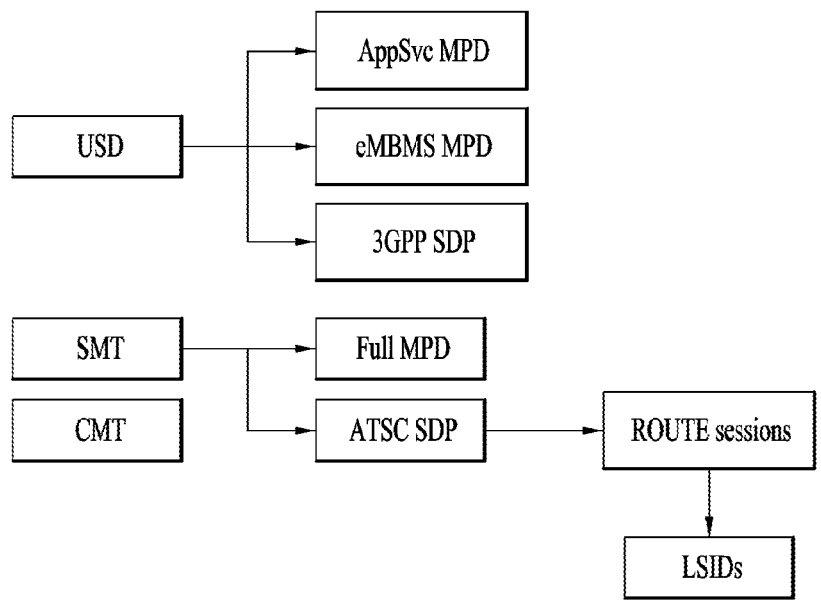
(a)
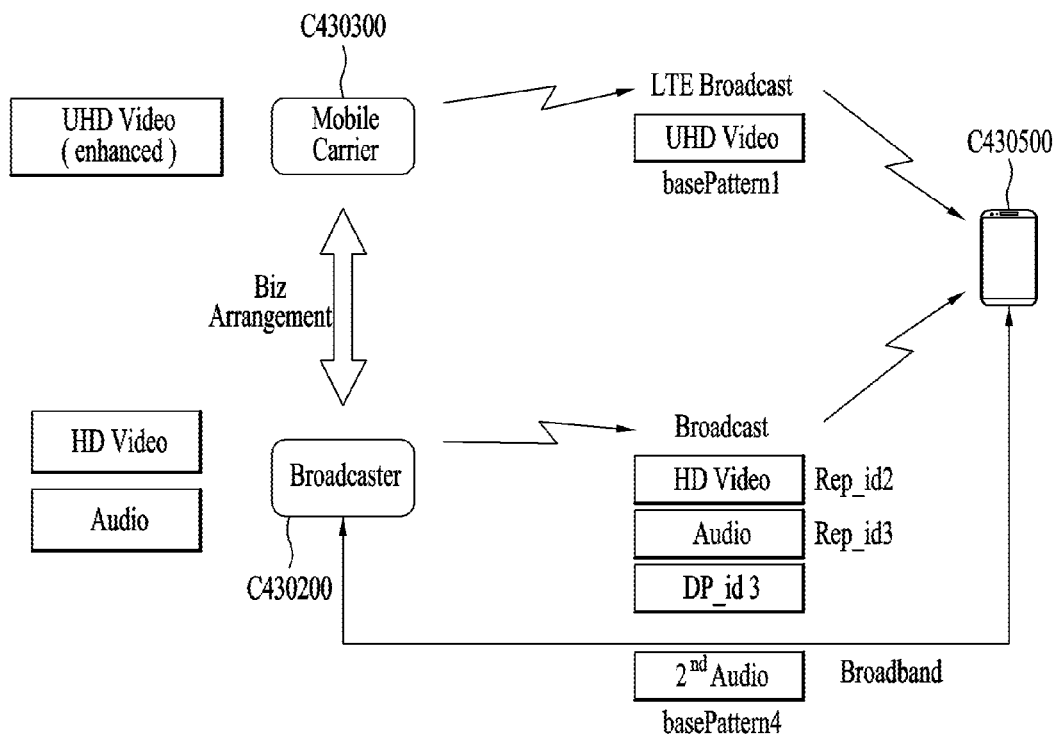
(b)

FIG. 44

| Element / Attribute | Card. | Datatype | Comments |
|---|---|---|---|
| SMT | | | |
|   protocol_version | 0..1 | 16-bit interger | Major-minor |
|   service_id | 1 | 16-bit interger | FIC service_id |
|   global_service_id | 1 | anyURI | USD/ESG service_id |
|   Full_MPD_URL | 0..1 | anyURI | All components of Service |
|   ATSC_SDP_URL | 0..N | anyURI | ROUTE sessions(s) |
|   Capabilities | 0..1 | TBD | |
|   Targeting_info | 0..1 | TBD | |
|   Content_advisory | 0..1 | TBD | |
|   Program_title | 0..1 | String | |
|   Content_label | 0..1 | TBD | |
|   Original service id | 0..1 | 16-bit interger | ??? |

FIG. 45
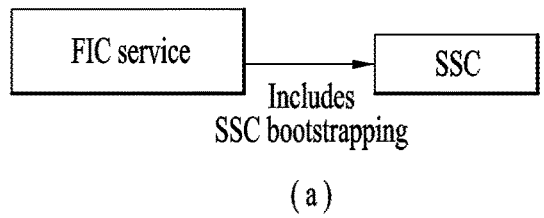
(a)
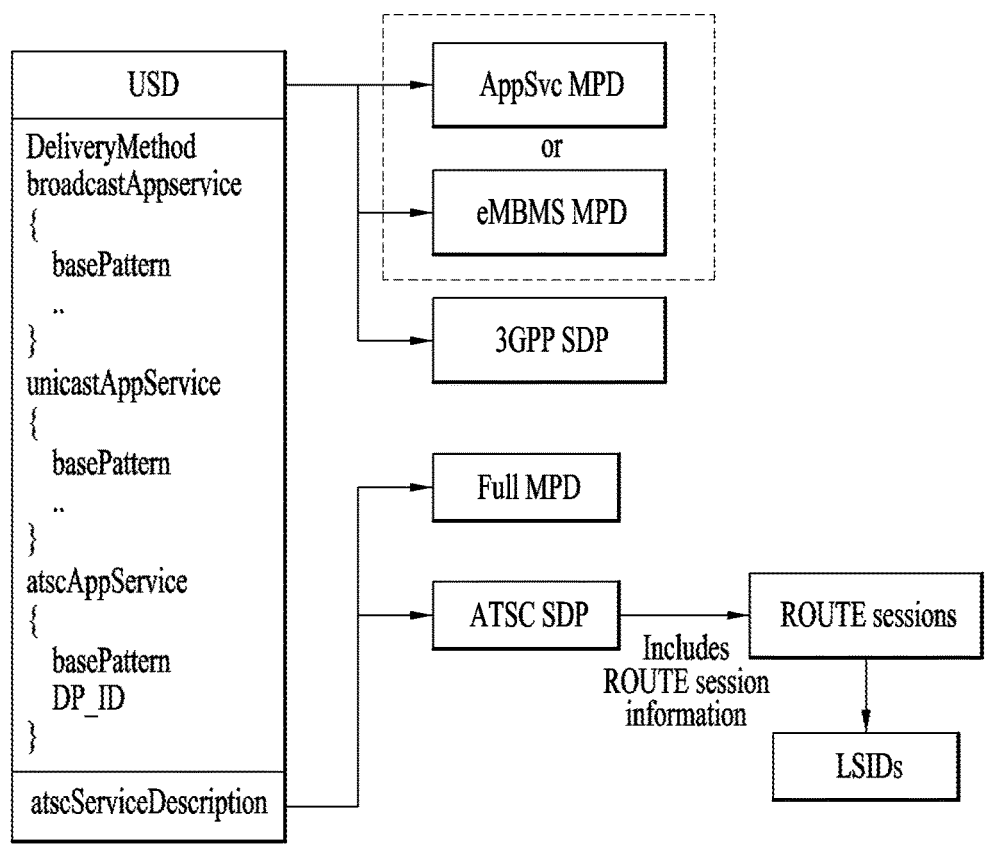
(b)

FIG. 46

| | element / attribute | type | minOccurs | maxOccurs | |
|---|---|---|---|---|---|
| e | bundleDescription | | | | |
| e | userServiceDescription | | x | unbounded | |
| e | atscServiceDescription | | | | ⎫ |
| @ | protocolVersion | | optional | | |
| @ | atscServiceId | | required | | |
| @ | globalServiceId | same as ServiceId of the USD | optional | | |
| @ | fullMpdURI | xs:anyURI | optional | | |
| e | atscSdpURI | xs:anyURI | 0 | N | |
| e | CapabilityDescription | TBD | 0 | 1 | C460100 |
| e | TargetingDescription | TBD | 0 | 1 | |
| e | ContentAdvisoryDescription | TBD | 0 | 1 | |
| e | ProgramTitleDescription | xs:string | 0 | 1 | |
| e | ContentLabelDescription | TBD | 0 | 1 | |
| e | OrigianlServiceId | | 0 | 1 | ⎭ |
| e | name | xs:string | 0 | unbounded | |
| @ | lang | xs:langauge | optional | | |
| e | serviceLanguage | xs:langauge | 0 | unbounded | |
| e | requiredCapabilities | | 0 | 1 | |
| e | feature | xs:unsignedInt | 1 | unbounded | |
| e | deliveryMethod | | x | unbounded | |
| e | r7:unicastAccessURI | | 0 | unbounded | |
| e | basePattern | xs:anyURI | x | unbounded | |
| e | r8:alternativeAccessDelivery | | 0 | x | |
| e | unicastAccessURI | xs:anyURI | 0 | unbounded | |
| a | timeShiftingBuffer | xs:unsignedInt | optional | default = 0 | |
| e | r12:broadcastAppService | | 0 | unbounded | |
| e | basePattern | xs:anyURI | x | unbounded | |
| e | serviceArea | xs:unsignedShort | 0 | unbounded | |
| e | r12:unicastAppService | | 0 | unbounded | |
| e | basePattern | xs:anyURI | x | unbounded | |
| e | atscAppService | | 0 | unbounded | ⎫ |
| @ | basePattern | xs:anyURI | optional | | |
| @ | DP_ID | xs:unsignedShort | required | | |
| @ | transportStreamId | xs:unsignedShort | optional | | C460200 |
| @ | partitionId | xs:unsignedShort | optional | | |
| @ | sourceIPaddress | IP address ( v4 or v6 ) | optional | | |
| @ | destinationIPaddress | IP address ( v4 or v6 ) | optional | | |
| @ | destinationPort | xs:unsignedShort | optional | | ⎭ |
| e | r9:mediaPresentationDescription | | 0 | x | |
| e | mpdURI | xs:anyURI | | | |
| e | r12:appService | | 0 | x | |
| e | identicalContent | | 0 | unbounded | |
| e | basePattern | xs:anyURI | 2 | unbounded | |
| e | alternativeContent | | | | |
| e | basePattern | xs:anyURI | 0 | unbounded | |
| @ | appServiceDescriptionURI | xs:anyURI | required | | |
| @ | mimeType | xs:string | required | | |
| @ | serviceId | xs:anyURI | required | | |
| @ | r7:serviceClass | xs:string | x | | |
| e | r7:initiationRandomization | | 0 | x | |
| @ | initiationStartTime | xs:unsignedInt | optional | | |
| @ | protectionPeriod | xs:unsignedInt | required | | |
| @ | randomTimePeriod | xs:unsignedInt | required | | |
| e | r7:terminationRandomization | | 0 | x | |
| @ | protectionPeriod | xs:unsignedInt | required | | |
| @ | randomTimePeriod | xs:unsignedInt | required | | |
| @ | fecDescriptionURI | xs:anyURI | optional | | |

FIG. 47
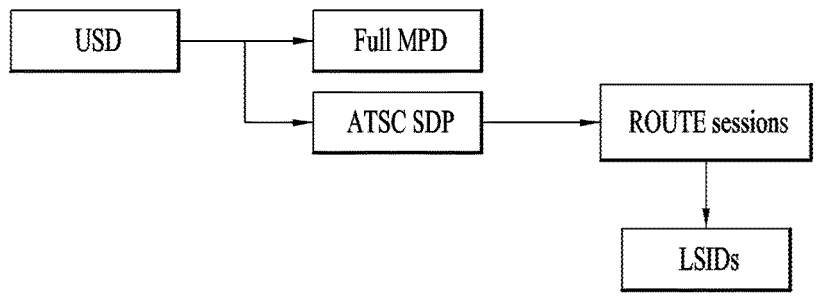
(a)
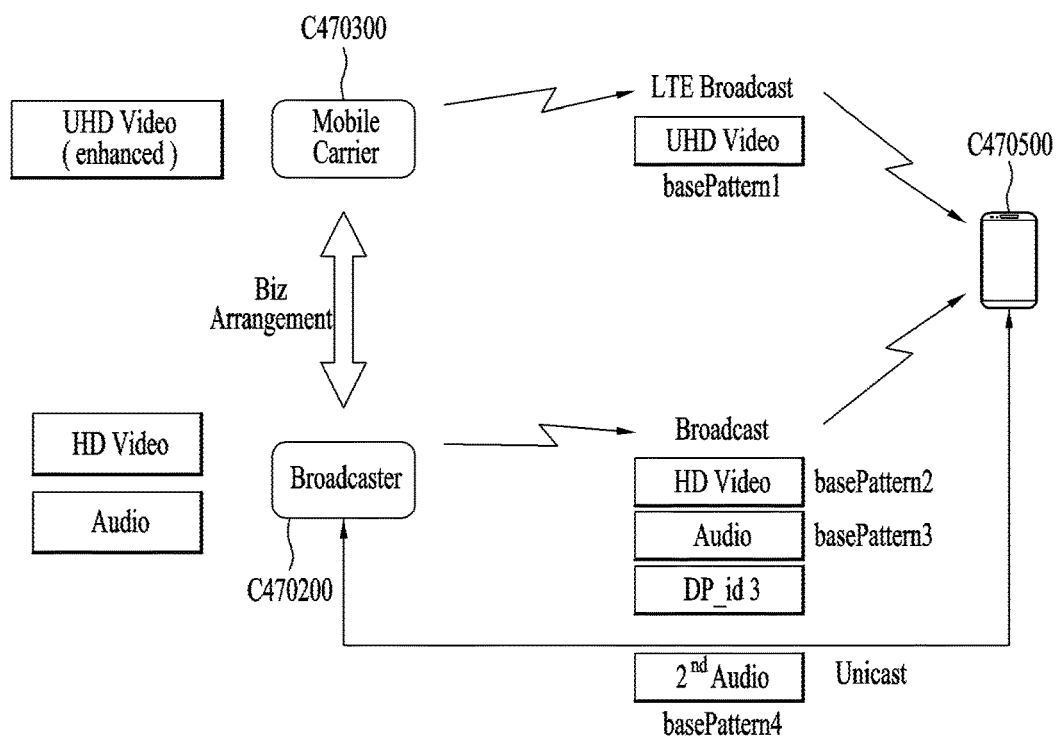
(b)

FIG. 48
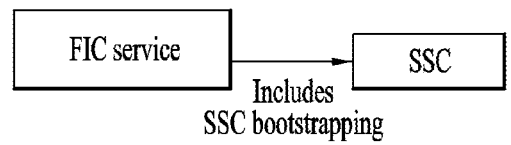
(a)
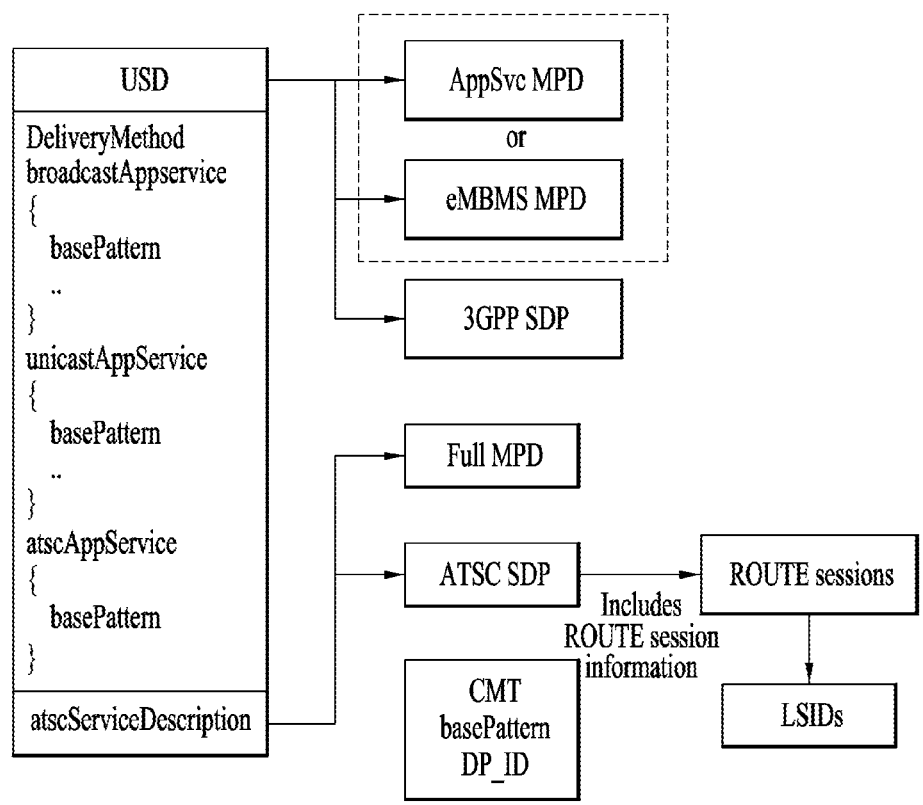
(b)

FIG. 49

| element / attribute | | | | type | minOccurs | maxOccurs | |
|---|---|---|---|---|---|---|---|
| e | bundleDescription | | | | | | |
| | e | userServiceDescription | | | x | unbounded | |
| | | e | atscServiceDescription | | | | ⎫ |
| | | | @ protocolVersion | | optional | | |
| | | | @ atscServiceId | | required | | |
| | | | @ globalServiceId | same as ServiceId of the USD | optional | | |
| | | | @ fullMpdURI | xs:anyURI | optional | | |
| | | | e atscSdpURI | xs:anyURI | 0 | N | ⎬ C490100 |
| | | | e CapabilityDescription | TBD | 0 | 1 | |
| | | | e TargetingDescription | TBD | 0 | 1 | |
| | | | e ContentAdvisoryDescription | TBD | 0 | 1 | |
| | | | e ProgramTitleDescription | xs:string | 0 | 1 | |
| | | | e ContentLabelDescription | TBD | 0 | 1 | |
| | | | e OriginalServiceId | | 0 | 1 | ⎭ |
| | | e | name | xs:string | 0 | unbounded | |
| | | | @ lang | xs:langauge | optional | | |
| | | e | serviceLanguage | xs:langauge | 0 | unbounded | |
| | | e | requiredCapabilities | | 0 | 1 | |
| | | | e feature | xs:unsignedInt | 1 | unbounded | |
| | | e | deliveryMethod | | x | unbounded | |
| | | | e r7:unicastAccessURI | | 0 | unbounded | |
| | | | e r8:alternativeAccessDelivery | | 0 | x | |
| | | | e r12:broadcastAppService | | 0 | unbounded | |
| | | | e basePattern | xs:anyURI | x | unbounded | |
| | | | e serviceArea | xs:unsignedShort | 0 | unbounded | |
| | | | e r12:unicastAppService | | 0 | unbounded | |
| | | | e basePattern | xs:anyURI | x | unbounded | |
| | | | e atscAppService | | 0 | unbounded | ⎫ |
| | | | @ rep_id | xs:unsignedInt | optional | | |
| | | | @ basePattern | xs:anyURI | optional | | |
| | | | @ transportStreamId | xs:unsignedShort | optional | | ⎬ C490200 |
| | | | @ partitionId | xs:unsignedShort | optional | | |
| | | | @ sourceIPaddress | IP address ( v4 or v6 ) | optional | | |
| | | | @ destinationIPaddress | IP address ( v4 or v6 ) | optional | | |
| | | | @ destinationPort | xs:unsignedShort | optional | | ⎭ |
| | | | @ accessGroupId | xs:nonNegativeInteger | optional | | |
| | | | @ associatedProcedureDescriptionURI | xs:anyURI | optional | | |
| | | | @ protectionDescriptionURI | xs:anyURI | optional | | |
| | | | @ sessionDescriptionURI | xs:anyURI | required | | |
| | | | @ accessPointName | xs:anyURI | optional | | |
| | | e | r12:appService | | 0 | x | |
| | | | e identicalContent | | 0 | unbounded | |
| | | | e basePattern | xs:anyURI | 2 | unbounded | |
| | | | e alternativeContent | | | | |
| | | | e basePattern | xs:anyURI | 0 | unbounded | |
| | | | @ appServiceDescriptionURI | xs:anyURI | required | | |
| | | | @ mimeType | xs:string | required | | |
| | | @ serviceId | | xs:anyURI | required | | |
| | | @ r7:serviceClass | | xs:string | x | | |
| | | e r7:initiationRandomization | | | 0 | x | |
| | | | @ initiationStartTime | xs:unsignedInt | optional | | |
| | | | @ protectionPeriod | xs:unsignedInt | required | | |
| | | | @ randomTimePeriod | xs:unsignedInt | required | | |
| | | e r7:terminationRandomization | | | 0 | x | |
| | | | @ protectionPeriod | xs:unsignedInt | required | | |
| | | | @ randomTimePeriod | xs:unsignedInt | required | | |
| | @ fecDescriptionURI | | | xs:anyURI | optional | | |

FIG. 50
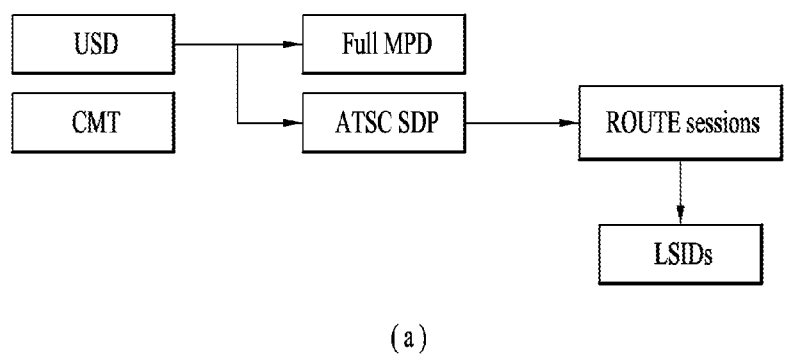
(a)
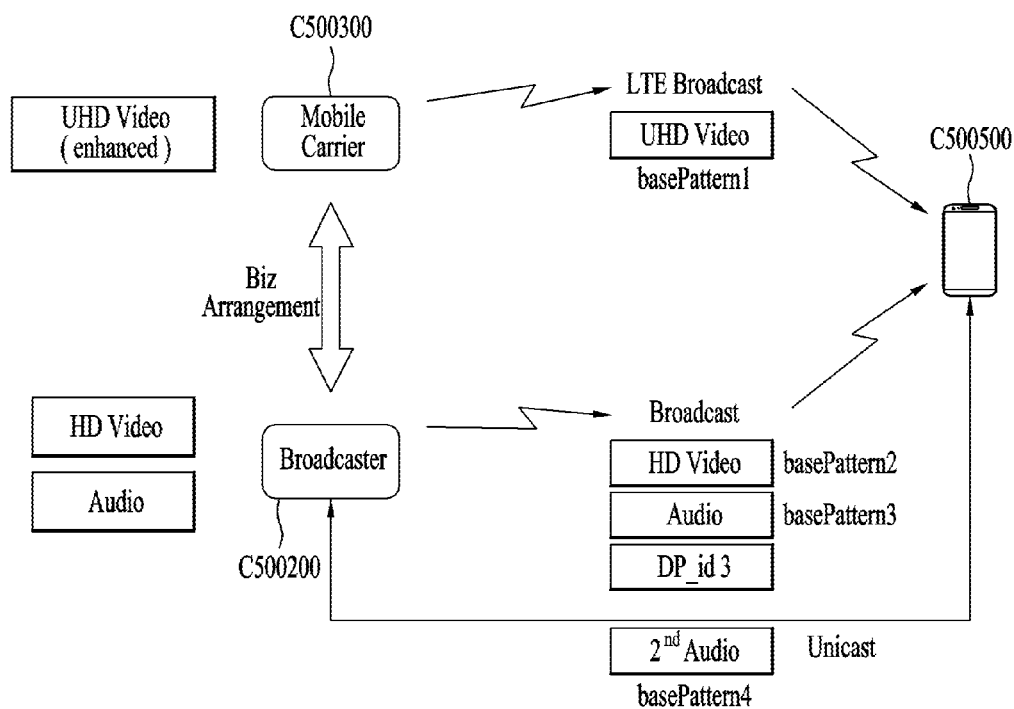
(b)

FIG. 51
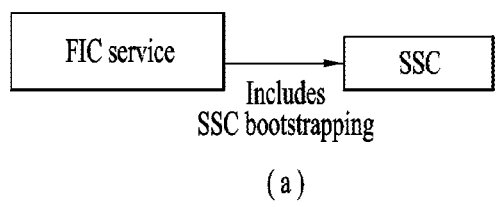
(a)
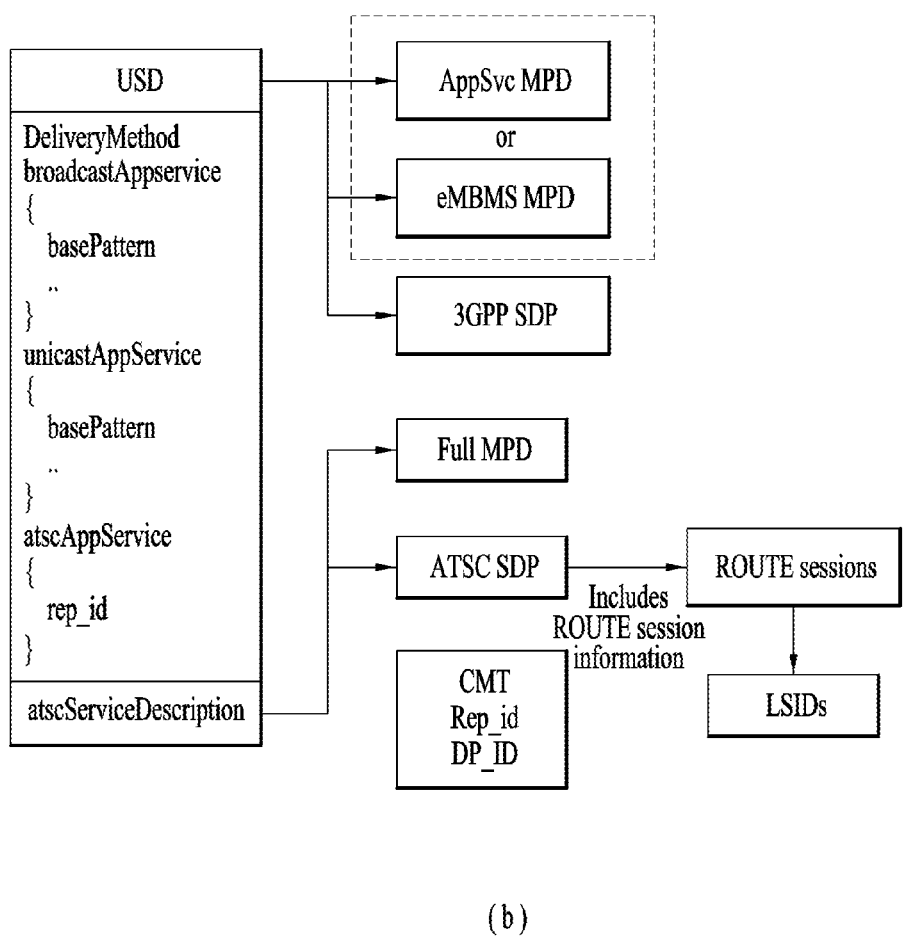
(b)

FIG. 52
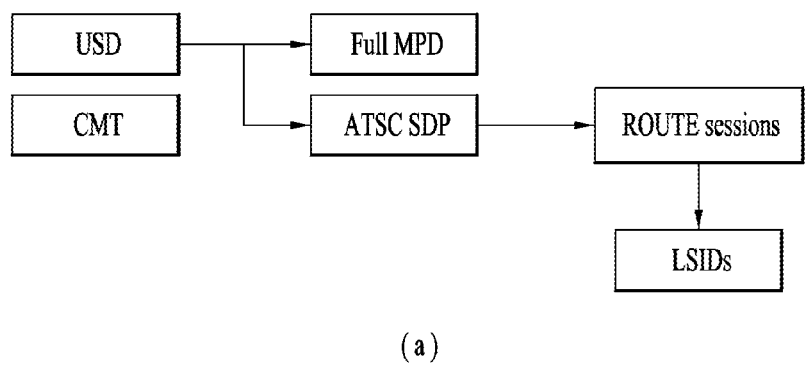
(a)
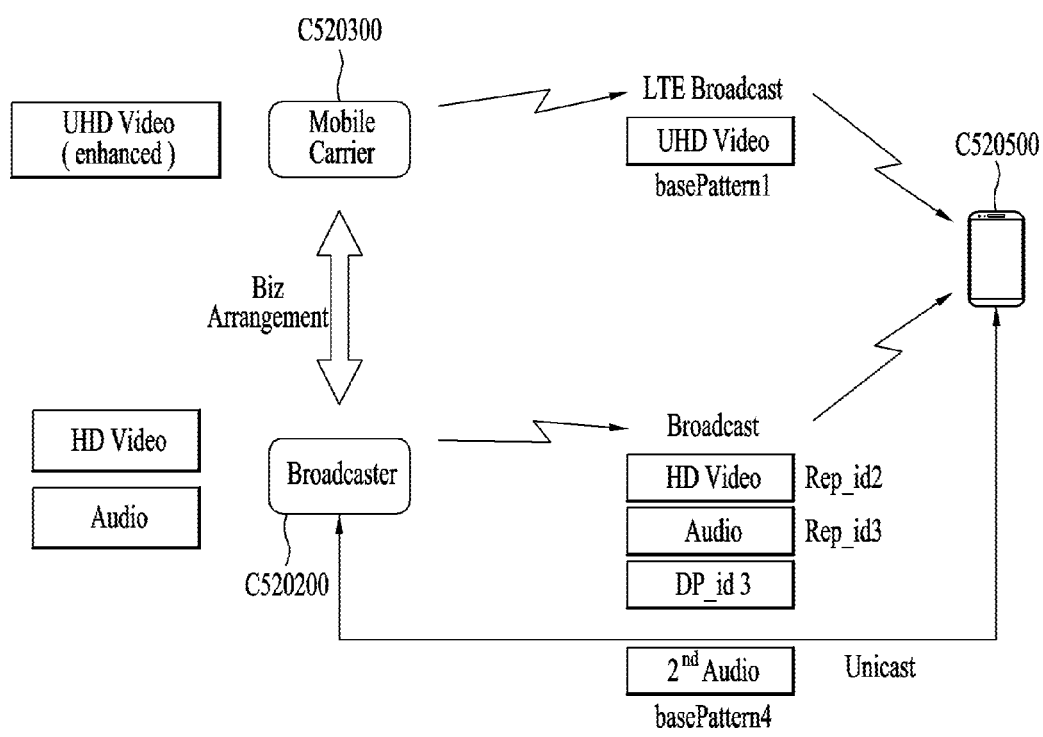
(b)

FIG. 53
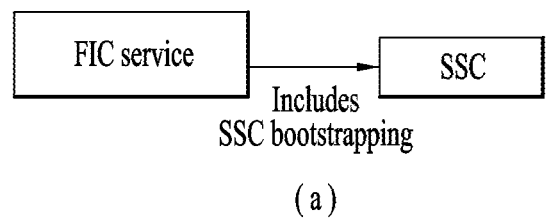
(a)
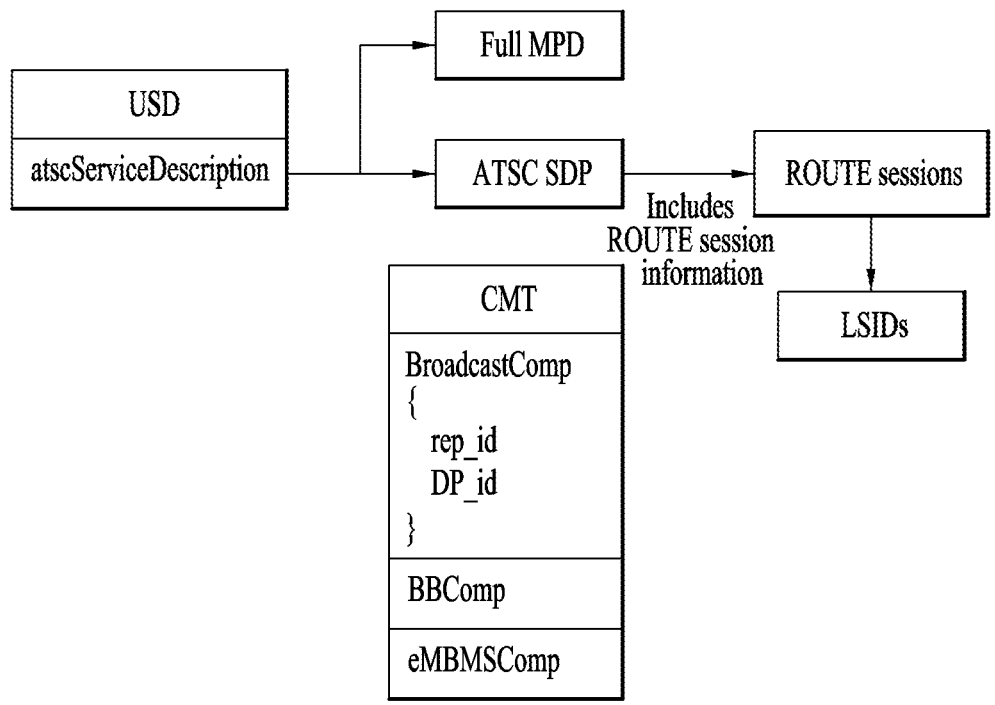
(b)

FIG. 54
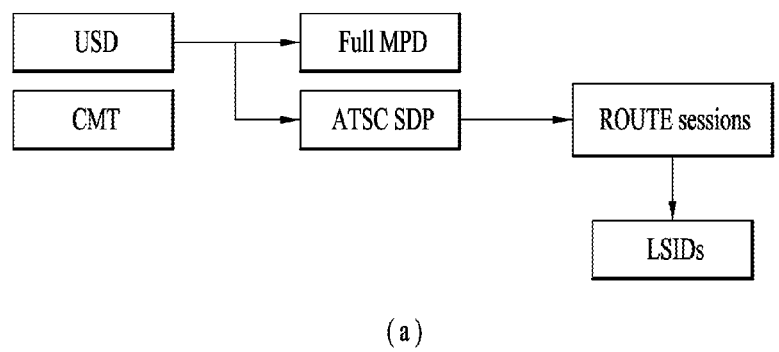
(a)
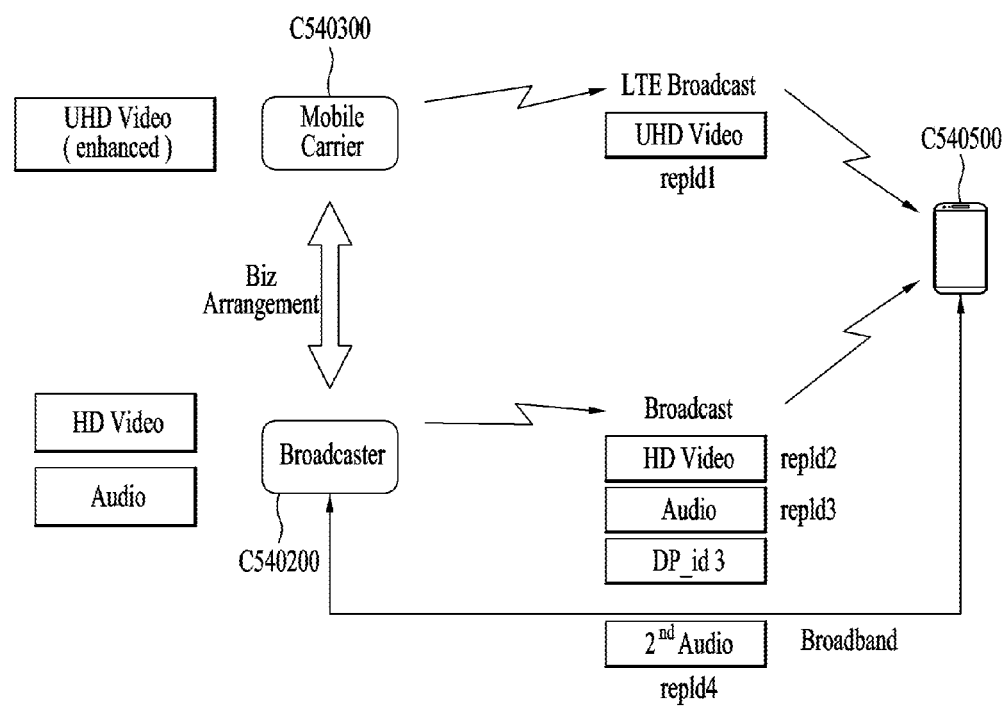
(b)

FIG. 55
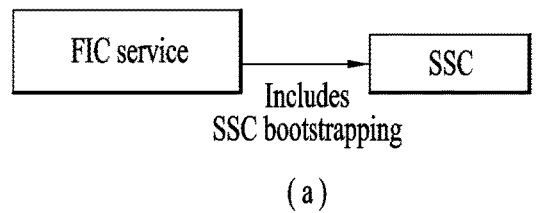
(a)
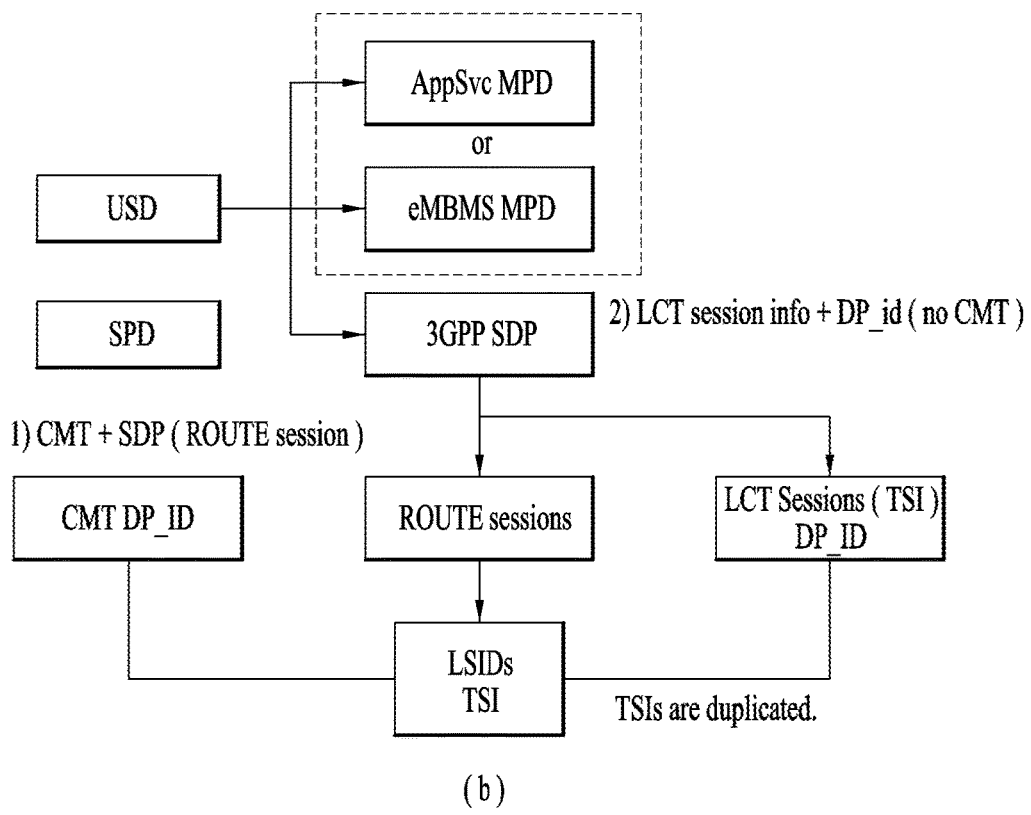
(b)

FIG. 56

| | First embodiment | Second embodiment (USD extension with DP_ID) | Third and fourth embodiments (USD extension DP_ID in CMT) | Fifth embodiment (All in the CMT) | Sixth embodiment |
|---|---|---|---|---|---|
| pros | - Separate signaling for 3GPP and ATSC. <br> - Extensibility | - No CMT <br> - Less complexity than LGE #1 <br> - Separate signaling using USD extension | - No layering violation for USD extension <br> - Separate signaling using USD extension | - Most simple <br> - No layering violation | - SDP extension <br> - Extensibility |
| pros | - Duplication for the broadband component <br> - Complexity | - eMBMS signaling layering violation | - Optional attribute (basePattern) should be used in the CMT. | - Hard to compromise with Sony | - Hard to compromise with LGE <br> - Complexity |

FIG. 60

| element/attribute | | | | | type | minOccurs | maxOccurs | |
|---|---|---|---|---|---|---|---|---|
| e | bundleDescription | | | | | | | |
| | e | userServiceDescription | | | | minOccurs | unbounded | |
| | | e | atscServiceDescription | | | | | |
| | | | @ | protocolVersion | | minOccurs | | |
| | | | @ | atscServiceid | xs:unsignedShort | minOccurs | | |
| | | | @ | globalServiceid | same as ServiceId of the USD | minOccurs | | |
| | | | e | atscSdpURI | xs:anyURI | 0 | N | ~C600100 |
| | | | e | CapabilityDescription | TBD | 0 | 1 | |
| | | | e | TargetingDescription | TBD | 0 | 1 | |
| | | | e | ContentAdvisoryDescription | TBD | 0 | 1 | |
| | | | e | ProgramTitleDescription | xs:string | 0 | 1 | |
| | | e | name | | xs:string | 0 | unbounded | |
| | | | @ | lang | xs:langauge | optional | | |
| | | e | serviceLanguage | | xs:langauge | 0 | unbounded | |
| | | e | requiredCapabillities | | | 0 | unbounded | |
| | | | e | feature | xs:unsignedInt | 1 | unbounded | |
| | | e | deliveryMethod | | | x | unbounded | |
| | | | e | r7:unicastAccessURI | | 0 | x | |
| | | | | e | basePattern | xs:anyURI | x | unbounded |
| | | | e | r8:alternativeAccessDelivery | | 0 | x | |
| | | | | e | unicastAccessDelivery | xs:anyURI | 0 | unbounded |
| | | | | a | timeShiftingBuffer | xs:unsignedInt | optional | default=0 | ~C600200 |
| | | | e | r12:broadcastAppService | | | 0 | unbounded | |
| | | | | e | basePattern | xs:anyURI | 1 | unbounded |
| | | | | a | serviceArea | xs:unsignedShort | 0 | unbounded |
| | | | e | r12:unicastAppService | | | 0 | unbounded | |
| | | | | e | basePattern | xs:anyURI | 1 | unbounded |
| | | | e | atscAppService | | | 0 | unbounded | |
| | | | | e | basePattern | xs:anyURI | 1 | unbounded |
| | | | @ | accessGroupid | xs:nonNegativeInteger | optional | | |
| | | | @ | associatedProcedureDescriptionURI | xs:anyURI | optional | | |
| | | | @ | protectionDescriptionURI | xs:anyURI | optional | | |
| | | | @ | sessionDescriptionURI | xs:anyURI | required | | |
| | | | @ | accessPointName | xs:anyURI | optional | | |
| | | e | appSerivce | | | 0 | x | |
| | | | e | identicalContent | | 0 | unbounded | |
| | | | | e | basePttern | xs:anyURI | 2 | unbounded |
| | | | e | alternativeContent | | 0 | unbounded | |
| | | | | e | basePttern | xs:anyURI | 0 | unbounded | ~C600300 |
| | | | @ | appServiceDescriptionURI | xs:anyURI | required | | |
| | | | @ | mimeType | xs:string | required | | |

FIG. 61

URI(sdpUri)

```
                                              ATSC SDP
v=...,
s=robust-audio,
t=... o=jdoe 2890844526 2890842807 IN IP4 sourceIPaddress
a=source-filter: incl IN IP6 * (sourcdIPaddress)
c=IN IP4 destinationIPaddress
m=APPLICATION destinatinPort ROUTE/UDP 0
a=atsc-mode: transportstream_id, DP_id
a=route-tsi: tsi
```

(a)

| Element or Attribute Name | | | Use |
|---|---|---|---|
| LSID | | | |
| | @version | | O |
| | @validFrom | | O |
| | @expiration | | O |
| | TransportSession | | 1...N |
| | | @tsi | M |
| | | @DP_id | O |
| | | SourceFlow | 0...1 |
| | | RepairFlow | 0...1 |

(b)

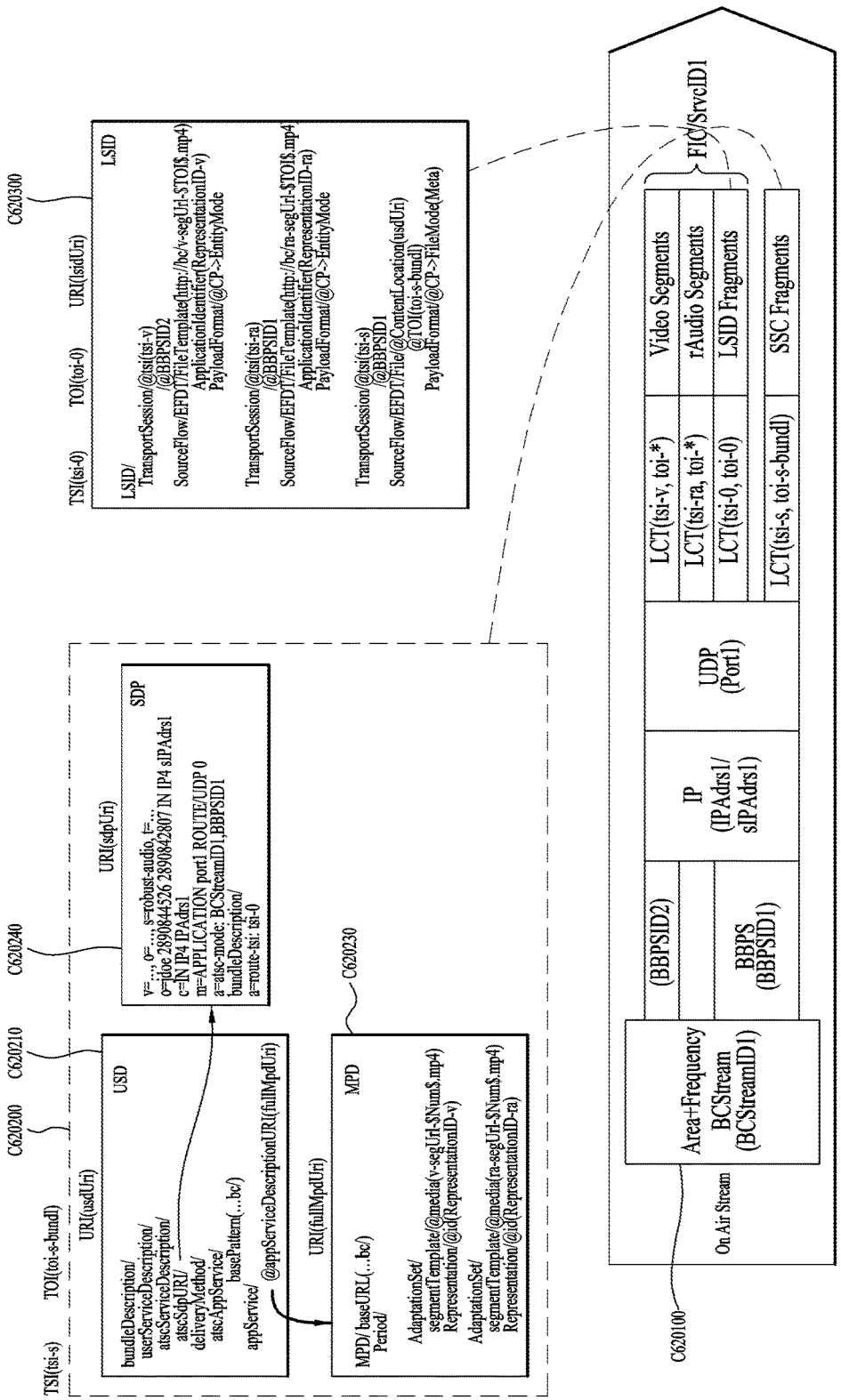

FIG. 63

|  | LSID | SDP | MPD |
|---|---|---|---|
| Session time | O → X | O(mandatory) |  |
| IP/Port | X | O (session level) |  |
| TSI | O | O |  |
| FEC | O | O → X |  |
| Language | X | O → X | O |
| Data Rate | X | O → X | O |

| | | | | | |
|---|---|---|---|---|---|
| e | ATSC USD or SMT | | | | |
| | @ protocolVersion | | | optional | |
| | @ atscServiceId | xs:unsignedShort | | required | |
| | @ globalServiceId | same as Service of the USD | | optional | |
| | @ fullMpdURI | xs:anyUSD | | optional | |
| | e atscSdpURI | xs:anyUSD | | 0 | N |
| | | @ essentialSdp | xs:boolean | optional | default=1 |
| | e CapabillityDescription | xs:string | | 0 | 1 |
| | e TargetingDescription | TBD | | 0 | 1 |
| | e ContentAdvisoryDescription | TBD | | 0 | 1 |
| | e ProgramTitleDescription | | | 0 | 1 |
| | | @ current_program_start_time | A 32-bit unsigned integer quantity that shall be the seconds part of the NTP timestamp corresponding to that shall represent the start time of the current program. This timestamp is computed according to the specification in NTPv4 [21] | optional | |
| | | @ current_program_duration | This field shall give the duration of this program in seconds. | optional | |
| | | e title_text | xs:string | 0 | unbounded |
| | | | e lang | xs:langauge | optional | |
| | e ContentLableDescription | TBD | | 0 | 1 |
| | e OriginalServiceIdDescription | | | 0 | 1 |
| | | @ OriginalServiceId | xs:unsignedShort | | |

(b)
```
capability_string_code = ubyte "=" 1*csc
ubyte                  = 1*3DIGIT
csc= *( csc-char )
csc_char = DIGIT / ALPHA / """ / "(" / ")" / "+" / "_" / "," /
"-" / "." / "/" / ":" / "=" / "?"
```

| ATSC3.0_USD | | | x | unbounded |
|---|---|---|---|---|
| @ protocolVersion | | | optional | |
| @ atscServiceId | xs:unsignedShort | | required | |
| @ globalServiceId | same as ServiceId of the USD | | optional | |
| e atcsSdpUri | | | 0 | N |
| @ version | xs:unsignedInt | | required | |
| @ url | xs:anyURI | | required | |
| e fullMpdUri | | | 1 | 1 |
| @ major_version | xs:unsignedInt | | required | |
| @ minor_version | xs:unsignedInt | | required | |
| @ url | xs:anyURI | | required | |

(a)

m= (media name and transport address)
⟶ m= application (Port) ROUTE/UDP 0
c=* (connection information -- optional if included at session level)
⟶ c= IN (version) (destinationIPaddress)
a=* (zero or more media attribute lines)
⟶ a= source-filter: incl IN (version) (sourceIPaddress)
⟶ a=atsc-mode: (broadcastStreamID, dataPipeID)

| element/attribute | | | | type | minOccurs | maxOccurs |
|---|---|---|---|---|---|---|
| e | atscBD | | | | | |
| | e | atscUSD | | | 1 | unbounded |
| | | @ | protocolVersion | xs:unsignedByte | optional | |
| | | @ | atscServiceID | xs:unsignedShort --link to FIC | optional | |
| | | @ | fullMpdUri | xs:anyURI | optional | |
| | | e | CapabilityDescription | | 0 | unbounded |
| | | | e capability_code | xs:string | 1 | unbounded |
| | | | @ essntial_flag | xs:boolean | required | |
| | | e | TargetingDescription | TBD | 0 | 1 |
| | | e | ContentingDescription | TBD | 0 | 1 |
| | | e | ProgramTitleDescription | xs:string | 0 | 1 |
| | | e | name | xs:string | 0 | unbounded |
| | | | @ lang | xs:language | optional | |
| | | e | serviceLanguage | xs:language | 0 | unbounded |
| | | e | requiredCapabilities | | 0 | 1 |
| | | | e feature | xs:unsignedInt | 1 | unbounded |

(b)

USD
```
<CapabilityDescription>
 <capability_code essential_flag='TRUE'>
  HD(0x0513)
 </capability_code>
 <capability_code essential_flag='FALSE'>
  HDR(0x0516)
 </capability_code>
</CapabilityDescription>
<CapabilityDescription>
 <capability_code essential_flag='TRUE'>
  UHD(0x0514)
 </capability_code>
</CapabilityDescription>
```

FIG. 76

| | | | | | |
|---|---|---|---|---|---|
| e | deliveryMethod | | | | |
| | e | r7:unicastAccessURI | | 1 | unbounded |
| | | e | basePattern | xs:anyURI | 0 | unbounded |
| | e | r8:alternativeAccessDelivery | | x | unbounded |
| | | e | unicastAccessURI | xs:anyURI | 0 | x |
| | | a | timeShiftingBuffer | xs:unsignedInt | optional | default=0 |
| | e | r12:broadcastAppService | | 0 | unbounded |
| | | e | basePattern | xs:anyURI | 1 | unbounded |
| | | e | serviceArea | xs:unsignedShort | 0 | unbounded |
| | e | r12:unicastAppService | | 1 | unbounded |
| | | e | basePattern | xs:anyURI | 0 | unbounded |
| | e | atscBroadcastAppService | | 1 | unbounded |
| | | e | basePattern | xs:anyURI | | |
| | | @ | DP_ID | xs:unsignedByte | required | |
| | | @ | BroadcastStreamID | xs:unsignedShort | optional | |
| | | @ | IPAddr | | | |
| | | @ | UDPPort | xs:unsignedShort | | |
| | | @ | TSI | | | |
| | e | atscSdpURI | xs:anyURI | 0 | unbounded |
| | | @ | LSID_DP_ID | | | |

(a)

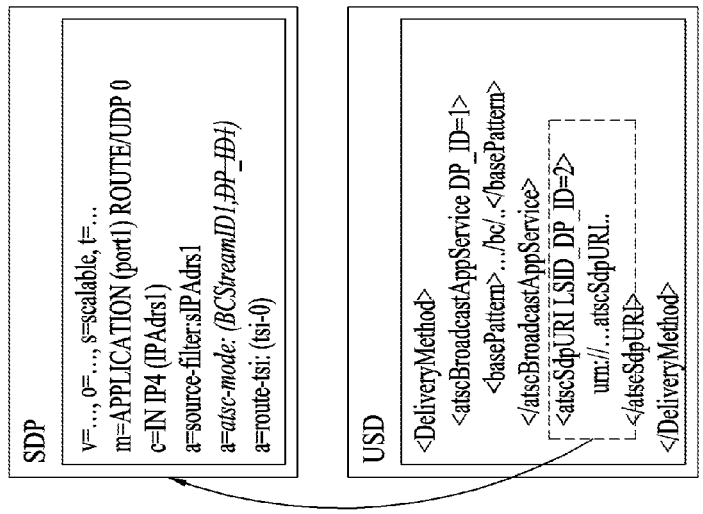

| | | element/attribute | type | minOccurs | maxOccurs |
|---|---|---|---|---|---|
| e | atscBD | | | | |
| | e | atscUSD | | 1 | unbounded |
| | | @ fullMpdUri | xs:anyURI | opticnal | |
| | | e name | xs:string | 0 | unbounded |
| | | @ lang | xs:langauge | opticnal | |
| | | e serviceLanguage | xs:langauge | 0 | unbounded |
| | | e requiredCapabilities | | 0 | 1 |
| | | e feature | xs:unsignedInt | 1 | unbounded |
| | | e deliveryMethod | | 1 | unbounded |
| | | e r7:unicastAccessURI | | 0 | unbounded |
| | | e basePattern | xs:anyURI | x | unbounded |
| | | e r8:alternativeAccessDelivery | | 0 | x |
| | | e unicastAccessURI | xs:anyURI | 0 | unbounded |
| | | a timeShiftingBuffer | xs:unsignedInt | opticnal | default=0 |
| | | e r12:broadcastAppService | | 0 | unbounded |
| | | e basePattern | xs:anyURI | 1 | unbounded |
| | | e serviceArea | xs:unsignedShort | 0 | unbounded |
| | | e r12:unicastAppService | | 0 | unbounded |
| | | e basePattern | xs:anyURI | 1 | unbounded | t80010

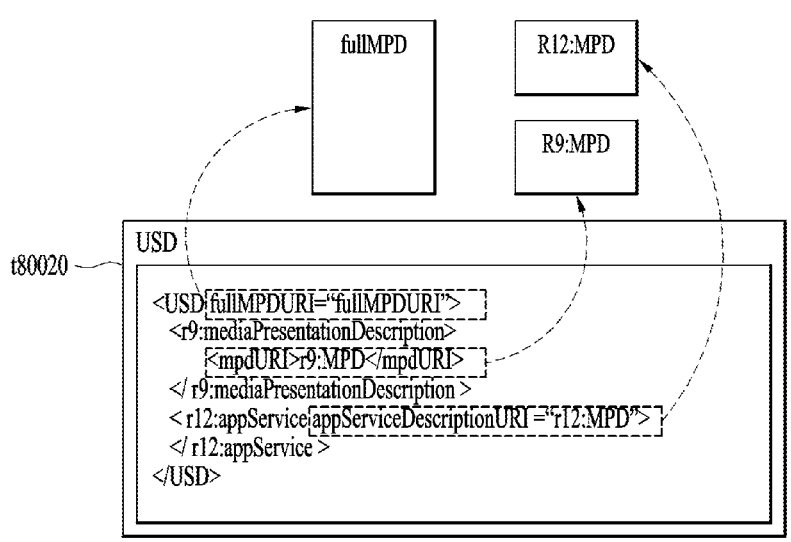

FIG. 81

| | | | element/attribute | type | minOccurs | maxOccurs |
|---|---|---|---|---|---|---|
| e | atscBD | | | | | |
| | e | atscUSD | | | 1 | unbounded |
| | | e | deliveryMethod | | 1 | unbounded |
| | | e | r9:mediaPresentationDescription | | 0 | x |
| | | | e | mpdURI | xs:anyURI | |
| | | e | r9:schedule | | 0 | x |
| | | | e | scheduleDescriptionURI | xs:anyURI | |
| | | e | r9:availabilityInfo | | 0 | x |
| | | | e | infoBinding | | x | unbounded |
| | | | | e | serviceArea | xs:unsignedShort | 0 | unbounded |
| | | | | e | radioFrequency | xs:unsignedInt | x | unbounded |
| | | e | r12:appService | | 0 | x |
| | | | e | identicalContent | | 0 | unbounded |
| | | | | e | basePattern | xs:anyURI | 2 | unbounded |
| | | | e | alternativeContent | | | |
| | | | | e | basePattern | xs:anyURI | 0 | unbounded |
| | | | @ | appServiceDescriptionURI | xs:anyURI | optional | | t81010

ATSC → fullMPD (AnyMpdUri)

```
<MPD
profiles="application/dash+xml;profiles="
urn:mpeg:dash:profile:full:2014,urn:
ATSC3.0:profile:DASH10">
</MPD>
``` eMBMS → R9:MPD (AnyMpdUri)

```
<MPD
profiles="application/dash+xml;profiles="
urn:mpeg:dash:profile:full:2011,urn:
3GPP:PSS:profile:DASH10">
</MPD>
``` t81020 — USD

```
<USD>
    <r9:mediaPresentationDescription>
        <mpdURI>AnyMpdUri</mpdURI>
    </ r9:mediaPresentationDescription >
    < r12:appService appServiceDescriptionURI ="r12:MPD">
    </ r12:appService >
</USD>
```

R12:MPD

FIG. 82

| | | | | element/attribute | type | minOccurs | maxOccurs |
|---|---|---|---|---|---|---|---|
| e | atscBD | | | | | | |
| | e | atscUSD | | | | 1 | unbounded |
| | | e | | deliveryMethod | | 1 | unbounded |
| | | e | | r9:schedule | | 0 | x |
| | | | e | scheduleDescriptionURI | xs:anyURI | | |
| | | e | | r9:availabilityInfo | | 0 | x |
| | | | e | infoBinding | | x | unbounded |
| | | | | e serviceArea | xs:unsignedShort | 0 | unbounded |
| | | | | e radioFrequency | xs:unsignedInt | x | unbounded |
| | | e | | r12:appService | | 0 | x |
| | | | e | identicalContent | | 0 | unbounded |
| | | | | e basePattern | xs:anyURI | 2 | unbounded |
| | | | e | alternativeContent | | | |
| | | | | e basePattern | xs:anyURI | 0 | unbounded |
| | | | @ | appServiceDescriptionURI | xs:anyURI | optional | |
| | | | @ | mimeType | xs:string | required | |
| | | | @ | fullMpdUri | xs:anyURI | optional | |
| | | e | | r12:KeepUpdatedService | | 0 | x |
| | | | e | registrationServer | xs:anyURI | x | unbounded |
| | | @ | | serviceId | xs:anyURI -- link toESG | required | |
| | | @ | | r7:serviceClass | xs:anyURI | x | | t82010

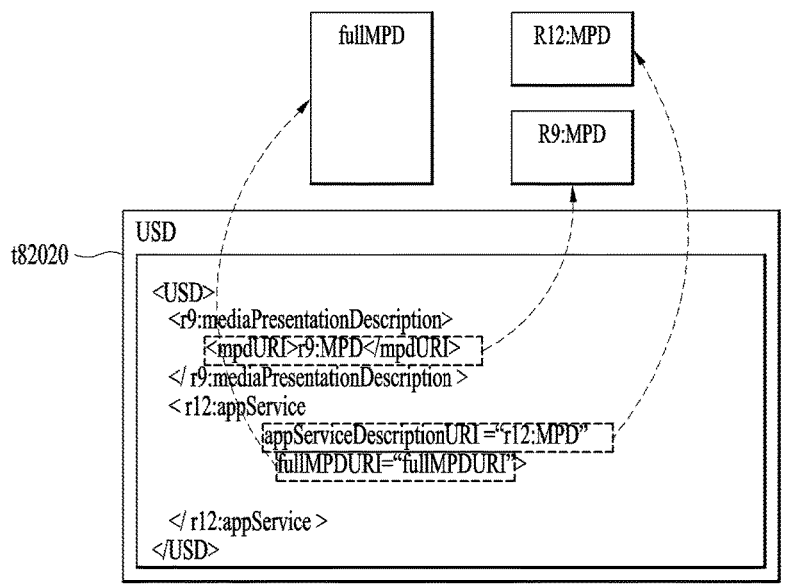

| | | element/attribute | type | minOccurs | maxOccurs |
|---|---|---|---|---|---|
| e | atscBD | | | | |
| | e | atscUSD | | 1 | unbounded |
| | | e | deliveryMethod | | 1 | unbounded |
| | | e | r9:schedule | | 0 | x |
| | | | e | scheduleDescriptionURI | xs:anyURI | | |
| | | e | r9:availabilityInfo | | 0 | x |
| | | | e | infoBinding | | x | unbounded |
| | | | | e | serviceArea | xs:unsignedShort | 0 | unbounded |
| | | | | e | radioFrequency | xs:unsignedInt | x | unbounded |
| | | e | r12:appService | | 0 | x |
| | | | e | identicalContent | | 0 | unbounded |
| | | | | e | basePattern | xs:anyURI | 2 | unbounded |
| | | | e | alternativeContent | | | |
| | | | | e | basePattern | xs:anyURI | 0 | unbounded |
| | | | @ | appServiceDescriptionURI | xs:anyURI | opticnal | |
| | | | @ | mimeType | xs:string | required | |
| | | e | atsc:appService | | 0 | x |
| | | | e | identicalContent | | 0 | unbounded |
| | | | | e | basePattern | xs:anyURI | 2 | unbounded |
| | | | e | alternativeContent | | | |
| | | | | e | basePattern | xs:anyURI | 0 | unbounded |
| | | | @ | appServiceDescriptionURI | xs:anyURI | required | |
| | | | @ | mimeType | xs:string | required | |
| | | e | r12:KeepUpdatedService | | 0 | x |
| | | | e | registrationServer | xs:anyURI | x | unbounded |
| | | @ | serviceId | xs:anyURI -- link toESG | required | |
| | | @ | r7:serviceClass | xs:string | x | | t83010

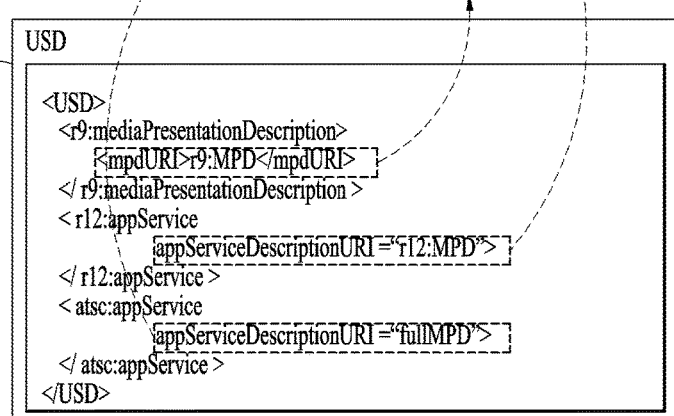

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS REFERENCE TO RELATED APPLICATIONS

This application is the National Phase of PCT International Application No. PCT/KR2015/012976, filed on Dec. 1, 2015, which claims priority under 35 U.S.C. 119(e) to U.S. Provisional Application No. 62/090,351, filed on Dec. 10, 2014, which is hereby expressly incorporated by reference into the present application.

TECHNICAL FIELD

The present invention relates to an apparatus for transmitting a broadcast signal, an apparatus for receiving a broadcast signal and methods for transmitting and receiving a broadcast signal.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

Technical Solution

The present invention provides a system capable of effectively supporting future broadcast services in an environment supporting future hybrid broadcasting using terrestrial broadcast networks and the Internet and related signaling methods.

Advantageous Effects

The present invention can control quality of service (QoS) with respect to services or service components by processing data on the basis of service characteristics, thereby providing various broadcast services.

The present invention can achieve transmission flexibility by transmitting various broadcast services through the same radio frequency (RF) signal bandwidth.

The present invention can provide methods and apparatuses for transmitting and receiving broadcast signals, which enable digital broadcast signals to be received without error even when a mobile reception device is used or even in an indoor environment.

The present invention can effectively support future broadcast services in an environment supporting future hybrid broadcasting using terrestrial broadcast networks and the Internet.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in Internet Protocol (IP) header compression according to an embodiment of the present invention (transmitting side).

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 29 illustrates time interleaving according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 35 illustrates a write operation of a time interleaver according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 42 illustrates a configuration of signaling data according to a first embodiment of the present invention;

FIG. 43 illustrates a service according to the first embodiment of the present invention;

FIG. 44 illustrates an SMT according to the first embodiment of the present invention;

FIG. 45 illustrates a configuration of signaling data according to a second embodiment of the present invention;

FIG. 46 illustrates USD according to the second embodiment of the present invention;

FIG. 47 illustrates a service according to the second embodiment of the present invention;

FIG. 48 illustrates a configuration of signaling data according to a third embodiment of the present invention;

FIG. 49 illustrates USD according to the third embodiment of the present invention;

FIG. 50 illustrates a service according to the third embodiment of the present invention;

FIG. 51 illustrates a configuration of signaling data according to a fourth embodiment of the present invention;

FIG. 52 illustrates a service according to the fourth embodiment of the present invention;

FIG. 53 illustrates a configuration of signaling data according to a fifth embodiment of the present invention;

FIG. 54 illustrates a service according to the fifth embodiment of the present invention;

FIG. 55 illustrates a configuration of signaling data according to a sixth embodiment of the present invention;

FIG. 56 illustrates effects of signaling according to the first to sixth embodiments of the present invention;

FIG. 60 illustrates a USD according to the seventh embodiment of the present invention;

FIG. 61 illustrates an ATSC SDP and/or an LSID according to the seventh embodiment of the present invention;

FIG. 62 illustrates service layer signaling according to the seventh embodiment of the present invention;

FIG. 63 illustrates a method of reducing a signaling size according to an eighth embodiment of the present invention;

FIG. 64 illustrates a USD according to a ninth embodiment of the present invention;

FIG. 74 illustrates a signaling structure for signaling capabilities of a receiver for consuming broadcast services/content according to an embodiment of the present invention;

FIG. 76 illustrates a USD which provides information about a transport session through which data of broadcast services/content is transmitted according to an embodiment of the present invention;

FIG. 80 illustrates extended USBD/USD for indicating a full MPD URI according to an embodiment of the present invention;

FIG. 81 illustrates extended USBD/USD for indicating a full MPD URI according to an embodiment of the present invention;

FIG. 82 illustrates extended USBD/USD for indicating a full MPD URI according to an embodiment of the present invention;

FIG. 83 illustrates extended USBD/USD for indicating a full MPD URI according to an embodiment of the present invention;

BEST MODE

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
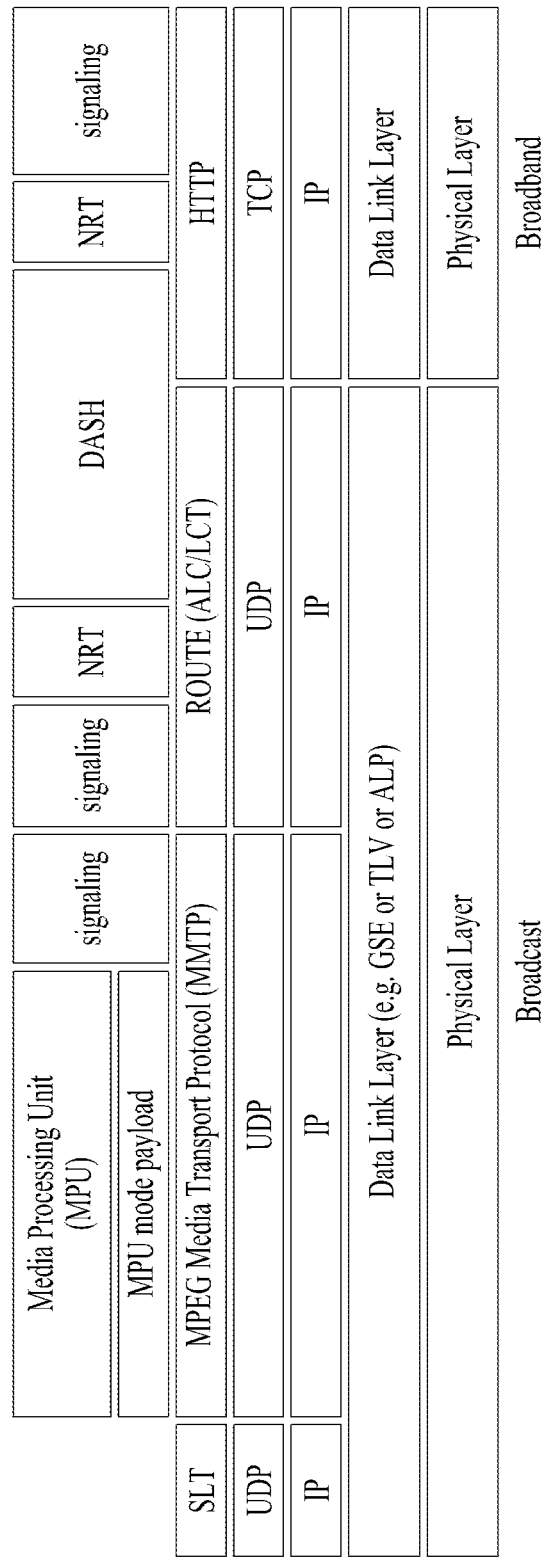
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a User Datagram Protocol (UDP)/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minorChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
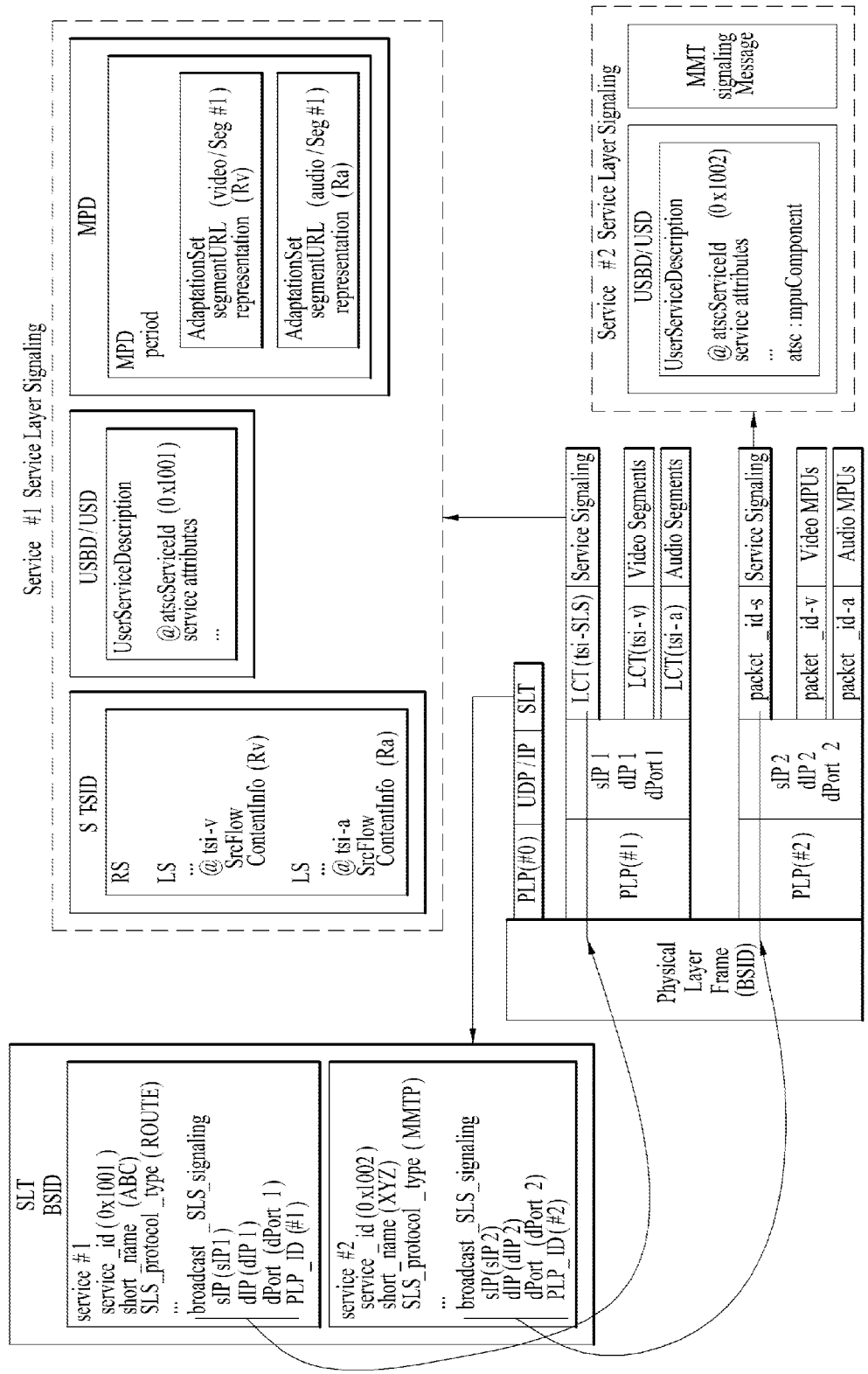
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's NWT message, the MP Table of which provides identification of package ID and location information for assets belonging to the service. Here, an asset is a multimedia data entity, and may refer to a data entity which is combined into one unique ID and is used to generate one multimedia presentation. The asset may correspond to a service component included in one service. The NWT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An NWT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address)

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the NWT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information. An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
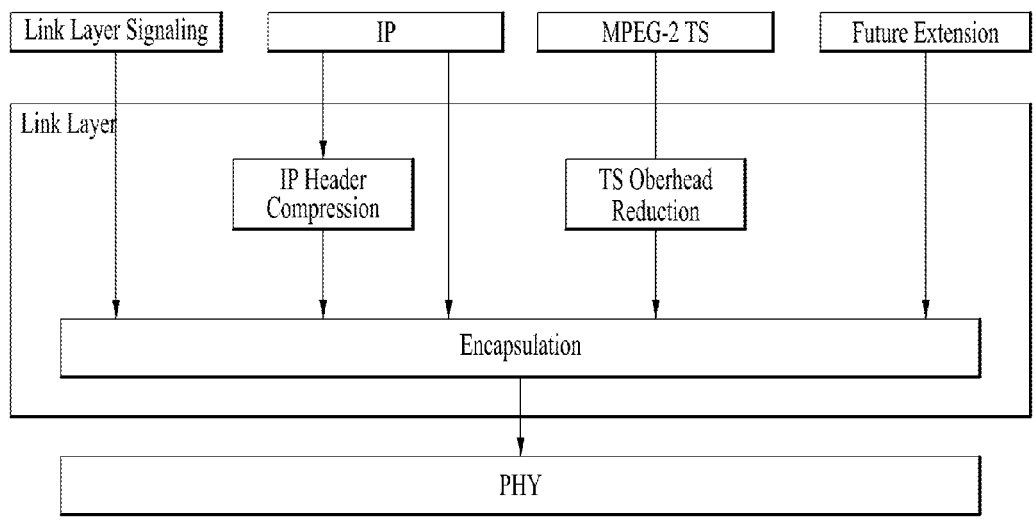
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
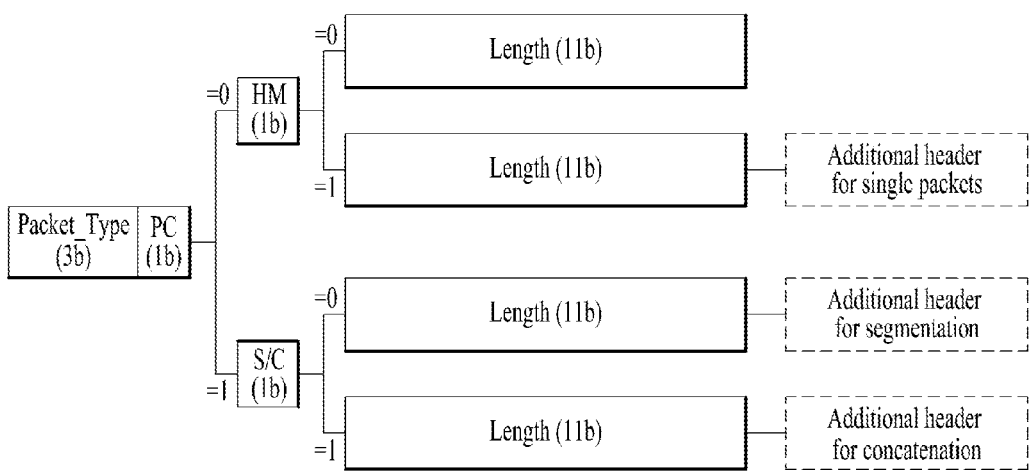
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be an 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
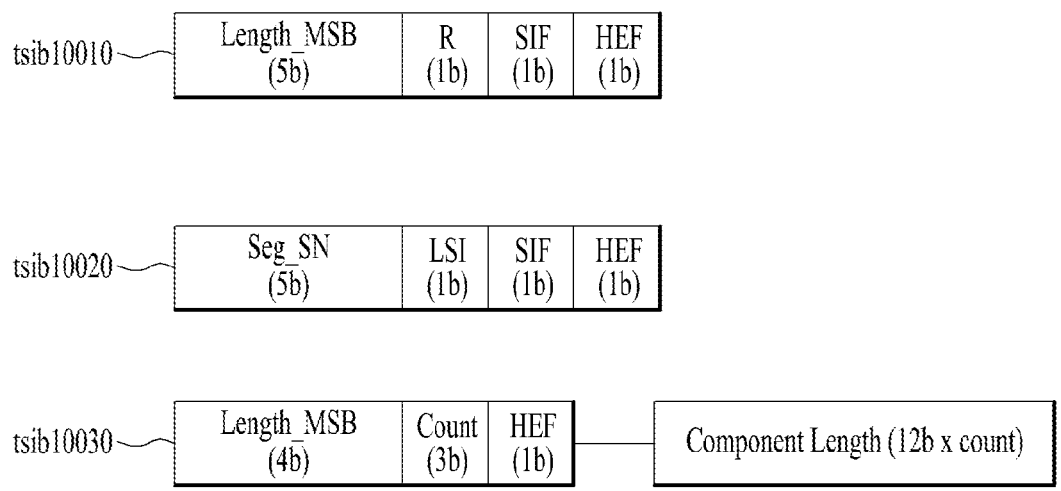
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be an 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be an 8-bit field that can indicate the length of the Header Extension ( ) in bytes counting from the next byte to the last byte of the Header_Extension ( ).

Extension Byte can be a byte representing the value of the Header_Extension ( ).

Figure 11:
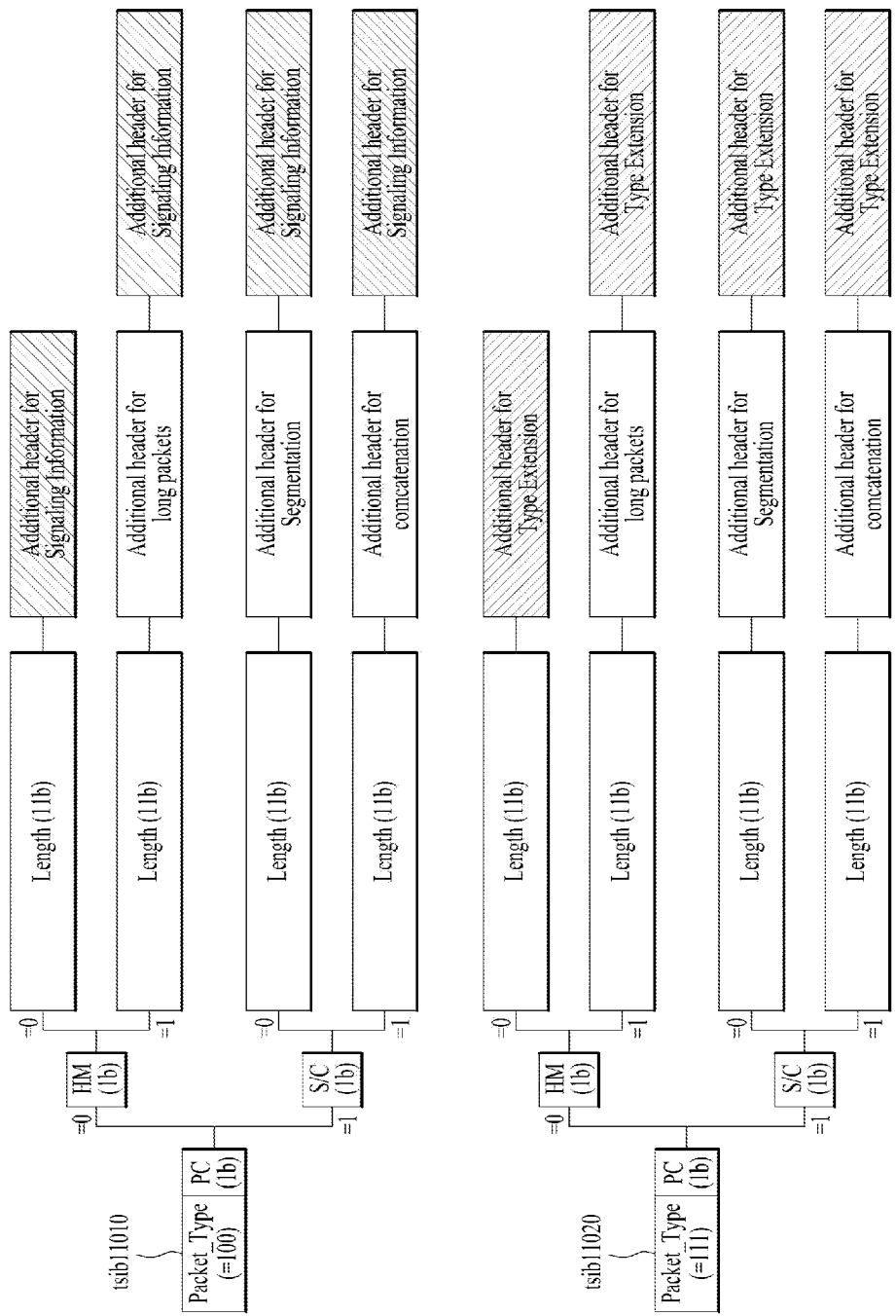
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
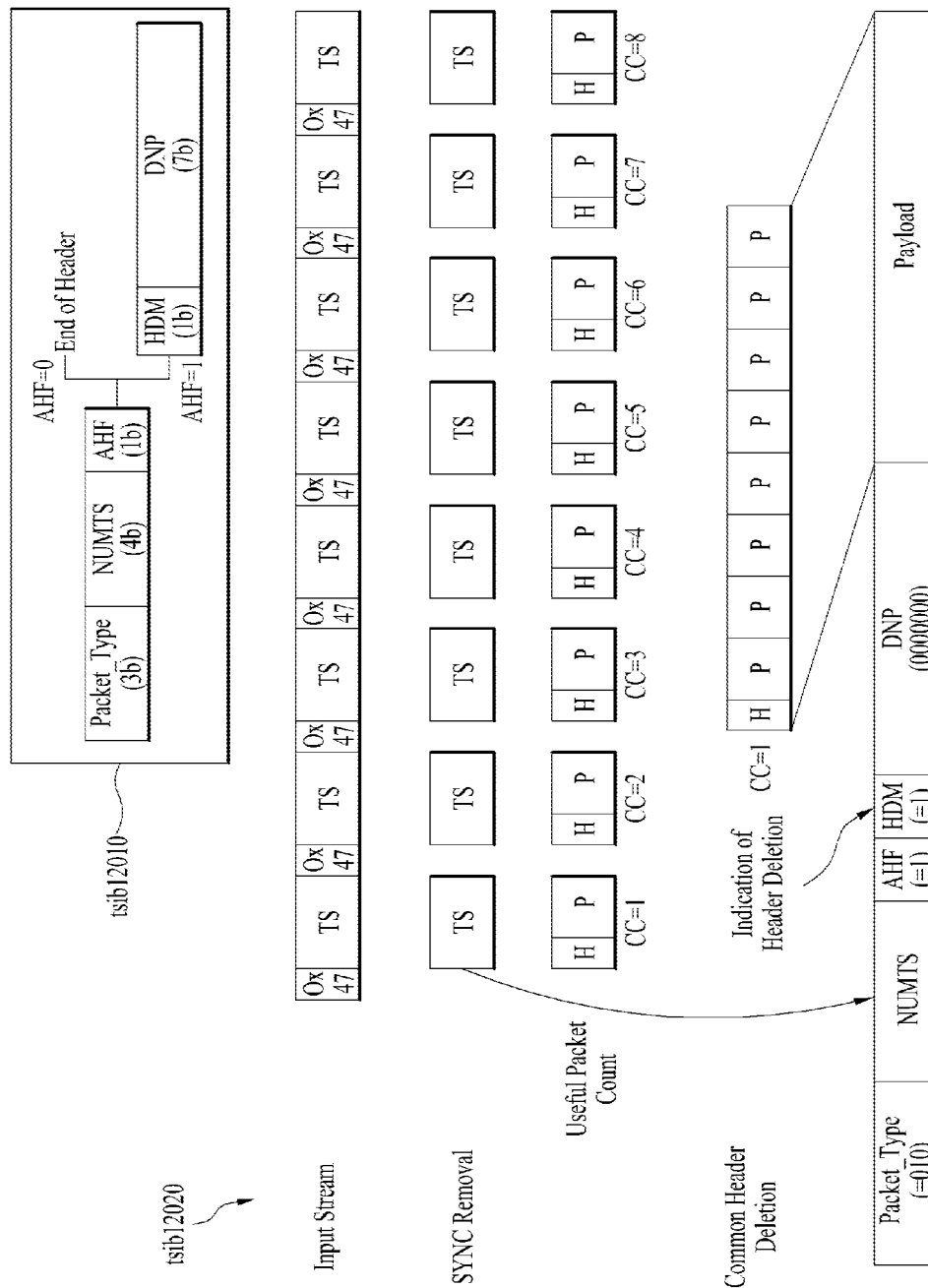
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirectional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to "100".

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context_length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
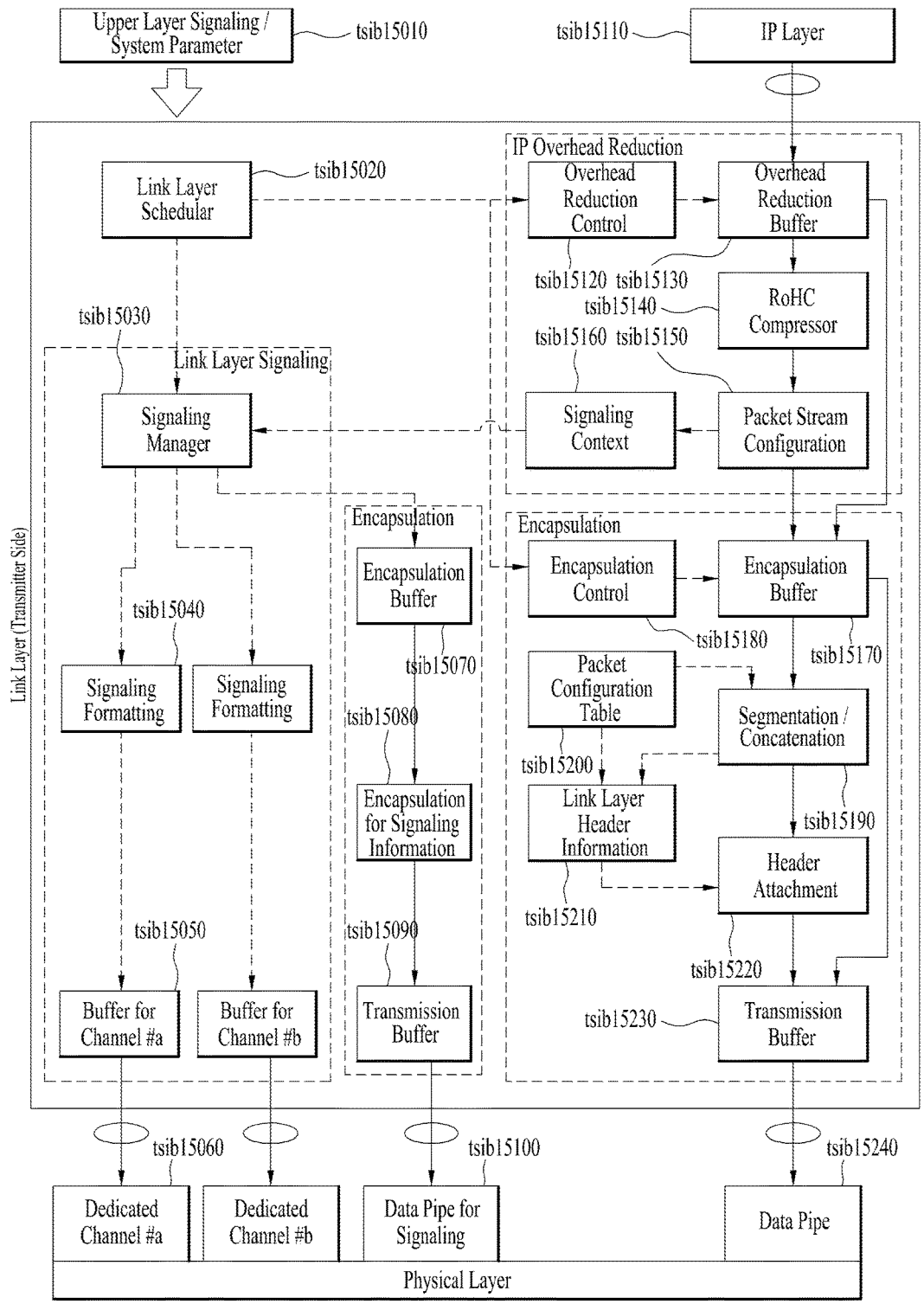
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filterer or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression "RoHC compressor" is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160. The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
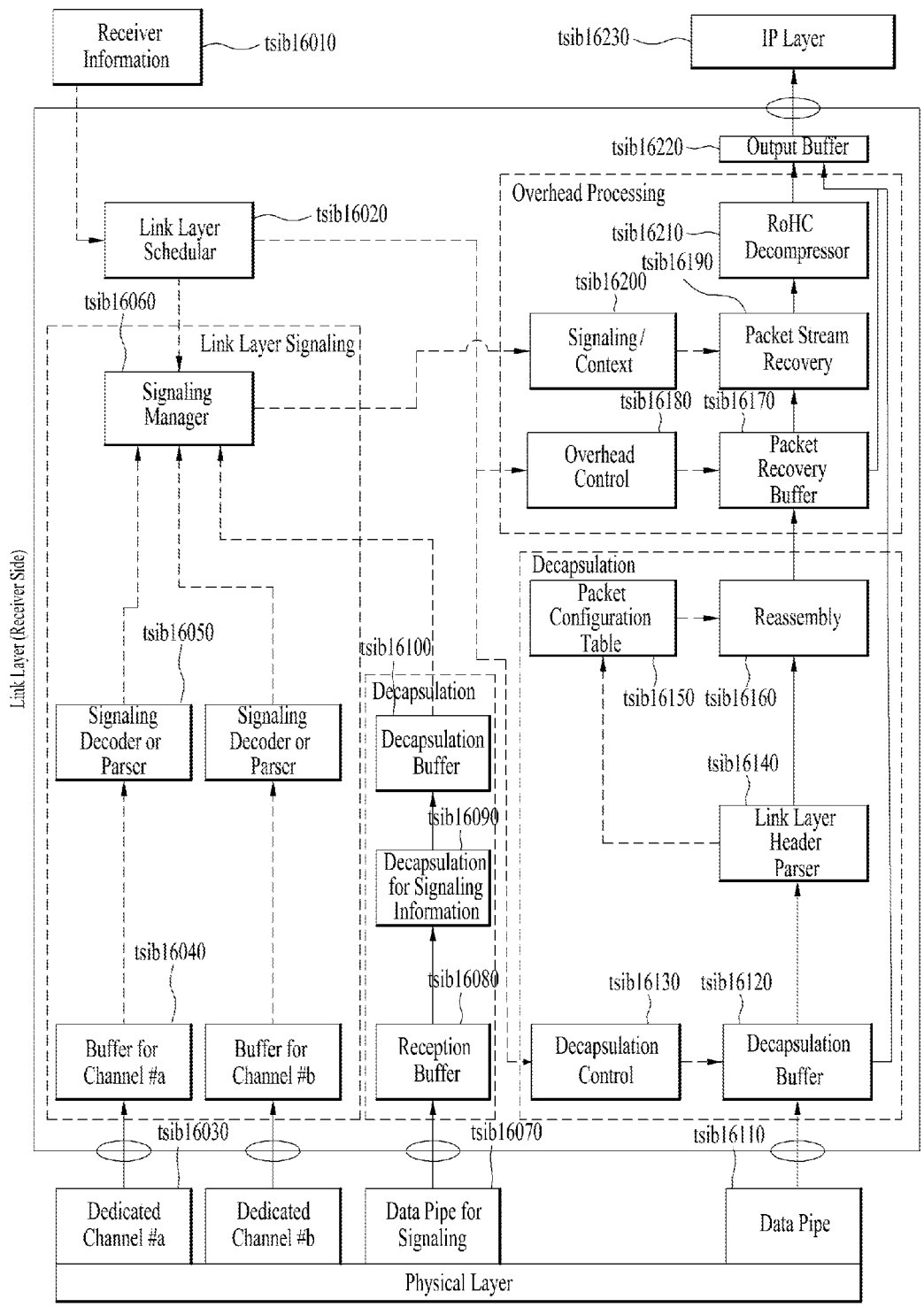
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream. This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
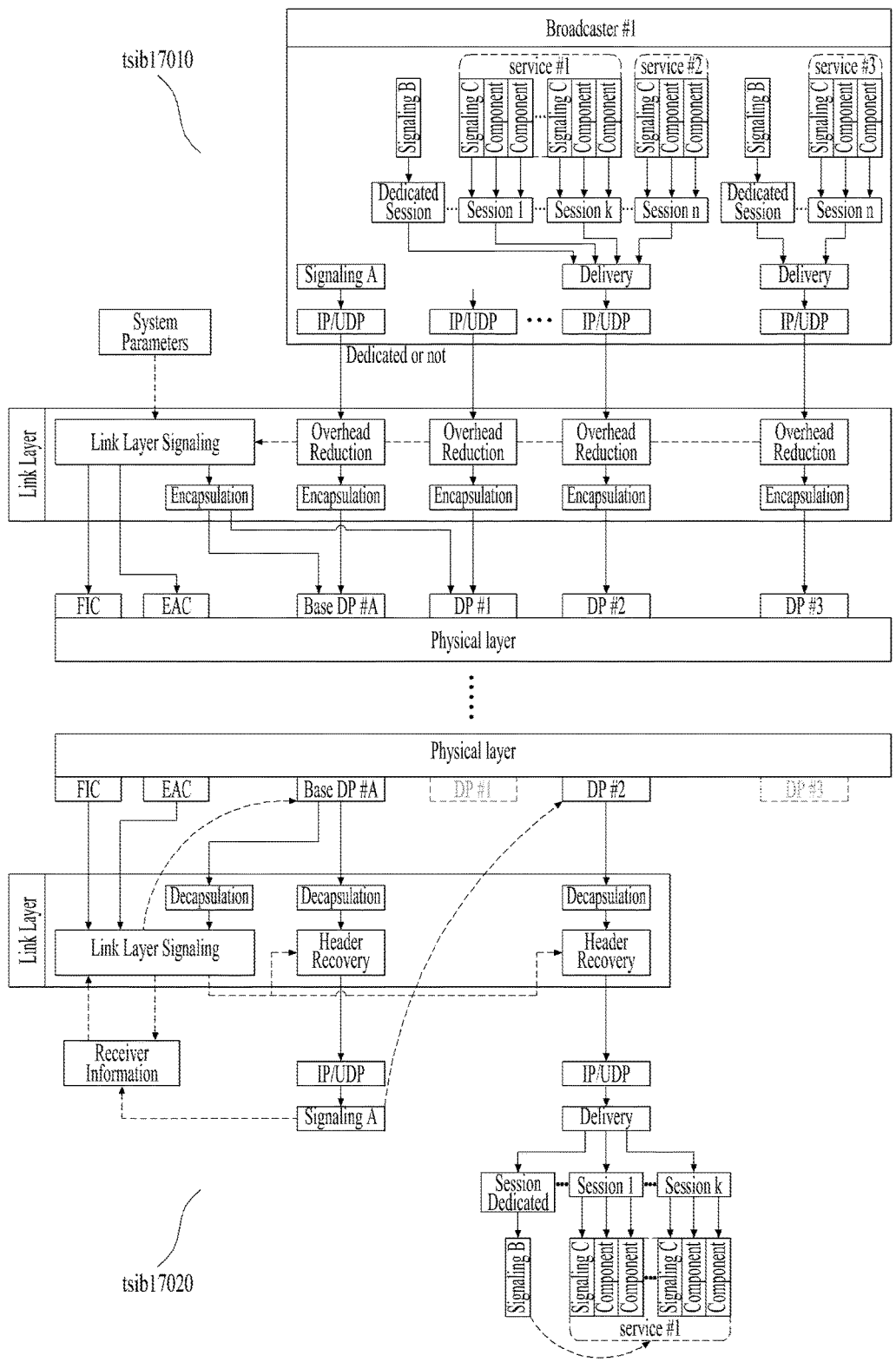
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transmission session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transmission session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators Base data pipe: data pipe that carries service signaling data Baseband frame (or BBFRAME): set of Kbch bits which form the input to one FEC encoding process (BCH and LDPC encoding)

Cell: modulation value that is carried by one carrier of orthogonal frequency division multiplexing (OFDM) transmission Coded block: LDPC-encoded block of PLS1 data or one of the LDPC-encoded blocks of PLS2 data Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol)

DP_ID: this 8-bit field identifies uniquely a DP within the system identified by the SYSTEM_ID Dummy cell: cell carrying a pseudo-random value used to fill the remaining capacity not used for PLS signaling, DPs or auxiliary streams Emergency alert channel (EAC): part of a frame that carries EAS information data Frame: physical layer time slot that starts with a preamble and ends with a frame edge symbol Frame repetition unit: a set of frames belonging to the same or different physical layer profiles including an FEF, which is repeated eight times in a superframe Fast information channel (FIC): a logical channel in a frame that carries mapping information between a service and the corresponding base DP FECBLOCK: set of LDPC-encoded bits of DP data FFT size: nominal FFT size used for a particular mode, equal to the active symbol period Ts expressed in cycles of an elementary period T Frame signaling symbol: OFDM symbol with higher pilot density used at the start of a frame in certain combinations of FFT size, guard interval and scattered pilot pattern, which carries a part of the PLS data Frame edge symbol: OFDM symbol with higher pilot density used at the end of a frame in certain combinations of FFT size, guard interval and scattered pilot pattern Frame group: the set of all frames having the same PHY profile type in a superframe Future extension frame: physical layer time slot within the superframe that may be used for future extension, which starts with a preamble Futurecast UTB system: proposed physical layer broadcast system, the input of which is one or more MPEG2-TS, IP or general stream(s) and the output of which is an RF signal Input stream: a stream of data for an ensemble of services delivered to the end users by the system Normal data symbol: data symbol excluding the frame signaling symbol and the frame edge symbol PHY profile: subset of all configurations that a corresponding receiver should implement PLS: physical layer signaling data including PLS1 and PLS2

PLS1: a first set of PLS data carried in a frame signaling symbol (FSS) having a fixed size, coding and modulation, which carries basic information about a system as well as parameters needed to decode PLS2

NOTE: PLS1 data remains constant for the duration of a frame group

PLS2: a second set of PLS data transmitted in the FSS, which carries more detailed PLS data about the system and the DPs PLS2 dynamic data: PLS2 data that dynamically changes frame-by-frame PLS2 static data: PLS2 data that remains static for the duration of a frame group Preamble signaling data: signaling data carried by the preamble symbol and used to identify the basic mode of the system Preamble symbol: fixed-length pilot symbol that carries basic PLS data and is located at the beginning of a frame The preamble symbol is mainly used for fast initial band scan to detect the system signal, timing thereof, frequency offset, and FFT size.

Reserved for future use: not defined by the present document but may be defined in future Superframe: set of eight frame repetition units Time interleaving block (TI block): set of cells within which time interleaving is carried out, corresponding to one use of a time interleaver memory TI group: unit over which dynamic capacity allocation for a particular DP is carried out, made up of an integer, dynamically varying number of XFECBLOCKs NOTE: The TI group may be mapped directly to one frame or may be mapped to a plurality of frames. The TI group may contain one or more TI blocks.

Figure 18:
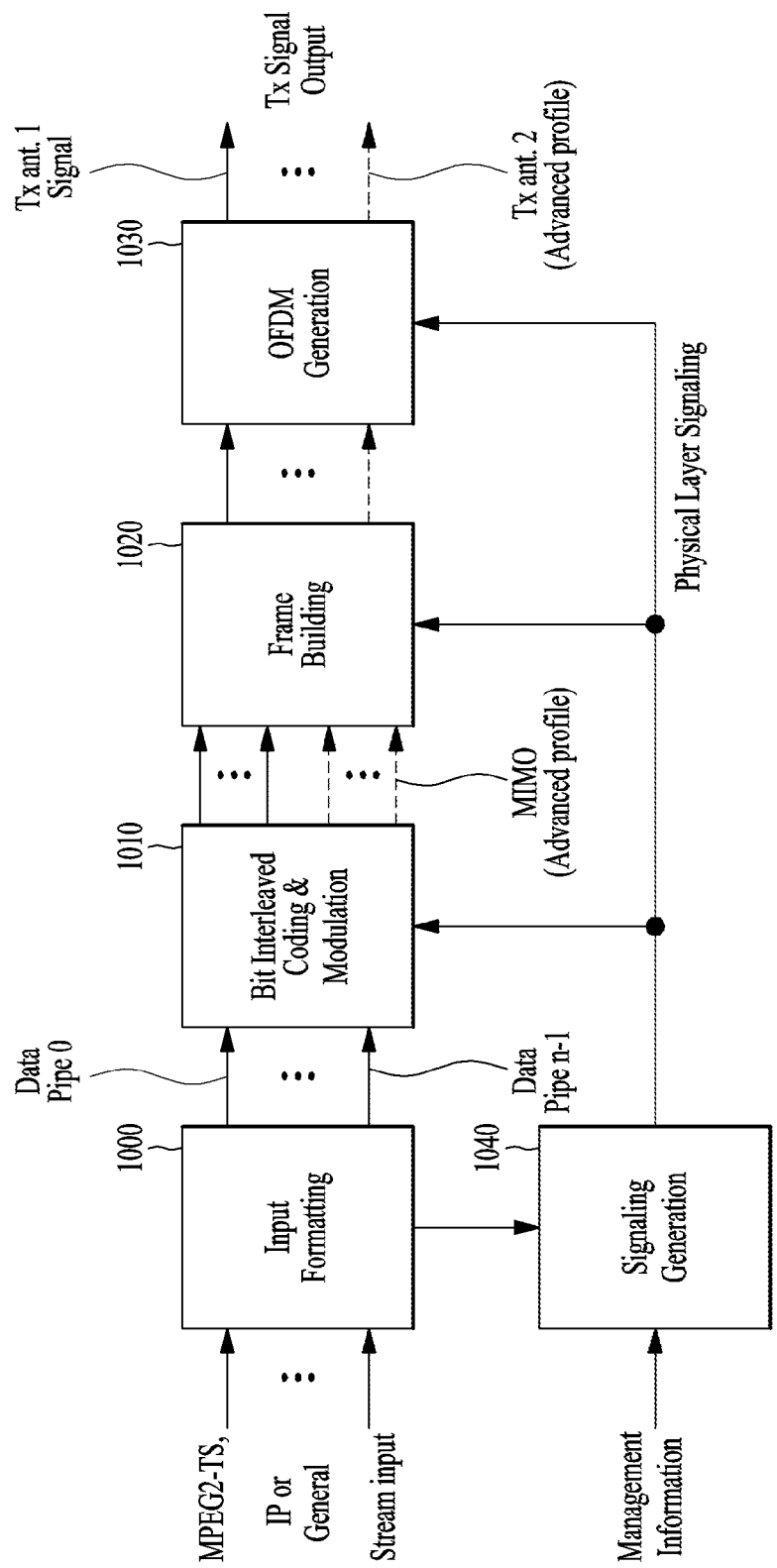
FIG. 18 is a block diagram illustrating a configuration of a broadcast signal transmission apparatus for future broadcast services according to an embodiment of the present invention.

Type 1 DP: DP of a frame where all DPs are mapped to the frame in time division multiplexing (TDM) scheme Type 2 DP: DP of a frame where all DPs are mapped to the frame in frequency division multiplexing (FDM) scheme XFECBLOCK: set of $N_{cells}$ cells carrying all the bits of one LDPC FECBLOCK FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
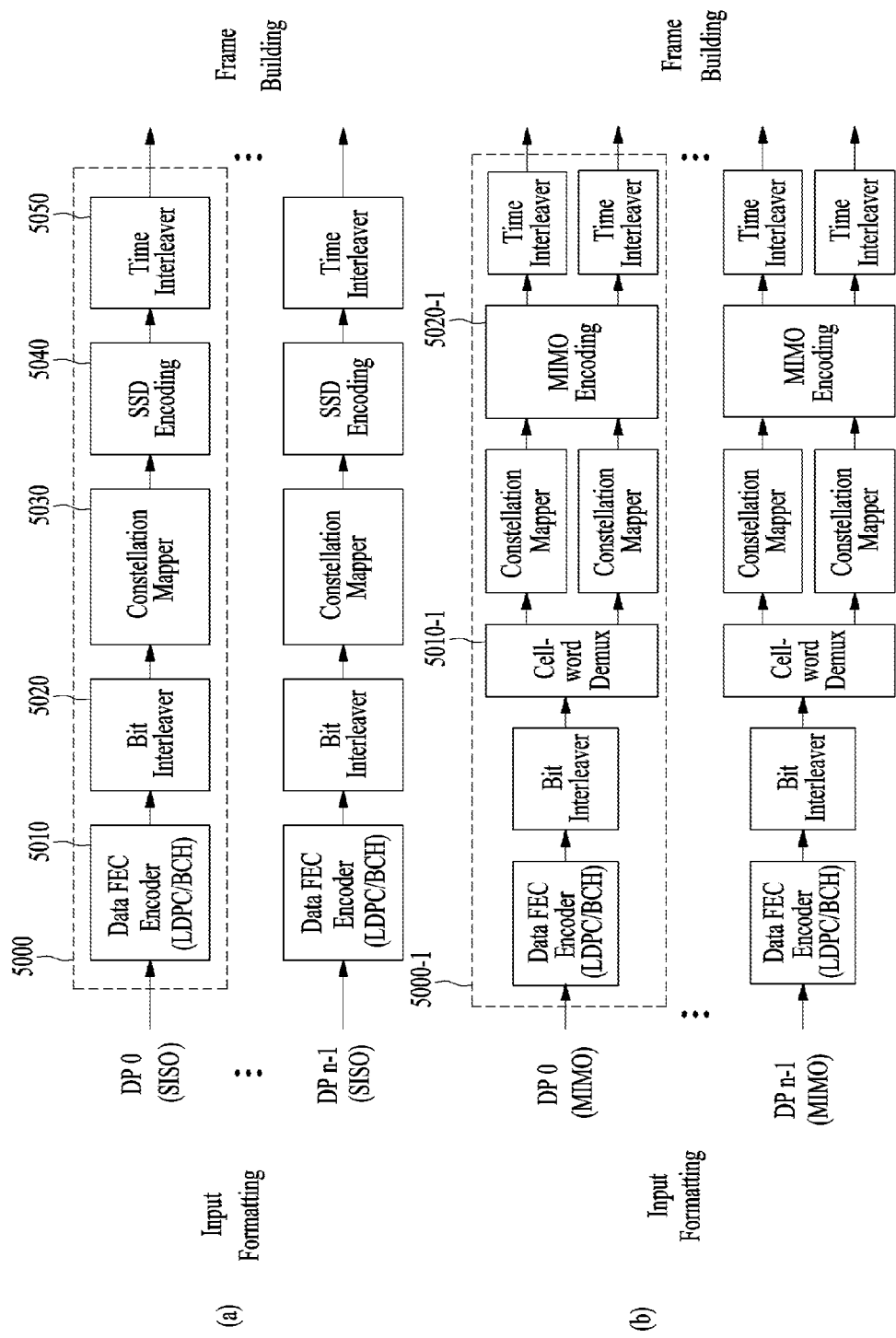
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_1$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,i and g2,i) is transmitted by the same carrier k and OFDM symbol 1 of respective TX antennas thereof.

The above-described blocks may be omitted or replaced by blocks having similar or identical functions.

Figure 20:
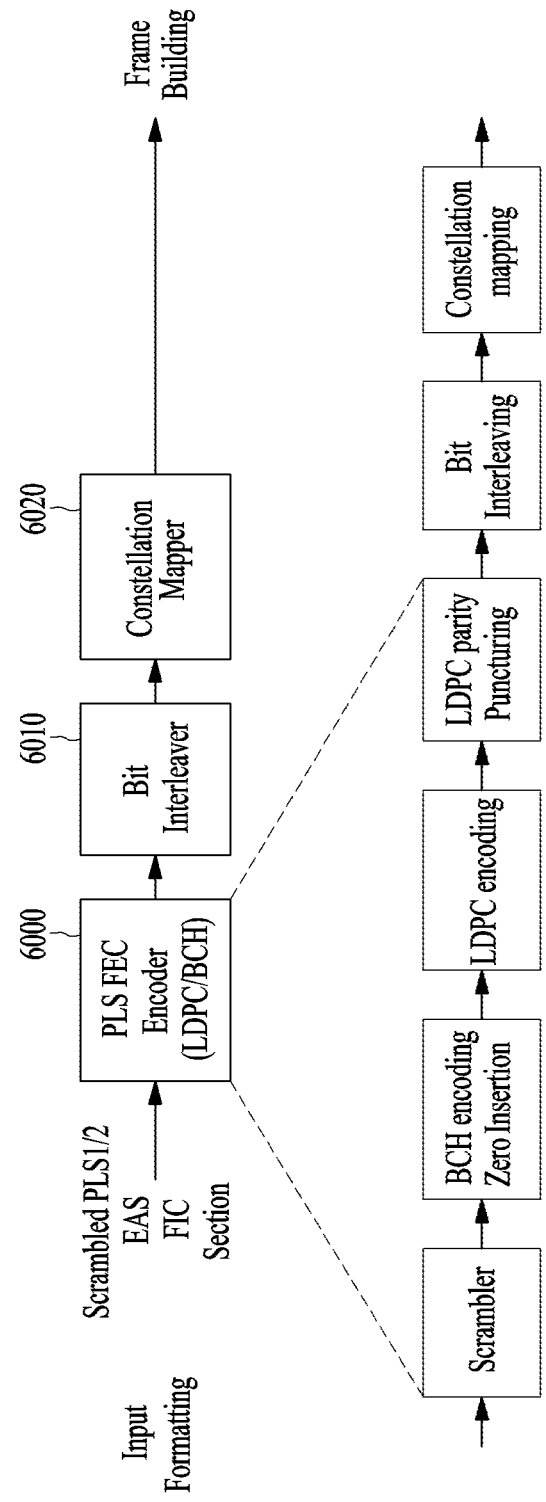
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Equation 1]

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
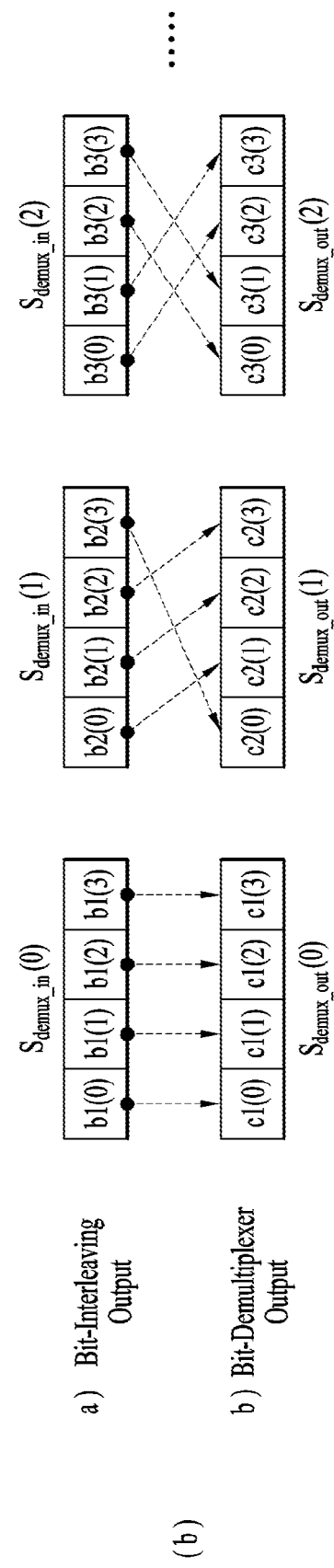
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
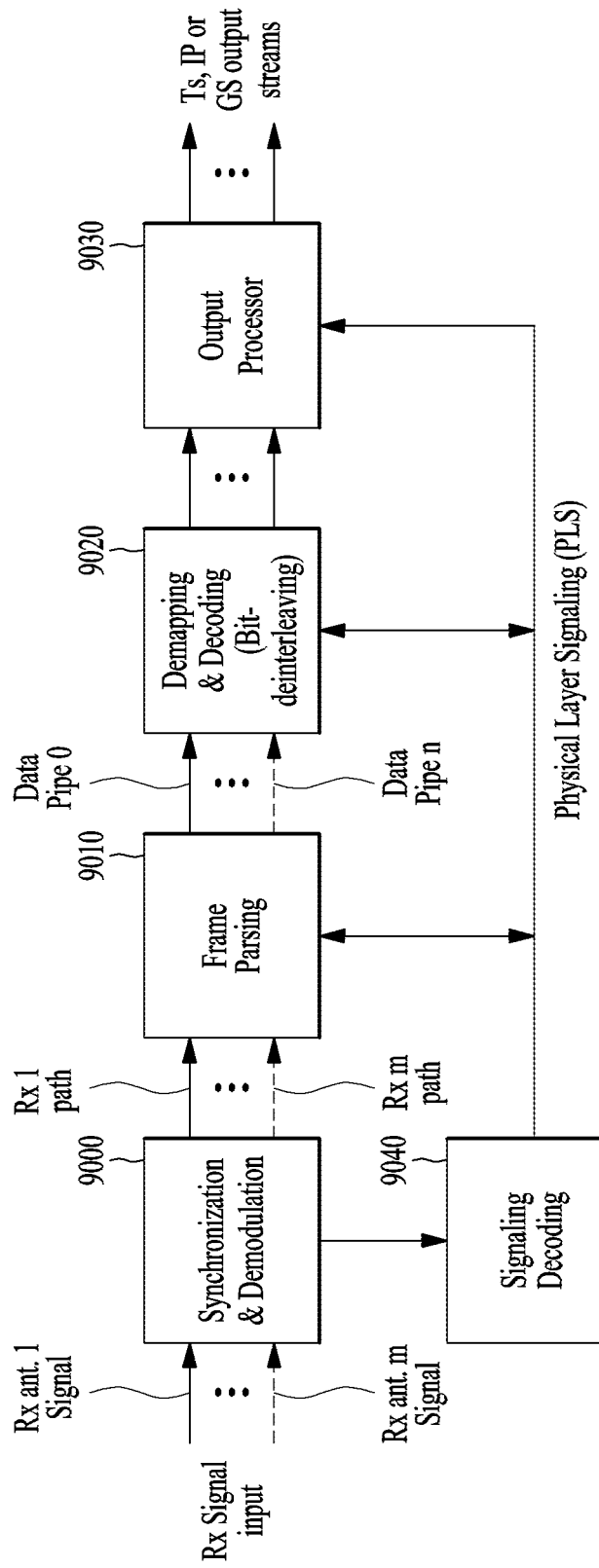
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FEC}$ addition with cyclic shifting value floor($N_{FEC}/2$), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

Figure 23:
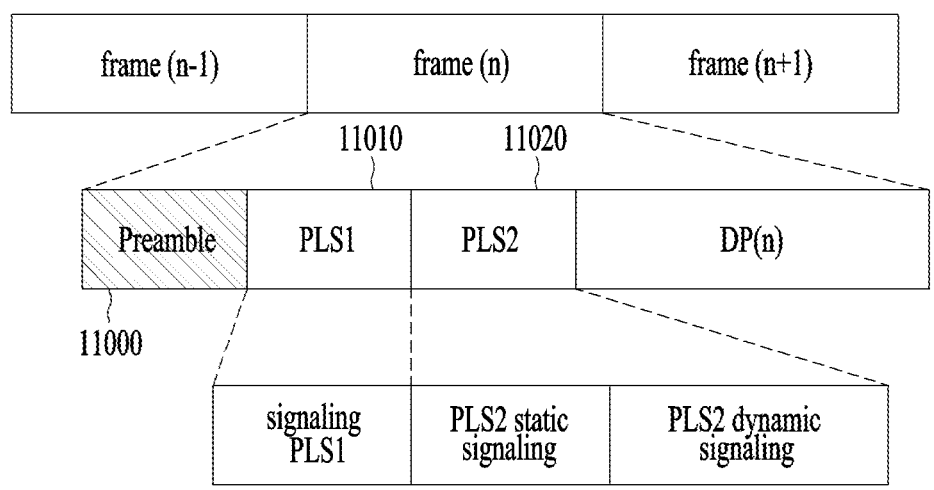
FIG. 23 illustrates a signaling hierarchy structure of a frame according to an embodiment of the present invention.

In the cases of QAM-16 and NUQ-64 mapped to a QAM symbol, the rule of operation is described in FIG. 23(*a*). As shown in FIG. 23(*a*), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast futurecast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|-------|----------|
| 00    | 8K FFT   |
| 01    | 16K FFT  |

TABLE 1-continued

| Value | FFT size |
|---|---|
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicates major version information. A change in the major version field indicates a non-backward-compatible change. A default value is '0000'. For a version described in this standard, a value is set to '0000'.

Minor version: The LSB corresponding to four bits of SYSTEM_VERSION field indicates minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP. The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}$=1). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_I$=1). Allowed values of $P_I$ with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames. For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next super-frame.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| PHY profile | DP_START field size | |
|---|---|---|
| | 64K | 16K |
| Base | 13 bits | 15 bits |
| Handheld | — | 13 bits |
| Advanced | 13 bits | 15 its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame. This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE.

If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
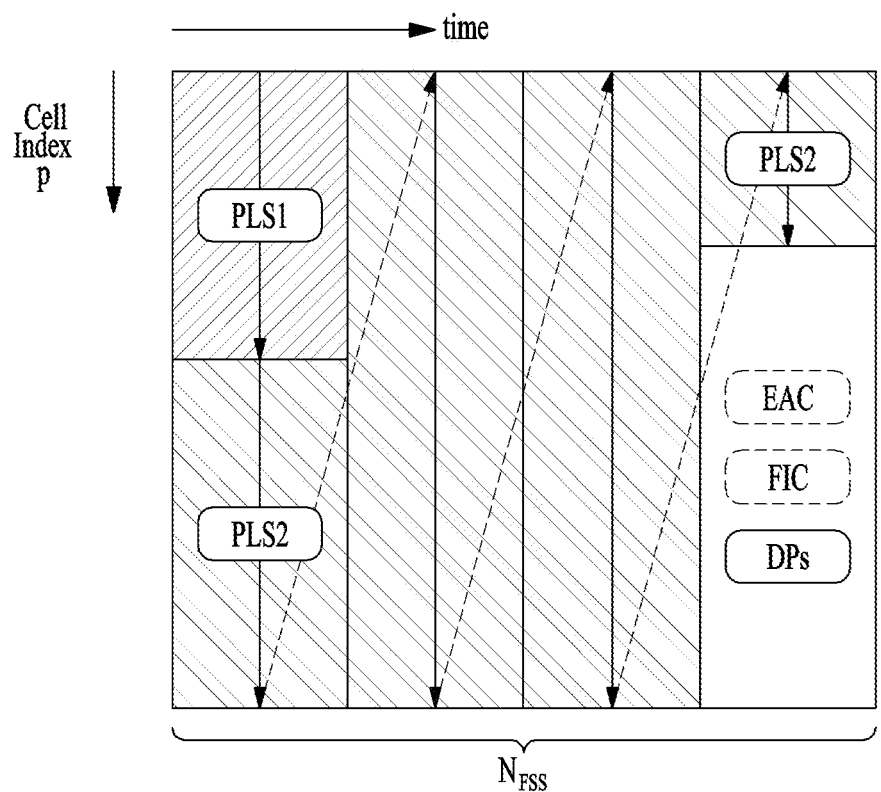
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |

TABLE 23-continued

| LDPC rate | $N_{ldpc}$ | $K_{ldpc}$ | $K_{bch}$ | BCH error correction capability | $N_{bch} - K_{bch}$ |
|---|---|---|---|---|---|
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) is expressed by the following Equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 2]}$$

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits $$p_0=p_1=p_2=\ldots=p_{N_{ldpc}-K_{ldpc}-1}=0 \quad \text{[Equation 3]}$$

2) Accumulate a first information bit—$i_0$, at a parity bit address specified in a first row of addresses of a parity check matrix. Details of the addresses of the parity check matrix will be described later. For example, for the rate of 13/15, $$p_{983}=p_{983} \oplus i_0 \ p_{2815}=p_{2815} \oplus i_0$$

$$p_{4837}=p_{4837} \oplus i_0 \ p_{4989}=p_{4989} \oplus i_0$$

$$p_{6138}=p_{6138} \oplus i_0 \ p_{6458}=p_{6458} \oplus i_0$$

$$p_{6921}=p_{6921} \oplus i_0 \ p_{6974}=p_{6974} \oplus i_0$$

$$p_{7572}=p_{7572} \oplus i_0 \ p_{8260}=p_{8260} \oplus i_0$$

$$p_{8496}=p_{8496} \oplus i_0 \quad \text{[Equation 4]}$$

3) For the next 359 information bits, $i_s$, s=1, 2, ..., 359, accumulate $i_s$ at parity bit addresses using following Equation.

$$\{x+(s \bmod 360) \times Q_{ldpc}\} \bmod(N_{ldpc}-K_{ldpc}) \quad \text{[Equation 5]}$$

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}$=24 for the rate of 13/15, so for an information bit $i_1$, the following operations are performed.

$$p_{1007}=p_{1007} \oplus i_1 \ p_{2839}=p_{2839} \oplus i_1$$

$$p_{4861}=p_{4861} \oplus i_1 \ p_{5013}=p_{5013} \oplus i_1$$

$$p_{6162}=p_{6162} \oplus i_1 \ p_{6482}=p_{6482} \oplus i_1$$

$$p_{6945}=p_{6945} \oplus i_1 \ p_{6998}=p_{6998} \oplus i_1$$

$$p_{7596}=p_{7596} \oplus i_1 \ p_{8284}=p_{8484} \oplus i_1$$

$$p_{8520}=p_{8520} \oplus i_1 \quad \text{[Equation 4]}$$

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, ..., 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i=p_i \oplus p_{i-1}, i=1,2, \ldots N_{ldpc}-K_{ldpc}-1 \quad \text{[Equation 7]}$$

Here, final content of $p_i$ (i=0, 1, ..., $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 29 illustrates time interleaving according to an embodiment of the present invention.

(a) to (c) show examples of a TI mode.

A time interleaver operates at the DP level. Parameters of time interleaving (TI) may be set differently for each DP. The following parameters, which appear in part of the PLS2-STAT data, configure the TI.

DP_TI_TYPE (allowed values: 0 or 1): This parameter represents the TI mode. The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFEC-BLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups. That is, each TI group is a set of an integer number of XFEC-BLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_I$ frames. Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
| --- | --- |
| Option 1 | Each TI group contains one TI block and is mapped directly to one frame as shown in (a). This option is signaled in PLS2-STAT by DP_TI_TYPE = '0' and DP_TI_LENGTH = '1' ($N_{TI}$ = 1). |
| Option 2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in PLS2-STAT by DP_TI_TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP_TI_TYPE = '0' and DP_TI_LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 30:
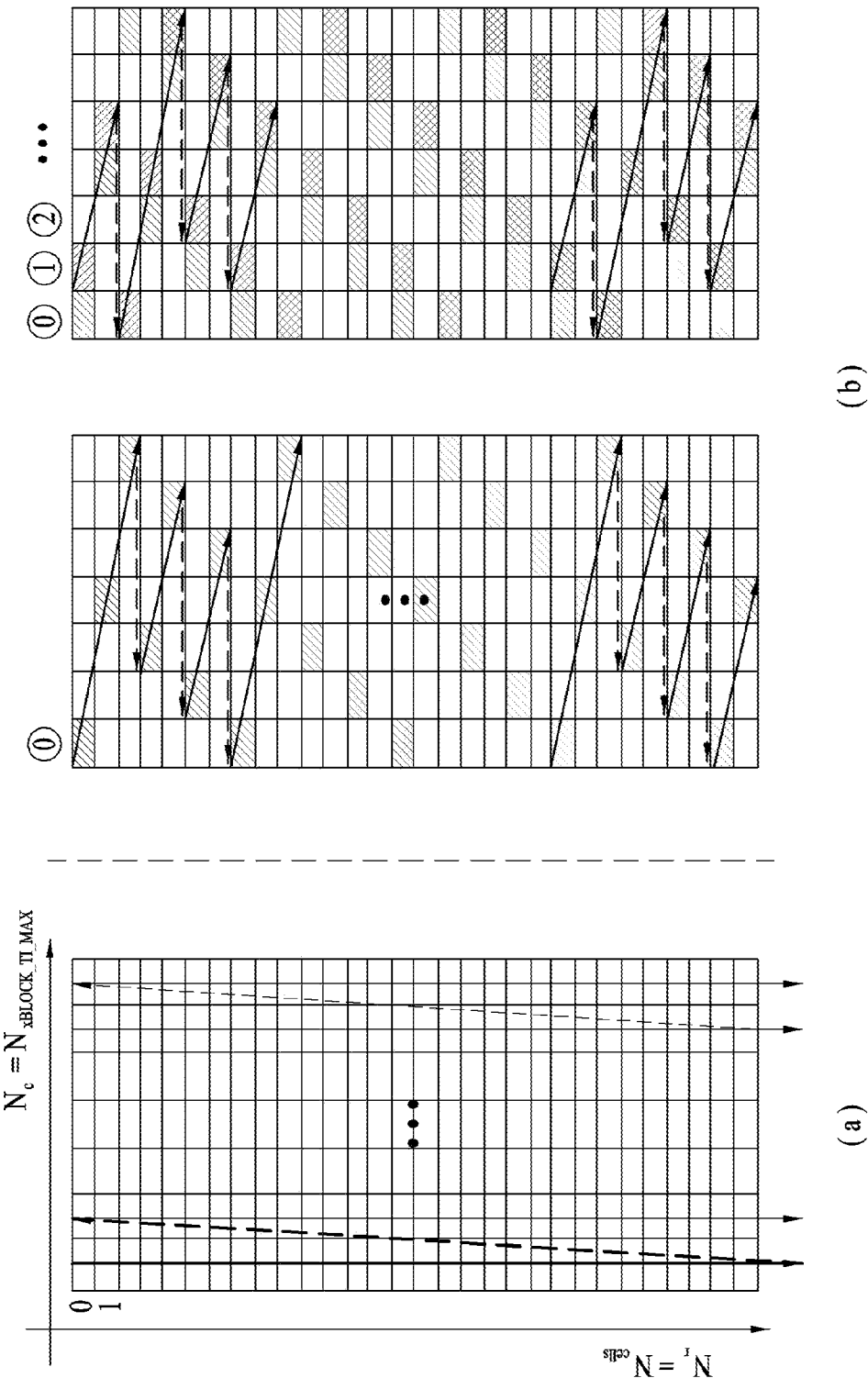
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(a) shows a write operation in the time interleaver and FIG. 30(b) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}$ (i=0, ... , $N_rN_c$) as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

$$\text{GENERATE}(R_{n,s,i}, C_{n,s,i}) = \quad [\text{Equation 8}]$$
$$\{$$
$$R_{n,s,i} = \mod(i, N_r),$$
$$T_{n,s,i} = \mod(S_{shift} \times R_{n,s,i}, N_c),$$
$$C_{n,s,i} = \mod\left(T_{n,s,i} + \left\lfloor \frac{i}{N_r} \right\rfloor, N_c\right)$$
$$\}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

$$\text{for} \begin{cases} N'_{xBLOCK\_TI\_MAX} = \\ \quad N_{xBLOCK\_TI\_MAX} + 1, & \text{if } N_{xBLOCK\_TI\_MAX} \mod 2 = 0 \\ N'_{xBLOCK\_TI\_MAX} = \\ \quad N_{xBLOCK\_TI\_MAX}, & \text{if } N_{xBLOCK\_TI\_MAX} \mod 2 = 1 \end{cases} \quad [\text{Equation 9}]$$

$$S_{shift} = \frac{N'_{xBLOCK\_TI\_MAX} - 1}{2}$$

As a result, cell positions to be read are calculated by coordinates $z_{n,s,i} = N_r C_{n,s,i} + R_{n,s,i}$.

Figure 31:
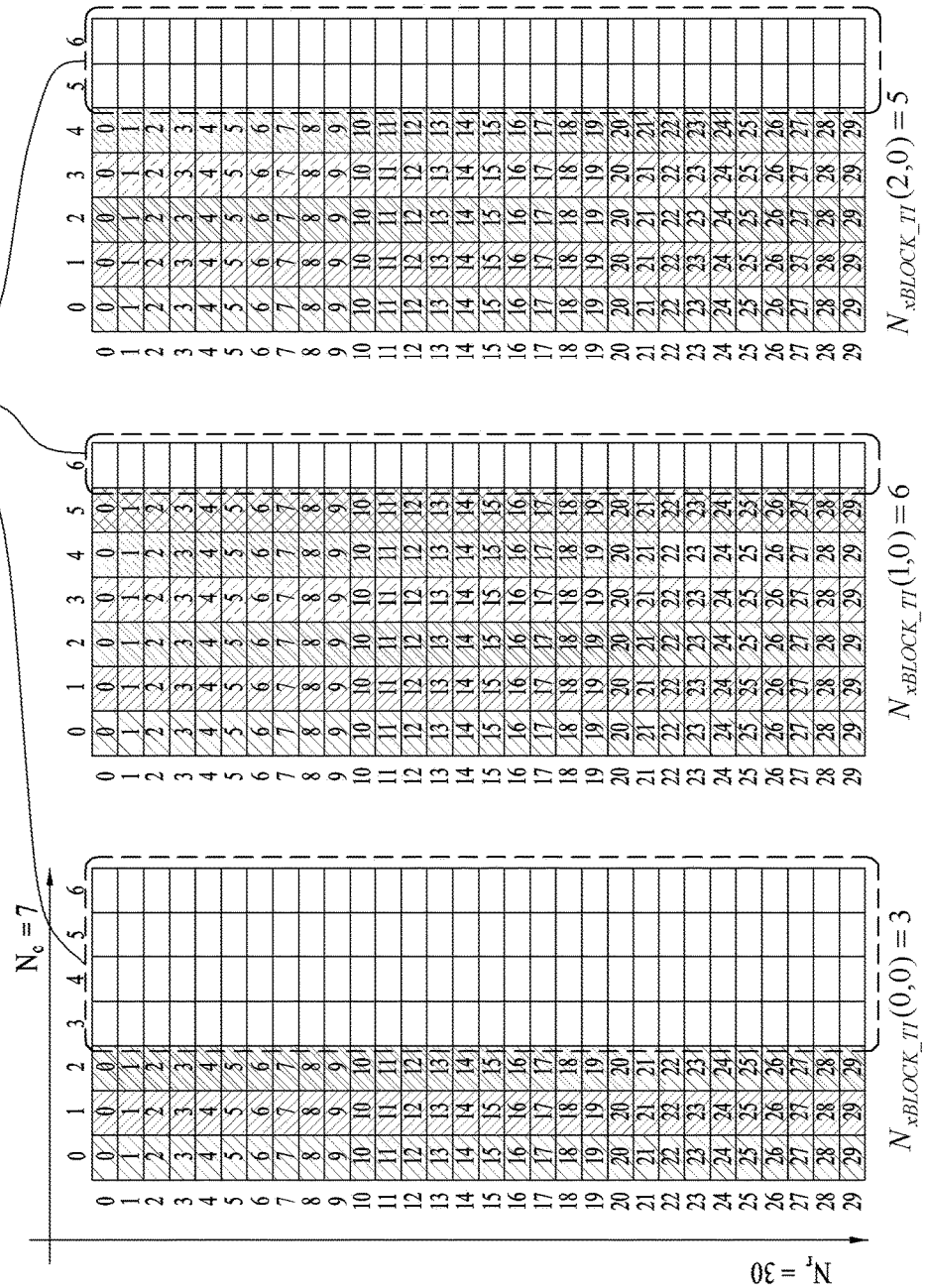
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFEC-BLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$, may be less than or equal to $N'_{xBLOCK\_TI\_MAX}$. Thus, in order to achieve single-memory deinterleaving at a receiver side regardless of $N_{xBLOCK\_TI}$ (n,s), the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

$$p = 0;$$ [Equation 10]

for $i = 0; i < N_{cells} N'_{xBLOCK\_TI\_MAX}; i = i + 1$

{GENERATE($R_{n,s,i}, C_{n,s,i}$);

$V_i = N_r C_{n,s,j} + R_{n,s,j}$ if $V_i < N_{cells} N_{xBLOCK\_TI}(n, s)$

{

$Z_{n,s,p} = V_i; p = p + 1;$

}

}

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
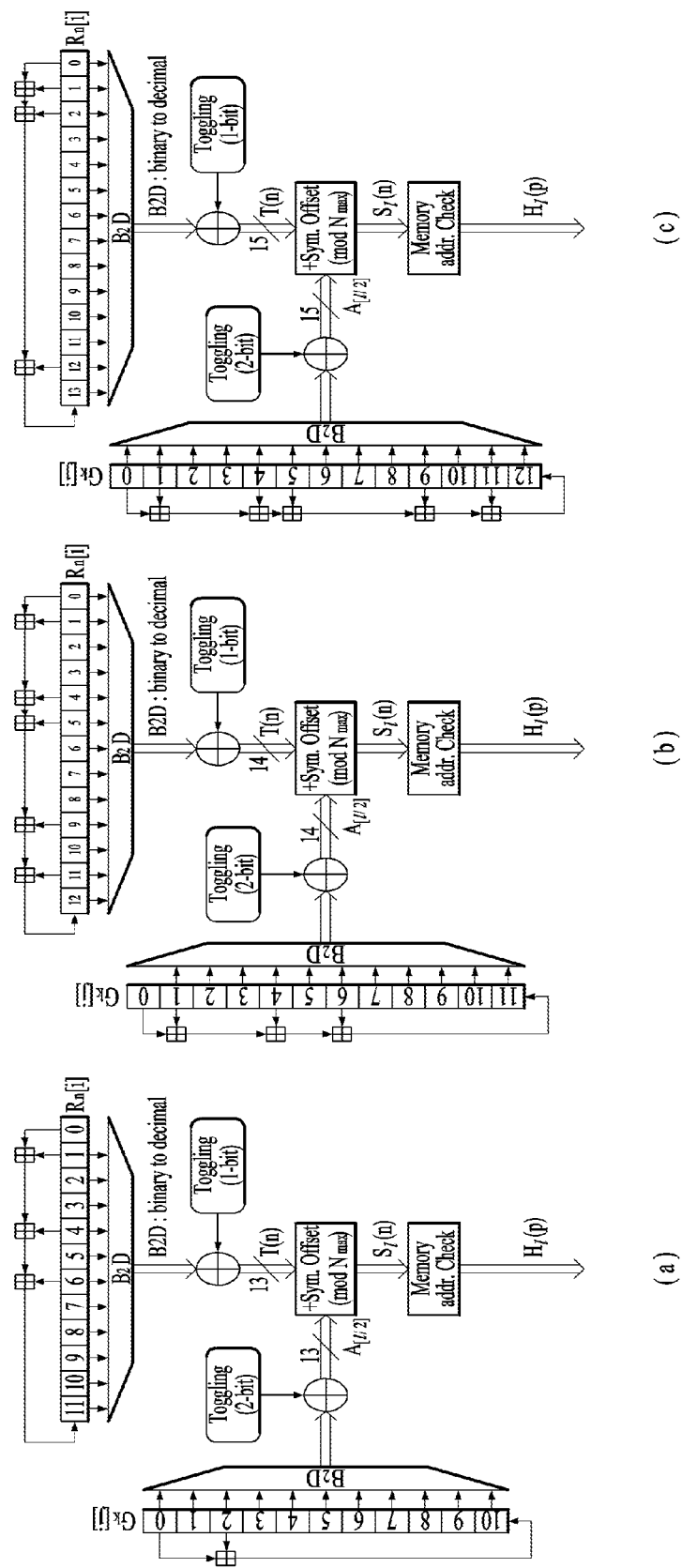
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l} = [x_{m,l,0}, \ldots, x_{m,l,p}, \ldots, x_{m,l,N_{data}-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data} = C_{FSS}$ for the frame signaling symbol(s), $N_{data} = C_{data}$ for the normal data, and $N_{data} = C_{FES}$ for the frame edge symbol. In addition, the interleaved data cells are defined as $P_{m,l} = [v_{m,l,0}, \ldots, v_{m,l,N_{data}-1}]$ for $l=0, \ldots, N_{sym}-1$.

For the OFDM symbol pair, the interleaved OFDM symbol pair is given by $v_{m,l,H_l(p)} = x_{m,l,p}$, $p=0, \ldots, N_{data}-1$, for the first OFDM symbol of each pair $v_{m,l,p} = x_{m,l,H_l(p)}$, $p=0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
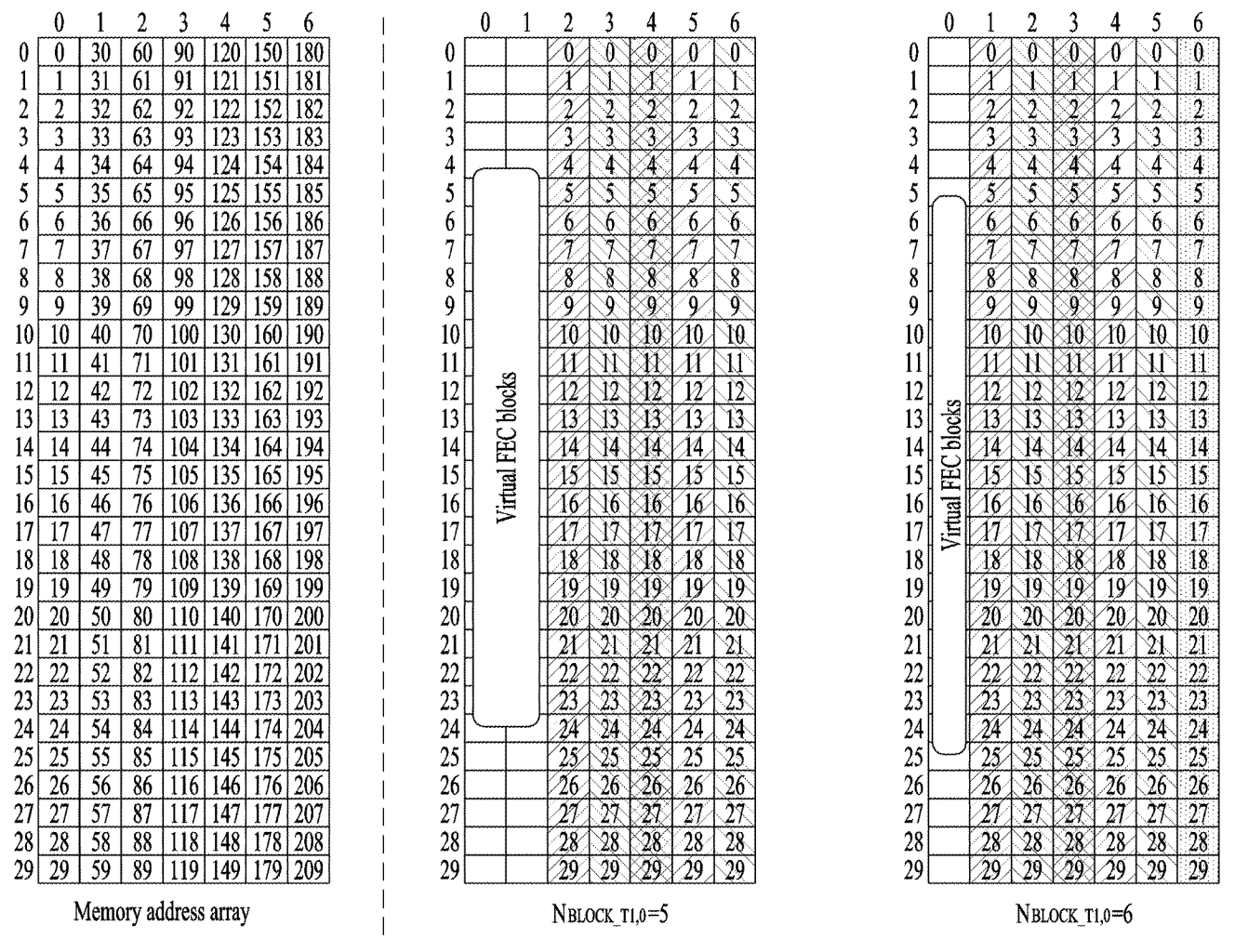

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
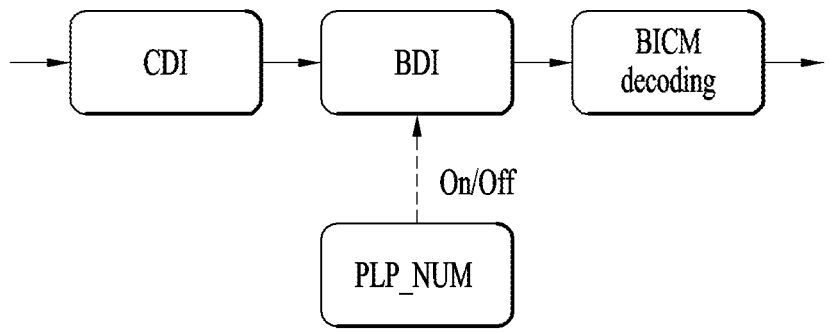
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
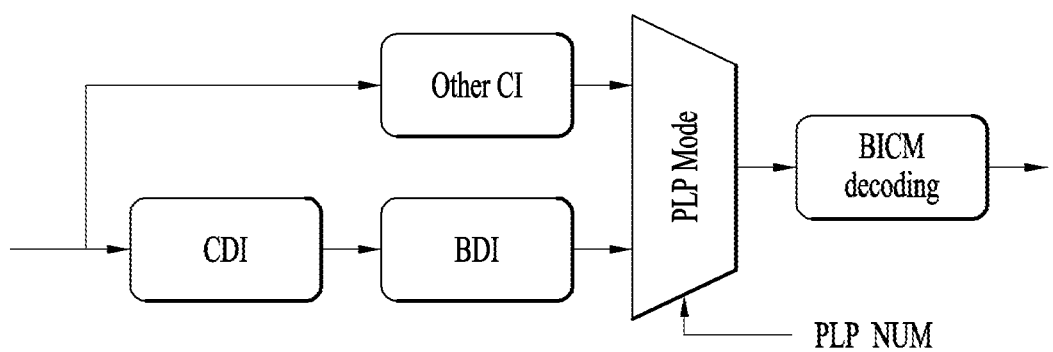
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
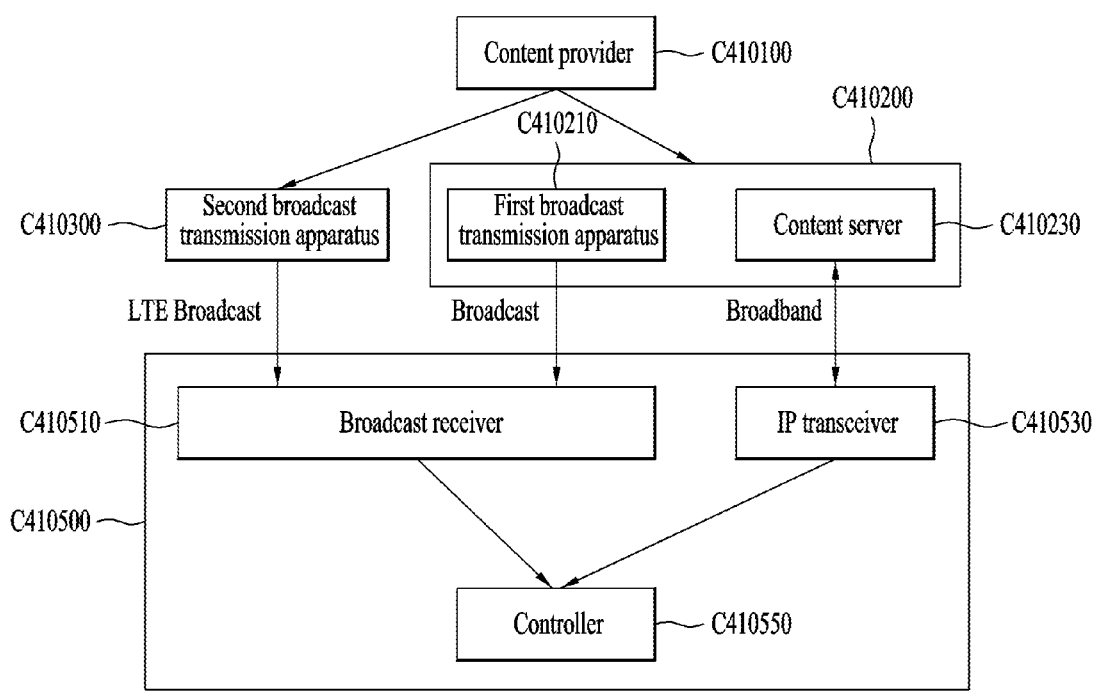
FIG. 41 is a block diagram illustrating a configuration of a broadcast system according to an embodiment of the present invention.

FIG. 41 is a block diagram illustrating a configuration of a broadcast system according to an embodiment of the present invention.

The broadcast system according to an embodiment of the present invention may provide normal broadcast network services, mobile broadcast network services and/or hybrid services.

Normal broadcast network services (ATSC services or DVB services) may use full MPD and/or an ATSC SDP. The normal broadcast network services do not use eMBMS MPD, AppSvc MPD and/or 3GPP SDP. The normal broadcast network services (ATSC services or DVB services) may describe and locate all components (ATSC components and/or DVB components) thereof.

Mobile broadcast network services (LTE broadcast services) may use eMBMS MPD (or AppSvc MPD) and/or 3GPP SDP. The mobile broadcast network services do not use full MPD and/or ATSC SDP. The mobile broadcast network services may describe and locate all components of 3GPP services.

Hybrid services (hybrid ATSC/3GPP services) may use full MPD, ATSC SDP and/or 3GPP SDP. The hybrid services may describe and locate all components (ATSC components, DVB components and 3GPP components) of normal broadcast network services (ATSC services or DBV services) and/or 3GPP services.

The following description is based on the hybrid services.

In addition, the following description is based on audio/video services according to an embodiment of the present invention. However, an ESG service may be designated by "ESG" service category. In addition, NTP time may be indicated in a "well-known" address present in at least one data pipe (or PLP). An embodiment of the present invention can include App enhancement signaling and/or EAS signaling.

A service according to an embodiment of the present invention may include at least one ROUTE session. The service may be transmitted through a transport path other than the ROUTE session. If a single service includes a single component of a single ROUTE session, the service can include all components of the ROUTE session.

The broadcast system according to the present embodiment of the present invention may include a content provider C410100, a broadcast transmission apparatus C410200, a second broadcast transmission apparatus C410300 and/or a broadcast reception apparatus C410500.

The content provider C410100 may provide services (or media content) to the broadcast transmission apparatus C410200 and/or the second broadcast transmission apparatus C410300.

The broadcast transmission apparatus C410200 may transmit a broadcast signal including a service using a normal broadcast network and/or the Internet. The service may include service data and/or signaling data. The broadcast transmission apparatus C410200 may include a first broadcast transmission apparatus C410210 using normal broadcast networks and/or a content service C410230 using the Internet. However, the first broadcast transmission apparatus C410210 and/or the content service C410230 may be included in the single broadcast transmission apparatus C410200 or may be separate apparatuses provided by separate users.

The first broadcast transmission apparatus C410210 may transmit a broadcast signal including a service using a normal broadcast network. The normal broadcast network may be referred to as an ATSC broadcast network and/or a DVB broadcast network. The normal broadcast network may include at least one of a satellite broadcast network, a terrestrial broadcast network and a cable broadcast network. The first broadcast transmission apparatus C410210 may include a controller (not shown) and/or a transmitter (not shown). The controller may generate service data and signaling data for a service. The transmitter may transmit a broadcast signal including the service data and/or the signaling data using at least one of normal broadcast networks.

The content server C410230 may transmit a service over the Internet at the request of the broadcast reception apparatus C410500.

The second broadcast transmission apparatus C410300 may transmit a broadcast signal including a service using a mobile broadcast network. The mobile broadcast network may be referred to as an LTE broadcast network, an LTE network or a mobile network, and the second broadcast transmission apparatus C410300 may deliver a service to a plurality of broadcast reception apparatuses C410500 using the mobile broadcast network. However, the second broadcast transmission apparatus C410300 may be provided separately from the broadcast transmission apparatus C410200 or included in the broadcast transmission apparatus C410200.

The broadcast reception apparatus C410500 may include a broadcast receiver C410510, an IP transceiver C410530 and/or a controller C410550. The broadcast reception apparatus C410500 may control the broadcast receiver C410510 and/or the IP transceiver C410530 using the controller C410550. The broadcast reception apparatus C410500 may receive a broadcast signal including a service through a mobile broadcast network and/or a normal broadcast network using the broadcast receiver C410510. Here, the broadcast signal may be transmitted using at least one of the mobile broadcast network and the normal broadcast network. Accordingly, the broadcast reception apparatus C410510 may include a mobile receiver for receiving broadcast signals, a satellite tuner, a terrestrial tuner and/or a cable tuner. The broadcast reception apparatus C410500 may request the content server C410230 to provide a service through the Internet using the IP transceiver C410530. The broadcast reception apparatus C410500 may receive a service from the content server over the Internet using the IP transceiver C410530.

FIG. 42 illustrates a configuration of signaling data according to a first embodiment of the present invention.

The signaling data according to the first embodiment of the present invention may include low level signaling data and/or service layer signaling data. The signaling data according to the first embodiment of the present invention is applicable even to a mobile environment.

According to the first embodiment of the present invention, SSC bootstrapping information may be transmitted through the low level signaling data. Signaling data associated with a service may be transmitted through USD and/or an SMT of the service layer signaling data.

According to the first embodiment of the present invention, since 3GPP signaling data is used as signaling data with respect to services transmitted over mobile broadcast networks (or LTE broadcast networks) and the Internet, the signaling data with respect to the services can maintain backward compatibility with mobile environments. In addition, signaling data with respect to services provided through normal broadcast networks (ATSC broadcast networks or DVB broadcast networks) can include an SMT, a CMT, full MPD and/or an ATSC SDP.

According to the first embodiment of the present invention, the signaling data includes signaling data with respect to 3GPP and extends signaling data associated with normal broadcast services (ATSC broadcast services or DVB broadcast services) which cannot be provided by 3GPP. In addition, the signaling data with respect to 3GPP can maintain backward compatibility in a mobile environment.

FIG. 42(a) shows low level signaling data according to the first embodiment of the present invention.

The low level signaling data is signaling information supporting bootstrapping of fast channel scan and service acquisition by a receiver. Bootstrapping of service acquisition may refer to a procedure for acquiring a service. Accordingly, information for bootstrapping may include path information for service acquisition. For example, the low level signaling data can include a fast information channel (FIC) and/or rating region description (RRD).

The FIC may be referred to as a service list table (SLT). The SLT can be used to form a basic service list and can provide bootstrap discovery of service layer signaling data. The SLT can include minimum information about a service. For example, the SLT can include service identifier information for identifying a service within the range of a specific broadcast area, service category information for indicating a service category and/or service name information for indicating a service name. For example, a service category can include at least one of a linear A/V service, a linear audio only service, an App-based service, an electronic service guide (ESG) service and an emergency alert service (EAS).

In addition, the SLT may include service layer signaling (SLS) bootstrapping information.

The SLS bootstrapping information may include service signaling channel (SSC) bootstrapping information for at least one service.

For example, an SSC can be a channel through which SLS and/or service layer signaling data are transmitted. The SSC bootstrapping information may include information for broadcast signaling. SSC bootstrapping may refer to a procedure for acquiring an SSC (or service layer signaling data). Accordingly, the SSC bootstrapping information may include path information for acquiring the service layer signaling data.

The SSC bootstrapping information may include an slsPlpId attribute which specifies the identifier (PLP_ID) of a physical layer pipe through which broadcast SLS (service layer signaling) data for a service is transmitted, an slsDestinationIpAddress attribute which specifies the dotted-IPv4 destination address of packets carrying the broadcast SLS data for the service, an slsDestinationUdpPort attribute which specifies the port number of the packets carrying the broadcast SLS data for the service and/or an slsSourceIpAddress attribute which specifies the dotted-IPv4 source address of the packets carrying the broadcast SLS data for the service.

The SLS bootstrapping information may include URL information for accessing Internet signaling for at least one service.

For example, the URL information can include a URL signaling table (UST) which indicates transport path information (or URL) of at least one signaling table. The UST may be included not only in service layer signaling data but also in low level signaling data. For example, when at least one signaling table can be used through broadband, the UST can include URLs for MPD, a CMT and/or an application signaling table (AST). The UST may include values referred to as an sltInetUrl element and/or an svcInetUrl element. The sltInetUrl element can indicate a URL for acquiring service level (or layer) signaling files for all services in the SLT, which can be used through a broadband network (or the Internet). The svcInetUrl element can indicate a URL for acquiring service level (or layer) signaling files for a specific service, which can be used through the broadband network (or the Internet).

The RRD may be referred to as a rating region table (RRT). The RRT may include rating system information about a specific area.

FIG. 42(b) shows service layer signaling data according to the first embodiment of the present invention.

The service layer signaling data may include information for discovery and/or acquisition of a service and/or at least one content component included in the service. For example, the service layer signaling data can include user service description (USD), AppSvc MPD, eMBMS MPD and/or 3GPP SDP. In addition, the service layer signaling data may include a service map table (SMT), a component map table (CMT), a URL signaling table (UST), rating region description (RRD), full MPD, an ATSC SDP and/or LSID. The USD, AppSvc MPD, eMBMS MPD and/or 3GPP SDP may be signaling data for mobile broadcast networks. The SMT, CMT, UST, RRD, full MPD, ATSC SDP and/or LSID may be signaling data for normal broadcast networks. For example, the SMT can be referred to as user service bundle description/user service description (USBD/USD). The USBD/USD is a kind of a service layer signaling (SLS) XML fragment serving as a signaling hub which describes details of technical information for services. In addition, the CMT, UST, RRD, ATSC SDP and/or LSID may be referred to as service-based transport session instance description (S-TSID). The S-TSID is a kind of an SLS XML fragment which provides session description information for at least one transport session through which at least one content component of a service is transmitted.

The USD may be multimedia broadcast/multicast service (MBMS) user service description of 3rd generation partnership project (3GPP). The USD may include transport path information for AppSvc MPD, eMBMS MPD and/or 3GPP SDP.

The AppSvc MPD may be dynamic adaptive streaming over HTTP (DASH) MPD for at least one 3GPP broadcast & unicast component.

The eMBMS MPD may be DASH MPD for at least one component transmitted through an evolved multimedia broadcast multicast system (eMBMS) bearer.

The 3GPP SDP may be an IETF session description protocol (SDP) for at least one eMBMS FLUTE session.

The SMT may include path information for acquiring attribute (ID, name, category, etc.) information of a service and the service. For example, the SMT can include transport path information for the full MPD and/or the ATSC SDP. The SMT may be ATSC extensions. In addition, the SMT may be replaced by SPD and/or service configuration description (SCD). The SCD may include a large amount of additional signaling information which is not included in the FIC. The SMT may be referred to as USBD/USD. The USBD/USD is a kind of an SLS XML fragment serving as a signaling hub which describes details of technical information for services.

The CMT may include information related to a component, such as component information (associated DASH representation information) for a service and a path through which the component can be acquired. For example, the CMT can include the identifier (DP ID or PLP ID) of a physical layer pipe through which component data for a service is transmitted.

The UST may include transport path information (or URL) of at least one signaling table. For example, when the at least one signaling table can be used through a broadband network, the UST can include URLs for MPD, CMT and/or application signaling table (AST).

The RRD may include rating system information about a specific area.

The full MPD may include DASH MPD with respect to all components of a service. For example, the full MPD can include DASH MPD with respect to all components transmitted through mobile broadcast networks, normal broadcast networks and/or the Internet. The DASH MPD may include formalized description of DASH media presentation. The DASH MPD may include resource identifiers for individual media components of linear/streaming services. In addition, the DASH MPD may include context of resources specified in media presentation. For example, a resource identifier can be information for identifying representation associated with a component for a service. For example, the resource identifier can have the form of a segment URL.

The ATSC SDP may include at least one ROUTE session element which provides information about at least one real-time object delivery over unidirectional transport (ROUTE) for a service and/or components included in the service. The ATSC SDP may be an IETF SDP for at least one ROUTE session. A ROUTE session element may include transport path information for a ROUTE session. For example, the ROUTE session element can include a bsid attribute which specifies the identifier of a broadcast stream through which a content component of a service is transmitted, an sIpAddr attribute which specifies the source IP address of the ROUTE session, a dIpAddr attribute which specifies the destination IP address of the ROUTE session, a dport attribute which specifies the destination port number of the ROUTE session and/or a PLPID attribute which specifies a physical layer parameter for the ROUTE session. The bsid attribute, sIPAddr attribute, dIpAddr attribute, dport attribute and/or PLPID attribute may be used as information on a path through which LSID is transmitted. The ATSC SDP may be included in S-TSID. The S-TSID is a kind of SLS XML fragment which provides session description information for at least one transport session through which at least one content component of a service is transmitted.

LCT session ID description (LSID) may include information for specifying a transport session through which a component of a service is transmitted. The LSID may be included in each ROUTE session. The LSID may be transmitted through a specific transport session in a ROUTE session. In addition, the LSID may include information about a layered coding transport (LCT) session included in a ROUTE session. For example, the LSID can include a tsi attribute which specifies a transport session through which a content component for a service is transmitted and/or a PLPID attribute which specifies the identifier of a physical layer pipe associated with the transport session through which the content component for the service is transmitted.

A broadcast reception apparatus according to an embodiment of the present invention can acquire a service on the basis of signaling data. Specifically, the broadcast reception apparatus can acquire low level signaling data and obtain service layer signaling data on the basis of the low level signaling data. Then, the broadcast reception apparatus can determine properties of a service using service layer signaling data (USD and/or SMT). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP, LSID and/or CMT).

FIG. 43 illustrates a service according to the first embodiment of the present invention.

FIG. 43(a) shows signaling data according to the first embodiment of the present invention. The signaling data may be transmitted by the first broadcast transmission apparatus. However, the present invention is not limited thereto and the signaling data may be transmitted by the second broadcast transmission apparatus and/or the content server.

The signaling data may include low level signaling data and/or service layer signaling data.

The low level signaling data may include information for bootstrap discovery of the service layer signaling data.

The service layer signaling data may include USD, AppSvc MPD, eMBMS MPD and/or 3GPP SDP. The USD, AppSvc MPD, eMBMS MPD and/or 3GPP SDP may be signaling data for mobile broadcast networks only.

The USD may include transport path information for the AppSvc MPD, eMBMS MPD and/or 3GPP SDP. In addition, the USD may include a deliveryMethod element which indicates a container of transport related information associated with service content transmitted through a broadcast access mode and/or a broadband access mode. The deliveryMethod element may include a broadcastAppService element and/or a unicastAppService element.

The broadcastAppService element may indicate DASH representation including media components corresponding to a service, which are transmitted through a mobile broadcast network, over all periods of affiliated media presentation. A basePattern element included in the broadcastAppService element may refer to segment URL information mapped to each component in MPD. For example, the broadcastAppService element can indicate "UHD video component" and the basePattern element can indicate "basePattern1".

The unicastAppService element may indicate DASH representation including configuration media content components belonging to the service, which are transmitted through a broadband network (Internet) over all periods of affiliated media presentation. The basePattern element included in the broadcastAppService element may refer to segment URL information mapped to each component in MPD. For example, the unicastAppService element can indicate a second audio component and the basePattern element can indicate "basePattern4".

The AppSvc MPD may include information about the second audio component having segment URL information of "basePattern4".

The eMBMS MPD may include information about a UHD video component having segment URL information of "basePattern1".

The service layer signaling data may include an SMT, a CMT, full MPD, an ATSC SDP and/or LSID. The SMT, CMT, full MPD, ATSC SDP and/or LSID may be signaling data for normal broadcast networks.

The SMT may include transport path information for the full MPD and/or the ATSC SDP. The SMT may include information about an HD video component and information about a first audio component.

The ATSC SDP may include information about at least one ROUTE session for a service and/or components included in the service.

The full MPD may include information about the UHD video component having segment URL information of "basePattern1". In addition, the full MPD may include information about the HD video component having representation ID information of "rep_id2". Furthermore, the full MPD may include information about the first audio component having representation ID information of "rep_id3". The full MPD may include information about the second audio component having segment URL information of "basePattern4".

The CMT may include a BroadcastComp element including mapping information of components transmitted through a normal broadcast network and/or a broadbandComp element including mapping information of components transmitted over the Internet. For example, the BroadcastComp element can include a first BroadcastComp element including mapping information of the HD video component transmitted through the normal broadcast network and/or a second BroadcsatComp element including mapping information of the first audio component transmitted through the normal broadcast network. Each of the first BroadcastComp element and the second BroadcastComp element may include a Rep_ID attribute which indicates a DASH representation identifier associated with the corresponding component and/or a DP_ID attribute which indicates the identifier of a data pipe (DP) (or PLP) through which the corresponding component data is transmitted in a broadcast stream. The Rep_ID attribute of the first BroadcastComp can indicate "rep_id2" and the DP_ID attribute of the first BroadcastComp can indicate can indicate "DP_id2". The Rep_ID attribute of the second BroadcastComp can indicate "rep_id3" and the DP_ID attribute of the second BroadcastComp can indicate "DP_id3".

The BroadbandComp element may include a reptnID attribute which indicates a DASH representation identifier associated with the corresponding component and/or a baseURL attribute which indicates a base URL of segments constituting DASH representation associated with the corresponding component. The baseURL attribute of the BroadbandComp element may indicate "basePattern4". That is, transport path information of the second audio component transmitted over the Internet can be "basePattern4".

The LSID can be acquired on the basis of information about ROUTE sessions.

Details of the signaling data correspond to the contents of the aforementioned signaling data.

Referring to FIG. 43(b), a broadcast transmission apparatus (broadcaster) C430200 according to the first embodiment of the present invention can transmit service data and/or signaling data for a service using a normal broadcast network and/or the Internet. For example, the broadcaster C430200 can transmit service data and/or signaling data for a service through a normal broadcast network using a first broadcast transmission apparatus (not shown). The broadcaster C430200 can transmit service data and/or signaling data for a service over the Internet using a content server (not shown). A second broadcast transmission apparatus (mobile carrier) C430300 can transmit service data and/or signaling data for a service using a mobile broadcast network (e.g. LTE broadcast).

The first broadcast transmission apparatus may transmit a video component and a first audio component of a base layer for a service using a normal broadcast network. For example, the video component of the base layer can be an HD video component. The HD video component can be matched to "Rep_id2" of MPD and the first audio component can be matched to "Rep_id3" of MPD. In addition, the HD video component and/or the first audio component can be transmitted through a predetermined data pipe (DP) and/or a physical layer pipe (PLP). For example, the predetermined DP has an identifier of "DP_id3".

The content server may transmit a second audio component for the service using the Internet. For example, information on the path through which the second audio component is transmitted can be "basePattern4".

The second broadcast transmission apparatus C430300 may transmit a video component of an enhanced layer for the service using a mobile broadcast network (LTE broadcast). For example, the video component of the enhanced layer can be a UHD video component. The video component of the enhanced layer may be additional information for generating UHD video. In addition, information on the path through which the UHD video component is transmitted can be "basePattern1".

A broadcast reception apparatus C430500 according to the first embodiment of the present invention may receive service data and/or signaling data for services. The broadcast reception apparatus C430500 can receive the HD video component and/or the first audio component from the broadcast transmission apparatus C430200 using a broadcast receiver. The broadcast reception apparatus C430500 can receive the second audio component from the broadcast transmission apparatus C430200 using an IP transceiver. The broadcast reception apparatus C430500 can receive the UHD video component from the second broadcast transmission apparatus C430300 using the broadcast receiver. The broadcast reception apparatus C430500 can acquire the HD video component, the first audio component, the second audio component and/or the UHD video component on the basis of the capability and environment thereof and decode and/or reproduce the acquired data.

FIG. 44 shows an SMT according to the first embodiment of the present invention.

The signaling data according to the first embodiment of the present invention may include low level signaling data and/or service layer signaling data. The service layer signaling data may include a service map table (SMT).

The SMT may include properties of a service and information on a path through which the service can be acquired. The SMT may be referred to as USBD/USD. The USBD/USD is a kind of a service layer signaling (SLS) XML fragment serving as a signaling hub which describes details of technical information for services.

The SMT may include a protocol_version attribute, a service_id attribute, a global_service_id attribute, a Full_MPD_URL attribute, an ATSC_SDP_URL attribute, a Capabilities attribute, a Targeting_info attribute, a Content_advisory attribute, a Program_title attribute, a Content_label attribute and/or an Original service id attribute.

The protocol_version attribute may indicate the protocol version of an SSC (service signaling channel or service layer signaling data). For example, the protocol_version attribute can include a major_protocol_version attribute which indicates the major version number of a protocol used to transmit an SSC (service signaling channel, S-TSID and/or service layer signaling data) for a service and/or a minor_protocol_version attribute which indicates the minor version number of the protocol.

The service_id attribute is a unique identifier for identifying a service. The service_id attribute may refer to a service entry corresponding to low level signaling data (LLS, FIC or SLT). The service_id attribute may have the same value as a service identifier (serviceID) allocated to the service entry corresponding to the low level signaling data (LLS, FIC or SLT).

The global_service_id attribute is a globally unique identifier used for service mapping between 3GPP USD and an ESG. The global_service_id attribute may have the same value as the service identifier (service_id) of the 3GPP USD and the service identifier (service_id) of the ESG. The global_service_id attribute is a globally unique uniform resource identifier (URI) for identifying a service. The global_service_id attribute is a unique value within the range of broadcast stream identifiers (BSID). In addition, the global_service_id attribute may be used to access ESG data.

The Full_MPD_URL attribute indicates information (URL information or URI information) referring to MPD including information about all content components of a service transmitted through at least one of a mobile broadcast network (LTE broadcast), the Internet (unicast) and a normal broadcast network (ATSC broadcast or DVB broadcast).

The ATSC_SDP_URL attribute refers to information (URL information nor URI information) indicating an SDP including information about a ROUTE session through which a service (ATSC service or a DVB service) is transmitted. The ATSC_SDP_URL attribute is information (URL information or URI information) which refers to S-TSID (or ATSC_SDP) which provides access related parameters with respect to transport sessions through which service content is delivered.

The Capabilities attribute refers to a descriptor which describes capability that a receiver needs to have in order to provide services. The Capabilities attribute may specify capabilities and/or capability groups necessary for the receiver to achieve meaningful reproduction of content of services.

The Targeting_info attribute may indicate a target device to which a service will be provided.

The Content_advisory attribute may refer to information about content advisory related to a provided service. The Content_advisory attribute may specify content advisory rating with respect to the provided service.

The Program_title attribute may refer to information about the title of a service. The Program_title attribute may indicate the name of a service in a specific language.

The Content_label attribute may refer to a content label of a service. The Content_label attribute may indicate the name of a component.

The Original service id attribute may refer to an ID assigned to the original service of a corresponding service.

FIG. 45 illustrates a configuration of signaling data according to a second embodiment of the present invention.

The signaling data according to the second embodiment may include low level signaling data and/or service layer signaling data. The signaling data according to the second embodiment of the present invention is applicable even to a mobile environment.

According to the second embodiment of the present invention, SSC bootstrapping information may be transmitted through the low level signaling data. Signaling data associated with a service and/or signaling data associated with a component can be transmitted through USD of the service layer signaling data.

The second embodiment of the present invention can provide a service signaling method for services transmitted through mobile broadcast networks (LTE broadcast), the Internet (unicast) and/or normal broadcast networks (ATSC broadcast or DVB broadcast) by extending 3GPP USD.

The second embodiment of the present invention provides a service signaling method without using a CMT which provides component location information from among ATSC signaling tables, by adding the ID (DP_ID or PLP_ID) of a data pipe (physical layer pipe) through which a component is delivered to an atscAppService element included in a USBD/USD/Delivery method.

The SSC bootstrapping information is transmitted through an FIC, and an SSC delivered through the SSC bootstrapping information includes USD.

A description will be given of USD extension according to the second embodiment of the present invention.

FIG. 45(a) illustrates the low level signaling data according to the second embodiment of the present invention.

The low level signaling data is signaling information supporting bootstrapping of fast channel scan and service acquisition by a receiver. For example, the low level signaling data can include a fast information channel (FIC) and/or rating region description (RRD).

The contents of the low level signaling data according to the second embodiment of the present invention can include the contents of the aforementioned low level signaling data.

FIG. 45(b) illustrates the service layer signaling data according to the second embodiment of the present invention.

The contents of the low level signaling data according to the second embodiment of the present invention can include the contents of the aforementioned low level signaling data. The following description is based on a difference between the low level signaling data according to the second embodiment of the present invention and the aforementioned low level signaling data.

The service layer signaling data may include user service description (USD), AppSvc MPD, eMBMS MPD and/or 3GPP SDP. In addition, the service layer signaling data may include full MPD, ATSC SDP and/or LSID. The AppSvc MPD, eMBMS MPD and/or 3GPP SDP may be signaling data for mobile broadcast networks. The USD, full MPD, ATSC SDP and/or LSID may be signaling data for normal broadcast networks.

The USBD/USD is a kind of a service layer signaling (SLS) XML fragment serving as a signaling hub which describes details of technical information for services.

The USD may include transport path information for the AppSvc MPD, eMBMS MPD and/or 3GPP SDP.

In addition, the USD may include a deliveryMethod element and/or an atscServiceDescription element.

The deliveryMethod element may include a broadcastAppService element for mobile broadcast networks, a unicastAppService element for the Internet and/or an atscAppService element for normal broadcast networks.

Each of the broadcastAppService element, unicastAppService element and/or atscAppService element may include a basePattern element. The basePattern element may refer to information about a segment URL to which each component is mapped in MPD.

The atscServiceDescription element may refer to DASH representation including configuration media content components belonging to a service, which are transmitted through a normal broadcast network (ATSC broadcast or DVB broadcast) over all periods of affiliated media presentation.

The atscServiceDescription element may include the ID (DP_ID or PLP_ID) of a physical layer pipe through which component data for a service is delivered.

The atscServiceDescription element may include information about a service transmitted through a normal broadcast network.

The atscServiceDescription element may include information about properties (ID, name, category and the like) of a service and information about a path through which the service can be acquired. For example, the atscServiceDescription element can include path information for the full MPD and/or ATSC SDP.

The full MPD may include DASH MPD with respect to all components of a service.

The ATSC SDP may include at least one ROUTE session element which provides information about at least one real-time object delivery over unidirectional transport (ROUTE) for a service and/or a component included in the service.

LCT session ID description (LSID) may include information for specifying a transport session through which a component for a service is transmitted. The LSID may include information about an LCT session included in a ROUTE session.

A broadcast reception apparatus according to the present embodiment may acquire a service on the basis of signaling data. Specifically, the broadcast reception apparatus may acquire low level signaling data and acquire service layer signaling data on the basis of the low level signaling data. Then, the broadcast reception apparatus may determine properties of a service using service layer signaling data (USD). Subsequently, the broadcast reception apparatus may select at least one component for the service using service layer signaling data (MPD). For example, the broadcast reception apparatus can select at least one component for the service using at least one representation ID of the MPD. Then, the broadcast reception apparatus may acquire information on a transport path through which the selected at least one component is transmitted using service layer signaling data (SDP and/or LSID).

FIG. 46 illustrates the USD according to the second embodiment of the present invention.

The extended USD according to the second embodiment of the present invention may include the atscServiceDescription element C460100 and/or atscAppService element C460200.

The atscServiceDescription element C460100 may include attributes of a service and/or information about a path through which the service can be acquired. The atscServiceDescription element C460100 may include a ProtocolVersion attribute, an atscServiceId attribute, a GlobalServiceId attribute, a FullmpdURL attribute, an atscSdpURL element, a CapabilityDescription element, a TargetingDescription element, a ContentAdvisoryDescription element, a ProgramTitleDescription element, a ContentLabelDescription element and/or an OriginalServiceId element.

The ProtocolVersion attribute corresponds to the aforementioned protocol_version attribute, the atscServiceId attribute corresponds to the aforementioned service_id attribute, the GlobalServiceId attribute corresponds to the aforementioned global_service_id attribute, the FullmpdURL attribute corresponds to the aforementioned Full_MPD attribute, the atscSdpURL element corresponds to the aforementioned ATSC_SDP_URL attribute, the CapabilityDescription element corresponds to the aforementioned Capabilities attribute, the TargetingDescription element corresponds to the aforementioned Targeting_info attribute, the ContentAdvisoryDescription element corresponds to the aforementioned content_advisory attribute, the ProgramTitleDescription element corresponds to the aforementioned Program_title attribute, the ContentLabelDescription element corresponds to the aforementioned Content_label attribute and the OriginalServiceId element corresponds to the aforementioned Original service id attribute.

Although "element" and "attribute" are used in the embodiments, functions thereof may be identical.

The atscServiceDescription element C460100 may be commonly used in the second, third and fourth embodiments of the present invention.

The atscAppService element C460200 may indicate DASH representation including configuration media content components belonging to a service, which are transmitted through a normal broadcast network (ATSC broadcast or DVB broadcast) over all periods of affiliated media presentation. The atscAppService element C460200 may include a basePattern attribute, a DP_ID attribute, a transportStreamID attribute, a partitionId attribute, a sourceIPaddress attribute, a destinationIPaddress attribute and/or a destinationPort attribute.

The basePattern attribute refers to segment URL information to which each component is mapped in MPD.

The DP_ID attribute refers to the ID of a data pipe (or physical layer pipe) through which a component is transmitted. The DP_ID attribute is the ID (DP_ID or PLP_ID) of a physical layer pipe through which component data for a service is transmitted.

The transportStreamID attribute indicates the ID of a broadcast stream including the corresponding component data.

The partitionId attribute indicates the ID of a partition indicating a broadcasting station in the corresponding broadcast stream.

The sourceIPaddress attribute indicates the source IP address of an IP datagram including the corresponding component data.

The destinationIPaddress attribute indicates the destination IP address of the IP datagram including the corresponding component data.

The destinationPort attribute indicates the destination UDP port number of the IP datagram including the corresponding component data.

The transportStreamID attribute, the partitionId attribute, the sourceIPaddress attribute and/or the destinationIPaddress attribute may provide component information transmitted through foreign ATSC broadcast.

Since the atscAppService element C460200 included in the USD contains the DP_ID attribute, the service layer signaling data according to the second embodiment of the present invention may not include the CMT.

FIG. 47 illustrates a service according to the second embodiment of the present invention.

FIG. 47(a) shows signaling data according to the second embodiment of the present invention. The signaling data may be transmitted by the first broadcast transmission apparatus. However, the present invention is not limited thereto and the signaling data may be transmitted by the second broadcast transmission apparatus and/or the content server.

The signaling data may include low level signaling data and/or service layer signaling data. The contents of the signaling data according to the second embodiment of the present invention may include the contents of the aforementioned signaling data. The following description is based on a difference between the signaling data according to the second embodiment of the present invention and the aforementioned signaling data.

The service layer signaling data may include USD, full MPD, ATSC SDP and/or LSID.

The USD may include transport path information for the full MPD and/or ATSC SDP.

The USD may include the broadcastAppService element for mobile broadcast networks, the unicastAppService element for the Internet and/or the atscAppService element C460200 for normal broadcast networks.

The broadcastAppService element may specify "UHD video component" and the basePattern element may specify "basePattern1".

The unicastAppService element may specify a second audio component and the basePattern element may specify "basePattern4".

The atscAppService element may include a first atscAppService element for an HD video component and a second atscAppService element for a first audio component. The first atscAppService element may indicate "HD video component", the basePattern attribute may indicate "basePattern2" and the DP_ID attribute may specify "DP_id3". The second atscAppService element may indicate "first audio component", the basePattern attribute may indicate "basePattern3" and the DP_ID attribute may specify "DP_id3".

The ATSC SDP may include information about at least one ROUTE session for a service and/or a component included in the service.

The full MPD may include information about the UHD video component having segment URL information of "basePattern1". In addition, the full MPD may include information about the HD video component having segment URL information (or representation ID information) of "basePattern2". Furthermore, the full MPD may include information about the first audio component having segment URL information (or representation ID information) of "basePattern3". The full MPD may include information about the second audio component having segment URL information of "basePattern4".

The LSID can be acquired on the basis of information about ROUTE sessions.

Referring to FIG. 47(b), a broadcast transmission apparatus (broadcaster) C470200 according to the second embodiment of the present invention may transmit service data and/or signaling data for services using normal broadcast networks and/or the Internet. For example, the broadcaster C470200 can transmit service data and/or signaling data for services through a normal broadcast network using a first broadcast transmission apparatus (not shown). The broadcaster C470200 can transmit service data and/or signaling data for services over the Internet using a content server (not shown). A second broadcast transmission apparatus (mobile carrier) C470300 can transmit service data and/or signaling data for services using a mobile broadcast network (e.g. LTE broadcast).

The first broadcast transmission apparatus may transmit a video component and a first audio component of a base layer for a service using a normal broadcast network. For example, the video component of the base layer can be an HD video component. Information about a path through which the HD video component is transmitted can be "basePattern2" and information about a path through which the first audio component is transmitted can be "basePattern3". In addition, the HD video component and/or the first audio component can be transmitted through a predetermined data pipe (DP) and/or a physical layer pipe (PLP). For example, the predetermined DP can have an identifier of "DP_id3".

The content server may transmit a second audio component for the service using the Internet. For example, information on the path through which the second audio component is transmitted can be "basePattern4".

The second broadcast transmission apparatus C470300 may transmit a video component of an enhanced layer for the service using a mobile broadcast network (LTE broadcast). For example, the video component of the enhanced layer can be a UHD video component. The video component of the enhanced layer may be additional information for generating UHD video. In addition, information on the path through which the UHD video component is transmitted can be "basePattern1".

A broadcast reception apparatus C470500 according to the second embodiment of the present invention may receive service data and/or signaling data for services. The broadcast reception apparatus C470500 may receive the HD video component and/or the first audio component from the broadcast transmission apparatus C470200 using a broadcast receiver. The broadcast reception apparatus C470500 may receive the second audio component from the broadcast transmission apparatus C470200 using an IP transceiver. The broadcast reception apparatus C470500 may receive the UHD video component from the second broadcast transmission apparatus C470300 using the broadcast receiver. The broadcast reception apparatus C470500 may acquire the HD video component, the first audio component, the second audio component and/or the UHD video component on the basis of the capabilities and environment thereof and decode and/or reproduce the acquired data.

FIG. 48 illustrates a configuration of signaling data according to a third embodiment of the present invention.

The signaling data according to the third embodiment may include low level signaling data and/or service layer signaling data. The signaling data according to the third embodiment of the present invention is applicable even to a mobile environment.

According to the third embodiment of the present invention, SSC bootstrapping information may be transmitted through the low level signaling data. Signaling data associated with a service may be transmitted through USD of the service layer signaling data and signaling data associated with a component may be transmitted through a CMT of the service layer signaling data.

The third embodiment of the present invention can provide a service signaling method for services transmitted through mobile broadcast networks (LTE broadcast), the Internet (unicast) and/or normal broadcast networks (ATSC broadcast or DVB broadcast) by extending 3GPP USD.

The SSC bootstrapping information is transmitted through an FIC and an SSC delivered through the SSC bootstrapping information includes USD.

A description will be given of USD extension according to the third embodiment of the present invention.

FIG. 48(a) illustrates the low level signaling data according to the third embodiment of the present invention.

The low level signaling data is signaling information supporting bootstrapping of fast channel scan and service acquisition by a receiver. For example, the low level signaling data can include a fast information channel (FIC) and/or rating region description (RRD).

The contents of the low level signaling data according to the third embodiment of the present invention can include the contents of the aforementioned low level signaling data.

FIG. 48(b) illustrates the service layer signaling data according to the third embodiment of the present invention.

The contents of the low level signaling data according to the third embodiment of the present invention can include the contents of the aforementioned low level signaling data. The following description is based on a difference between the low level signaling data according to the third embodiment of the present invention and the aforementioned low level signaling data.

The service layer signaling data may include USD, AppSvc MPD, eMBMS MPD and/or 3GPP SDP. In addition, the service layer signaling data may include full MPD, ATSC SDP, CMT and/or LSID. The AppSvc MPD, eMBMS MPD and/or 3GPP SDP may be signaling data for mobile broadcast networks. The USD, full MPD, ATSC SDP, CMT and/or LSID may be signaling data for normal broadcast networks.

The USD may include a deliveryMethod element and/or an atscServiceDescription element.

The deliveryMethod element may include a broadcastAppService element for mobile broadcast networks, a unicastAppService element for the Internet and/or an atscAppService element for normal broadcast networks.

Each of the broadcastAppService element, unicastAppService element and/or atscAppService element may include a basePattern element. The basePattern element may refer to information about a segment URL to which each component is mapped in MPD.

The CMT may include component related information such as component information (associated DASH representation information) for a service and a path through which the corresponding component can be acquired.

For example, the CMT can include a basePattern element which refers to segment URL information to which each component is mapped in MPD.

In addition, the CMT may include the ID (DP ID or PLP ID) of a physical layer pipe (data pipe) through which component data for the service is transmitted.

A broadcast reception apparatus according to the third embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using the service layer signaling data (SDP, CMT and/or LSID).

FIG. 49 illustrates the USD according to the third embodiment of the present invention.

The extended USD according to the third embodiment of the present invention may include the atscServiceDescription element C490100 and/or atscAppService element C490200.

The atscServiceDescription element C490100 may include attributes of a service and/or information about a path through which the service can be acquired. The atscServiceDescription element C490100 may include a ProtocolVersion attribute, an atscServiceId attribute, a GlobalServiceId attribute, a FullMpdURL attribute, an atscSdpURL element, a CapabilityDescription element, a TargetingDescription element, a ContentAdvisoryDescription element, a ProgramTitleDescription element, a ContentLabelDescription element and/or an OriginalServiceId element.

The contents of the atscServiceDescription element C490100 according to the third embodiment of the present invention can include the contents of the aforementioned atscServiceDescription element.

The atscAppService element C490200 may indicate DASH representation including configuration media content components belonging to a service, which are transmitted through a normal broadcast network (ATSC broadcast or DVB broadcast) over all periods of affiliated media presentation. The atscAppService element C490200 may include a basePattern attribute, a transportStreamID attribute, a partitionId attribute, a sourceIPaddress attribute, a destinationIPaddress attribute and/or a destinationPort attribute.

The contents of the atscAppService element C490200 according to the third embodiment of the present invention can include the contents of the aforementioned atscAppService element.

The atscAppService element C490200 may further include a Rep_id attribute. The Rep_id attribute refers to representation ID information to which each component is mapped in MPD.

According to the third embodiment of the present invention, the ID (DP_ID attribute or PLP_ID attribute) of a physical layer pipe (data pipe) through which component data for a service is transmitted may be included in the CMT instead of the atscAppService element C490200.

FIG. 50 illustrates a service according to the third embodiment of the present invention.

FIG. 50(a) shows signaling data according to the third embodiment of the present invention. The signaling data may be transmitted by the first broadcast transmission apparatus. However, the present invention is not limited thereto and the signaling data may be transmitted by the second broadcast transmission apparatus and/or the content server.

The signaling data may include low level signaling data and/or service layer signaling data. The contents of the signaling data according to the third embodiment of the present invention may include the contents of the aforementioned signaling data. The following description is based on a difference between the signaling data according to the second embodiment of the present invention and the aforementioned signaling data.

The service layer signaling data may include USD, full MPD, ATSC SDP, LSID and/or CMT.

The USD may include transport path information for the full MPD and/or ATSC SDP.

The USD may include the broadcastAppService element for mobile broadcast networks, the unicastAppService element for the Internet and/or the atscAppService element for normal broadcast networks.

The broadcastAppService element may specify "UHD video component" and the basePattern element may specify "basePattern1".

The unicastAppService element may specify a second audio component and the basePattern element may specify "basePattern4".

The atscAppService element may include a first atscAppService element for an HD video component and a second atscAppService element for a first audio component. The first atscAppService element may indicate "HD video component", the basePattern attribute may indicate "basePattern2" and the DP_ID attribute may specify "DP_id3". The second atscAppService element may indicate "first audio component", the basePattern attribute may indicate "basePattern3" and the DP_ID attribute may specify "DP_id3".

The ATSC SDP may include information about at least one ROUTE session for a service and/or a component included in the service.

The full MPD may include information about the UHD video component having segment URL information of "basePattern1". In addition, the full MPD may include information about the HD video component having segment URL information (or representation ID information) of "basePattern2". Furthermore, the full MPD may include information about the first audio component having segment URL information (or representation ID information) of "basePattern3". The full MPD may include information about the second audio component having segment URL information of "basePattern4".

The LSID may be acquired on the basis of information about ROUTE sessions.

The CMT may include a BroadcastComp element containing mapping information of components transmitted through a broadcast network. For example, the BroadcastComp element can include a first BroadcastComp element containing mapping information of the HD video component transmitted through the broadcast network and/or a second BroadcastComp element containing mapping information of the first audio component transmitted through the broadcast network. Each of the first BroadcastComp element and the second BroadcastComp element may include a Rep_ID attribute which indicates a DASH representation ID associated with the corresponding component and/or a DP_ID attribute which indicates the ID of a DP (or PLP) through which the corresponding component data is transmitted in the corresponding broadcast stream. The Rep_ID attribute of the first BroadcastComp element may indicate "rep_id2" and the DP_ID attribute thereof may indicate "DP_id2". The Rep_ID attribute of the second BroadcastComp element may indicate "rep_id3" and the DP_ID attribute thereof may indicate "DP_id3".

Referring to FIG. 50(b), a broadcast transmission apparatus (broadcaster) C500200 according to the third embodiment of the present invention may transmit service data and/or signaling data for services using normal broadcast networks and/or the Internet. For example, the broadcaster C500200 can transmit service data and/or signaling data for services through a normal broadcast network using a first broadcast transmission apparatus (not shown). The broadcaster C500200 can transmit service data and/or signaling data for services over the Internet using a content server (not shown). A second broadcast transmission apparatus (mobile carrier) C500300 may transmit service data and/or signaling data for services using a mobile broadcast network (e.g. LTE broadcast).

The first broadcast transmission apparatus may transmit a video component and a first audio component of a base layer for a service using a normal broadcast network. For example, the video component of the base layer can be an HD video component. Information about a path through which the HD video component is transmitted can be "basePattern2" and information about a path through which the first audio component is transmitted can be "basePattern3". In addition, the HD video component and/or the first audio component can be transmitted through a predetermined data pipe (DP) and/or a physical layer pipe (PLP). For example, the predetermined DP has an identifier of "DP_id3".

The content server may transmit a second audio component for the service using the Internet. For example, information on the path through which the second audio component is transmitted can be "basePattern4".

The second broadcast transmission apparatus C500300 may transmit a video component of an enhanced layer for the service using a mobile broadcast network (LTE broadcast). For example, the video component of the enhanced layer can be a UHD video component. The video component of the enhanced layer may be additional information for generating UHD video. In addition, information on the path through which the UHD video component is transmitted may be "basePattern1".

A broadcast reception apparatus C500500 according to the third embodiment of the present invention may receive service data and/or signaling data for services. The broadcast reception apparatus C500500 may receive the HD video component and/or the first audio component from the broadcast transmission apparatus C500200 using a broadcast receiver. The broadcast reception apparatus C500500 may receive the second audio component from the broadcast transmission apparatus C500200 using an IP transceiver. The broadcast reception apparatus C500500 may receive the UHD video component from the second broadcast transmission apparatus C500300 using the broadcast receiver. The broadcast reception apparatus C500500 may acquire the HD video component, the first audio component, the second audio component and/or the UHD video component on the basis of the capability and environment thereof and decode and/or reproduce the acquired data.

The broadcast reception apparatus C500500 according to the third embodiment of the present invention may acquire the HD video component and/or the first audio component on the basis of the CMT including mapping information of components transmitted through a broadcast network.

FIG. 51 illustrates a configuration of signaling data according to a fourth embodiment of the present invention.

The signaling data according to the fourth embodiment may include low level signaling data and/or service layer signaling data. The signaling data according to the fourth embodiment of the present invention is applicable even to a mobile environment.

According to the fourth embodiment of the present invention, SSC bootstrapping information may be transmitted through the low level signaling data. Signaling data associated with a service may be transmitted through USD of the service layer signaling data and signaling data associated with a component may be transmitted through a CMT of the service layer signaling data.

The fourth embodiment of the present invention can provide a service signaling method for services transmitted through mobile broadcast networks (LTE broadcast), the Internet (unicast) and/or normal broadcast networks (ATSC broadcast or DVB broadcast) by extending 3GPP USD.

The SSC bootstrapping information is transmitted through an FIC and an SSC delivered through the SSC bootstrapping information includes USD.

A description will be given of USD extension according to the fourth embodiment of the present invention.

FIG. 51(a) illustrates the low level signaling data according to the fourth embodiment of the present invention.

The low level signaling data is signaling information supporting bootstrapping of fast channel scan and service acquisition by a receiver. For example, the low level signaling data can include a fast information channel (FIC) and/or rating region description (RRD).

The contents of the low level signaling data according to the fourth embodiment of the present invention can include the contents of the aforementioned low level signaling data.

FIG. 51(b) illustrates the service layer signaling data according to the fourth embodiment of the present invention.

The contents of the low level signaling data according to the fourth embodiment of the present invention can include the contents of the aforementioned low level signaling data. The following description is based on a difference between the low level signaling data according to the third embodiment of the present invention and the aforementioned low level signaling data.

The service layer signaling data may include USD, AppSvc MPD, eMBMS MPD and/or 3GPP SDP. In addition, the service layer signaling data may include full MPD, ATSC SDP, CMT and/or LSID. The AppSvc MPD, eMBMS MPD and/or 3GPP SDP may be signaling data for mobile broadcast networks. The USD, full MPD, ATSC SDP, CMT and/or LSID may be signaling data for normal broadcast networks.

The USD may include a deliveryMethod element and/or an atscServiceDescription element.

The deliveryMethod element may include a broadcastAppService element for mobile broadcast networks, a unicastAppService element for the Internet and/or an atscAppService element for normal broadcast networks.

Each of the broadcastAppService element and/or the unicastAppService element may include a basePattern element. The basePattern element may refer to information about a segment URL to which each component is mapped in MPD.

The atscAppService element may include a Rep_ID attribute which indicates the ID of DASH representation associated with the corresponding component in MPD.

The CMT may include component related information such as component information (associated DASH representation information) for a service and a path through which the corresponding component can be acquired.

For example, the CMT can include a Rep_ID attribute which indicates the ID of DASH representation associated with the corresponding component in MPD.

In addition, the CMT may include the ID (DP ID attribute or PLP ID attribute) of a physical layer pipe (data pipe) through which component data for a service is transmitted.

A broadcast reception apparatus according to the fourth embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP, CMT and/or LSID).

FIG. 52 illustrates a service according to the fourth embodiment of the present invention.

FIG. 52(a) shows signaling data according to the fourth embodiment of the present invention. The signaling data may be transmitted by the first broadcast transmission apparatus. However, the present invention is not limited thereto and the signaling data may be transmitted by the second broadcast transmission apparatus and/or the content server.

The signaling data may include low level signaling data and/or service layer signaling data. The contents of the signaling data according to the fourth embodiment of the present invention may include the contents of the aforementioned signaling data. The following description is based on a difference between the signaling data according to the fourth embodiment of the present invention and the aforementioned signaling data.

The service layer signaling data may include USD, full MPD, ATSC SDP, LSID and/or CMT.

The USD may include transport path information for the full MPD and/or ATSC SDP.

The USD may include the broadcastAppService element for mobile broadcast networks, the unicastAppService element for the Internet and/or the atscAppService element for normal broadcast networks.

The broadcastAppService element may specify "UHD video component" and the basePattern element may specify "basePattern1".

The unicastAppService element may specify a second audio component and the basePattern element may specify "basePattern4".

The atscAppService element may include a first atscAppService element for an HD video component and a second atscAppService element for a first audio component.

Each of the first atscAppService element and/or the second atscAppService element may include a Rep_ID attribute which indicates a DASH representation ID associated with the corresponding component and/or a CMT_URL attribute which indicates a CMT transport path.

The first atscAppService element may indicate "HD video component" and the Rep_ID attribute may indicate "rep_id2". The second atscAppService element may indicate "first audio component" and the Rep_ID attribute may indicate "rep_id3".

The ATSC SDP may include information about at least one ROUTE session for a service and/or a component included in the service.

The full MPD may include information about the UHD video component having segment URL information of "basePattern1". In addition, the full MPD may include information about the HD video component having representation ID information of "rep_id2". Furthermore, the full MPD may include information about the first audio component having representation ID information) of "rep_id3". The full MPD may include information about the second audio component having segment URL information of "basePattern4".

The LSID may be acquired on the basis of information about a ROUTE session.

The CMT may include a BroadcastComp element containing mapping information of components transmitted through a broadcast network. For example, the BroadcastComp element can include a first BroadcastComp element containing mapping information of the HD video component transmitted through the broadcast network and/or a second BroadcastComp element containing mapping information of the first audio component transmitted through the broadcast network. Each of the first BroadcastComp element and the second BroadcastComp element may include a Rep_ID attribute which indicates a DASH representation ID associated with the corresponding component and/or a DP_ID attribute which indicates the ID of a DP (or PLP) through which the corresponding component data is transmitted in a broadcast stream. The Rep_ID attribute of the first BroadcastComp element may indicate "rep_id2" and the DP_ID attribute thereof may indicate "DP_id2". The Rep_ID attribute of the second BroadcastComp element may indicate "rep_id3" and the DP_ID attribute thereof may indicate "DP_id3".

Referring to FIG. 52(b), a broadcast transmission apparatus (broadcaster) C520200 according to the fourth embodiment of the present invention may transmit service data and/or signaling data for services using normal broadcast networks and/or the Internet. For example, the broadcaster C520200 can transmit service data and/or signaling data for services through a normal broadcast network using a first broadcast transmission apparatus (not shown). The broadcaster C520200 may transmit service data and/or signaling data for services over the Internet using a content server (not shown). A second broadcast transmission apparatus (mobile carrier) C520300 may transmit service data and/or signaling data for services using a mobile broadcast network (e.g. LTE broadcast).

The first broadcast transmission apparatus may transmit a video component and a first audio component of a base layer for a service using a normal broadcast network. For example, the video component of the base layer can be an HD video component. The HD video component can be matched to "Rep_id2" of MPD and the first audio component can be matched to "Rep_id3" of the MOD. In addition, the HD video component and/or the first audio component can be transmitted through a predetermined DP and/or a PLP. For example, the predetermined DP has an identifier of "DP_id3".

The content server may transmit a second audio component for the service using the Internet. For example, information on the path through which the second audio component is transmitted can be "basePattern4".

The second broadcast transmission apparatus C520300 may transmit a video component of an enhanced layer for the service using a mobile broadcast network (LTE broadcast). For example, the video component of the enhanced layer can be a UHD video component. The video component of the enhanced layer may be additional information for generating UHD video. In addition, information on the path through which the UHD video component is transmitted can be "basePattern1".

A broadcast reception apparatus C520500 according to the fourth embodiment of the present invention may receive service data and/or signaling data for services. The broadcast reception apparatus C520500 may receive the HD video component and/or the first audio component from the broadcast transmission apparatus C520200 using a broadcast receiver. The broadcast reception apparatus C520500 may receive the second audio component from the broadcast transmission apparatus C520200 using an IP transceiver. The broadcast reception apparatus C520500 may receive the UHD video component from the second broadcast transmission apparatus C520300 using the broadcast receiver. The broadcast reception apparatus C520500 may acquire the HD video component, the first audio component, the second audio component and/or the UHD video component on the basis of the capability and environment thereof and decode and/or reproduce the acquired data.

The broadcast reception apparatus C520500 according to the fourth embodiment of the present invention may acquire the HD video component and/or the first audio component on the basis of the CMT including mapping information of components transmitted through a broadcast network.

FIG. 53 illustrates a configuration of signaling data according to a fifth embodiment of the present invention.

The signaling data according to the fifth embodiment may include low level signaling data and/or service layer signaling data. The signaling data according to the fifth embodiment of the present invention is applicable even to a mobile environment.

According to the fifth embodiment of the present invention, SSC bootstrapping information may be transmitted through the low level signaling data. Signaling data associated with a service may be transmitted through USD of the service layer signaling data and signaling data associated with components transmitted through all networks may be transmitted through a CMT of the service layer signaling data.

The fifth embodiment of the present invention can provide a service signaling method for services transmitted through mobile broadcast networks (LTE broadcast), the Internet (unicast) and/or normal broadcast networks (ATSC broadcast or DVB broadcast) by extending the CMT.

The SSC bootstrapping information is transmitted through an FIC and an SSC delivered through the SSC bootstrapping information includes USD.

A description will be given of CMT extension according to the fifth embodiment of the present invention.

FIG. 53(a) illustrates the low level signaling data according to the fifth embodiment of the present invention.

The low level signaling data is signaling information supporting bootstrapping of fast channel scan and service acquisition by a receiver. For example, the low level signaling data can include a fast information channel (FIC) and/or rating region description (RRD).

The contents of the low level signaling data according to the fifth embodiment of the present invention can include the contents of the aforementioned low level signaling data.

FIG. 53(b) illustrates the service layer signaling data according to the fifth embodiment of the present invention.

The contents of the low level signaling data according to the fifth embodiment of the present invention can include the contents of the aforementioned low level signaling data. The following description is based on a difference between the low level signaling data according to the fifth embodiment of the present invention and the aforementioned low level signaling data.

The service layer signaling data may include USD, full MPD, ATSC SDP, CMT and/or LSID. The USD, full MPD, ATSC SDP, CMT and/or LSID may be signaling data for normal broadcast networks.

The CMT may include component related information such as component information (associated DASH representation information) for a service and a path through which the corresponding component can be acquired.

The CMT may include a BroadcastComp element containing information associated with a component transmitted through a normal broadcast network (ATST broadcast or DVB broadcast), a BBComp element containing information associated with a component transmitted over the Internet and/or an eMBMSComp element containing information associated with a component transmitted through a mobile broadcast network (LTE broadcast).

Each of the BroadcastComp element, the BBComp element and/or the eMBMSComp element may include a Rep_ID attribute which indicates the ID of DASH representation associated with the corresponding component.

In addition, each of the BroadcastComp element, the BBComp element and/or the eMBMSComp element may include a DP_ID attribute (or PLP_ID attribute) which indicates the ID of a physical layer pipe (data pipe) through which component data for a service is transmitted.

A broadcast reception apparatus according to the fifth embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP, CMT and/or LSID).

FIG. 54 illustrates a service according to the fifth embodiment of the present invention.

FIG. 54(a) shows signaling data according to the fifth embodiment of the present invention. The signaling data may be transmitted by the first broadcast transmission apparatus. However, the present invention is not limited thereto and the signaling data may be transmitted by the second broadcast transmission apparatus and/or the content server.

The signaling data may include low level signaling data and/or service layer signaling data. The contents of the signaling data according to the fifth embodiment of the present invention may include the contents of the aforementioned signaling data. The following description is based on a difference between the signaling data according to the fifth embodiment of the present invention and the aforementioned signaling data.

The service layer signaling data may include USD, full MPD, ATSC SDP, LSID and/or CMT.

The USD may include transport path information for the full MPD and/or ATSC SDP.

The USD may include the broadcastAppService element for mobile broadcast networks, the unicastAppService element for the Internet and/or the atscAppService element for normal broadcast networks.

The broadcastAppService element may specify "UHD video component". The unicastAppService element may specify a second audio component. The atscAppService element may include a first atscAppService element for an HD video component and a second atscAppService element for a first audio component. The first atscAppService element may indicate "HD video component". The second atscAppService element may indicate "first audio component".

The ATSC SDP may include information about at least one ROUTE session for a service and/or a component included in the service.

The full MPD may include information about the UHD video component having representation ID information of "rep_id1". In addition, the full MPD may include information about the HD video component having representation ID information of "rep_id2". Furthermore, the full MPD may include information about the first audio component having representation ID information) of "rep_id3". The full MPD may include information about the second audio component having representation ID information of "rep_id4".

The LSID may be acquired on the basis of information about ROUTE sessions.

The CMT may include a BroadcastComp element containing information related to a component transmitted through a normal broadcast network (ATSC broadcast or DVB broadcast), a BBComp element containing information associated with a component transmitted over the Internet and/or an eMBMSComp element containing information associated with a component transmitted through a mobile broadcast network (LTE broadcast).

For example, the BroadcastComp element can include a first BroadcastComp element containing mapping information of the HD video component transmitted through a normal broadcast network and/or a second BroadcastComp element containing mapping information of the first audio component transmitted through the normal broadcast network. Each of the first BroadcastComp element and the second BroadcastComp element may include a Rep_ID attribute which indicates a DASH representation ID associated with the corresponding component and/or a DP_ID attribute which indicates the ID of a DP (or PLP) through which the corresponding component data is transmitted in a broadcast stream. The Rep_ID attribute of the first BroadcastComp element may indicate "rep_id2" and the DP_ID attribute thereof may indicate "DP_id2". The Rep_ID attribute of the second BroadcastComp element may indicate "rep_id3" and the DP_ID attribute thereof may indicate "DP_id3".

The BBComp element may include mapping information of the second audio component transmitted over the Internet (unicast). The Rep_ID attribute of the BBComp element may indicate "rep_id4".

The eMBMSComp element may include mapping information of the UHD video component transmitted through a mobile broadcast network (LTE broadcast). The Rep_ID attribute of the eMBMSComp element may indicate "rep_id1".

Referring to FIG. 54(b), a broadcast transmission apparatus (broadcaster) C540200 according to the fifth embodiment of the present invention may transmit service data and/or signaling data for services using normal broadcast networks and/or the Internet. For example, the broadcaster C540200 can transmit service data and/or signaling data for services through a normal broadcast network using a first broadcast transmission apparatus (not shown). The broadcaster C540200 may transmit service data and/or signaling data for services over the Internet using a content server (not shown). A second broadcast transmission apparatus (mobile carrier) C540300 may transmit service data and/or signaling data for services using a mobile broadcast network (e.g. LTE broadcast).

The first broadcast transmission apparatus may transmit a video component and a first audio component of a base layer for a service using a normal broadcast network. For example, the video component of the base layer can be an HD video component. The HD video component can be matched to "Rep_id2" of MPD and the first audio component can be matched to "Rep_id3" of the MOD. In addition, the HD video component and/or the first audio component can be transmitted through a predetermined DP and/or a PLP. For example, the predetermined DP has an identifier of "DP_id3".

The content server may transmit a second audio component for the service using the Internet. For example, the second audio component can be matched to "Rep_id4" of MPD.

The second broadcast transmission apparatus C540300 may transmit a video component of an enhanced layer for the service using a mobile broadcast network (LTE broadcast). For example, the video component of the enhanced layer can be a UHD video component. The video component of the enhanced layer may be additional information for generating UHD video. In addition, the UHD video component can be matched to "Rep_id1" of the MPD.

A broadcast reception apparatus C540500 according to the fifth embodiment of the present invention may receive service data and/or signaling data for services. The broadcast reception apparatus C540500 may receive the HD video component and/or the first audio component from the broadcast transmission apparatus C540200 using a broadcast receiver. The broadcast reception apparatus C540500 may receive the second audio component from the broadcast transmission apparatus C540200 using an IP transceiver. The broadcast reception apparatus C540500 may receive the UHD video component from the second broadcast transmission apparatus C540300 using the broadcast receiver. The broadcast reception apparatus C540500 may acquire the HD video component, the first audio component, the second audio component and/or the UHD video component on the basis of the capability and environment thereof and decode and/or reproduce the acquired data.

The broadcast reception apparatus C540500 according to the fifth embodiment of the present invention may acquire the HD video component, the first audio component, the second audio component and/or the UHD video component on the basis of the CMT including mapping information of components transmitted through a broadcast network, and decode/reproduce the acquired data.

FIG. 55 illustrates a configuration of signaling data according to a sixth embodiment of the present invention.

The signaling data according to the sixth embodiment may include low level signaling data and/or service layer signaling data. The signaling data according to the sixth embodiment of the present invention is applicable even to a mobile environment.

According to the sixth embodiment of the present invention, SSC bootstrapping information may be transmitted through the low level signaling data. Signaling data associated with a service may be transmitted through USD of the service layer signaling data and signaling data associated with a component may be transmitted through a CMT of the service layer signaling data.

The sixth embodiment of the present invention can provide a service signaling method for services transmitted through mobile broadcast networks (LTE broadcast), the Internet (unicast) and/or normal broadcast networks (ATSC broadcast or DVB broadcast) by extending 3GPP SDP.

The SSC bootstrapping information is transmitted through an FIC and an SSC delivered through the SSC bootstrapping information includes USD.

A description will be given of SDP extension according to the sixth embodiment of the present invention.

FIG. 55(a) illustrates the low level signaling data according to the sixth embodiment of the present invention.

The low level signaling data is signaling information supporting bootstrapping of fast channel scan and service acquisition by a receiver. For example, the low level signaling data can include an FIC and/or RRD.

The contents of the low level signaling data according to the sixth embodiment of the present invention can include the contents of the aforementioned low level signaling data.

FIG. 55(b) illustrates the service layer signaling data according to the sixth embodiment of the present invention.

The contents of the low level signaling data according to the sixth embodiment of the present invention can include the contents of the aforementioned low level signaling data.

The following description is based on a difference between the low level signaling data according to the sixth embodiment of the present invention and the aforementioned low level signaling data.

The service layer signaling data may include USD, AppSvc MPD, eMBMS MPD and/or 3GPP SDP. In addition, the service layer signaling data may include SDP, CMT and/or LSID. The AppSvc MPD, eMBMS MPD, 3GPP SDP, SDP, CMT and/or LSID may be signaling data for normal broadcast networks and the Internet as well as mobile broadcast networks.

The USD may include path information for the AppAvc MPD, eMBMS MPD and/or 3GPP SDP.

The 3GPP SDP may include at least one ROUTE session element which provides information about at least one ROUTE for a service and/or a component included in the service. The ROUTE session element may include transport path information for a ROUTE session. For example, the ROUTE session element can include a bsid attribute which indicates the ID of a broadcast stream through which a content component of the service is transmitted, an sIpAddr attribute which indicates the source IP address of the ROUTE session, a dIpAddr attribute which indicates the destination IP address of the ROUTE session, a dport attribute which indicates the destination port number of the ROUTE session and/or a PLPID attribute which indicates a physical layer parameter for the ROUTE session. The bsid attribute, sIpAddr attribute, dIpAddr attribute, dport attribute and/or PLPID attribute can be used as information on a transport path through which LSID is transmitted.

In addition, the 3GPP SDP may include at least one LCT session element which provides information about at least one LCT session for a service and/or a component included in the service. For reference, a ROUTE session can include at least one LCT session. For example, the LCT session element can include a tsi attribute which indicates the ID of the corresponding LCT session and/or a PLPID attribute which indicates a physical layer parameter for the corresponding LCT session.

The CMT may include component related information such as component information (associated DASH representation information) for a service and a path through which the corresponding component can be acquired.

For example, the CMT can include the ID (DP ID attribute or PLP ID attribute) of a physical layer pipe (data pipe) through which component data for a service is transmitted.

The LSID may include information for specifying a transport session through which a component for a service is transmitted. The LSID may be included in each ROUTE session. The LSID may be transmitted through a specific transport session in the corresponding ROUTE session. In addition, the LSID may include information about an LCT session included in the ROUTE session. For example, the LSID can include a tsi attribute which specifies a transport session through which a content component for a service is transmitted.

The SPD (or service configuration description (SCD)) may include a variety of additional signaling information which is not included in the low level signaling data (or FIC).

A broadcast reception apparatus according to the sixth embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD and/or SPD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP, CMT and/or LSID).

The broadcast reception apparatus according to the sixth embodiment of the present invention may acquire transport path information of at least one component using the LSID, CMT and/or SDP (ROUTE session element).

In addition, the broadcast reception apparatus according to the sixth embodiment of the present invention may acquire transport path information of at least one component using the LSID and/or SDP (LCT session element). In this case, the tsi attribute which specifies an LCT session may be present in both the LSID and SDP (LCT session element). In addition, the broadcast reception apparatus may acquire the transport path information of the at least one component without using the CMT.

FIG. 56 illustrates effects of signaling according to the first to sixth embodiments of the present invention.

The first embodiment of the present invention can achieve separate signaling for mobile broadcast networks (3GPP) and normal broadcast networks (ATSC or DVB). In addition, signaling according to the first embodiment of the present invention can have extensibility. However, signaling according to the first embodiment of the present invention may be duplication for components transmitted over the Internet. Furthermore, the structure of signaling according to the first embodiment has complexity.

Signaling according to the second embodiment of the present invention does not require the CMT. In addition, signaling according to the second embodiment of the present invention has a less complex structure than signaling according to the first embodiment of the present invention. Furthermore, the second embodiment of the present invention can achieve separate signaling for mobile broadcast networks (3GPP) and normal broadcast networks (ATSC or DVB) using the extended USD. However, signaling according to the second embodiment of the present invention may cause eMBMS signaling layering violation.

Signaling according to the third and fourth embodiments of the present invention does not cause layering violation for USD extension. In addition, the third and fourth embodiments of the present invention can achieve separate signaling for mobile broadcast networks (3GPP) and normal broadcast networks (ATSC or DVB) using the extended USD. However, in the signaling according to the third and fourth embodiments of the present invention, an optional attribute should be used in the CMT.

Signaling according to the fifth embodiment of the present invention has simplest structure. In addition, signaling according to the fifth embodiment of the present invention does not cause layering violation.

Signaling according to the sixth embodiment of the present invention can have extensibility since the signaling uses the extended SPD. However, signaling according to the sixth embodiment of the present invention may have a complex structure.

Figure 57:
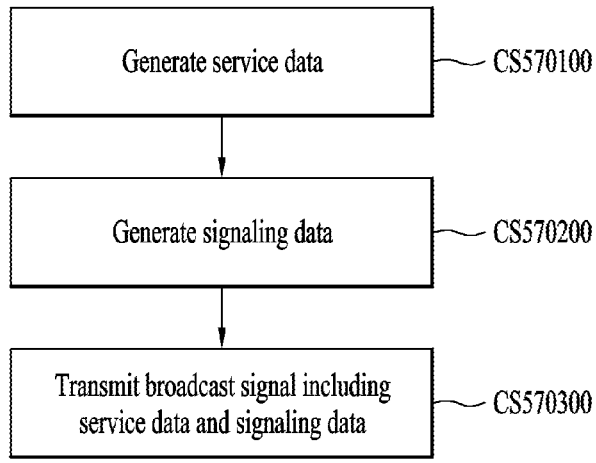
FIG. 57 is a flowchart illustrating a broadcast transmission method according to an embodiment of the present invention.

FIG. 57 is a flowchart illustrating a broadcast transmission method according to an embodiment of the present invention.

A broadcast transmission apparatus may generate service data for a service using a controller (not shown) (CS570100).

The broadcast transmission apparatus may generate service layer signaling data using the controller (CS570200).

The broadcast transmission apparatus may transmit a broadcast signal including the service data and the service layer signaling data using a transmitter (CS570300).

The service layer signaling data may include first signaling data, second signaling data and third signaling data. For example, the first signaling data can include the aforementioned USD, SPD and/or SMT.

The first signaling data may include reference information for referring to the second signaling data and the third signaling data.

The second signaling data may include description for a component of the service. For example, the second signaling data can include the aforementioned AppSvc MPD, eMBMS MPD and/or full MPD.

The third signaling data may include information for acquiring the component associated with the service. For example, the third signaling data can include the aforementioned 3GPP SDP, SMT, CMT, ATSC SDP, UST, RRD, ROUTE session element, LCT session element and/or LSID.

The broadcast transmission apparatus may generate low level signaling data using the controller. The low level signaling data may support bootstrapping of service acquisition. For example, the low level signaling data can include the aforementioned FIC, UST and/or RRD.

The broadcast transmission apparatus may transmit a broadcast signal including the service data, the service layer signaling data and the low level signaling data using the transmitter.

The reference information may include first reference information for referring to the second signaling data and second reference information for referring to the third signaling data. For example, the first reference information can correspond to the aforementioned Full_MPD_URL attribute and the second reference information can correspond to the aforementioned ATSC_SDP_URL attribute.

The first signaling data may further include capability information which specifies capabilities necessary for reproduction of the service. For example, the capability information can correspond to the aforementioned Capabilities attribute.

The third signaling data may include a first transport session element and a second transport session element. The first transport session element may include information about a first transport session through which the service is transmitted. The second transport session element may include information about a second transport session through which the component of the service is transmitted. For example, the first transport session can be a ROUTE session and the second transport session can be an LCT session.

The third signaling data may include at least one of a PLPID attribute which specifies a physical layer pipe through which the component is transmitted and a tsi attribute which specifies the second transport session.

The third signaling data may include mapping information which is mapped to the service transmitted through the second transport session. For example, the mapping information can correspond to the aforementioned Rep_id attribute.

The mapping information may be a representation ID of dynamic adaptive streaming over HTTP (DASH) content for selecting the second transport session.

Figure 58:
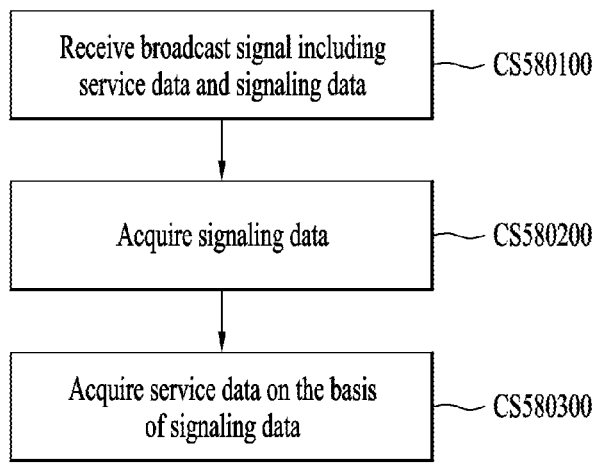
FIG. 58 is a flowchart illustrating a broadcast reception method according to an embodiment of the present invention.

FIG. 58 is a flowchart illustrating a broadcast reception method according to an embodiment of the present invention.

A broadcast reception apparatus may receive a broadcast signal including service data and service layer signaling data for a service using a broadcast receiver (SC580100).

The broadcast reception apparatus may acquire the service layer signaling data using a controller (CS580200).

The broadcast reception apparatus may discover and/or acquire a component of the service on the basis of the service layer signaling data using the controller (CS580300).

In addition, the broadcast reception apparatus may acquire low level signaling data using the controller. The low level signaling data may support bootstrapping of service acquisition.

The service layer signaling data may include first signaling data, second signaling data and third signaling data. The first signaling data may include reference information for referring to the second signaling data and the third signaling data. The second signaling data may include description for a component of the service. The third signaling data may include information for acquiring the component associated with the service.

The reference information may include first reference information referring to the second signaling data and second reference information referring to the third signaling data. The first signaling data may further include capability information which specifies capabilities necessary for reproduction of the service.

The third signaling data may include a first transport session element and a second transport session element. The first transport session element may include information about a first transport session through which the service is transmitted. The second transport session element may include information about a second transport session through which the component of the service is transmitted.

The third signaling data may include at least one of a PLPID attribute which specifies a physical layer pipe through which the component is transmitted and a tsi attribute which specifies the second transport session.

The third signaling data may include mapping information which is mapped to the service transmitted through the second transport session. The mapping information may be a representation ID of DASH content for selecting the second transport session.

Figure 59:
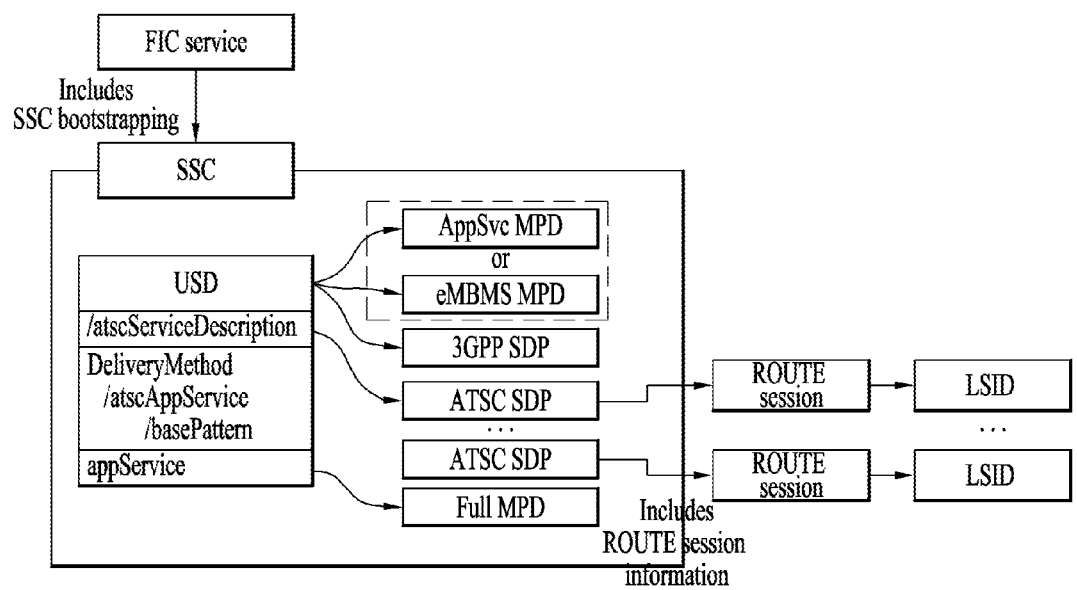
FIG. 59 illustrates a configuration of signaling data according to a seventh embodiment of the present invention.

FIG. 59 illustrates a configuration of signaling data according to a seventh embodiment of the present invention.

The signaling data according to the seventh embodiment may include low level signaling data and/or service layer signaling data. The signaling data according to the seventh embodiment of the present invention is applicable even to a mobile environment.

The signaling data according to the seventh embodiment of the present invention may provide ATSC broadcast service signaling by extending service description, session description and a file delivery over unidirectional transport (FLUTE) based object extension transport scheme.

According to the seventh embodiment of the present invention, SSC bootstrapping information may be transmitted through the low level signaling data. Signaling data associated with a service and signaling data associated with a component may be transmitted through USD of the service layer signaling data.

The seventh embodiment of the present invention can provide a service signaling method for services transmitted through mobile broadcast networks (LTE broadcast), the Internet (unicast) and/or normal broadcast networks (ATSC broadcast or DVB broadcast).

The SSC bootstrapping information may be transmitted through an FIC. An SSC can include USD, AppSvc MPD, eMBMS MPD, 3GPP SDP, ATSC SDP and/or full MPD.

A description will be given of methods of extending USD, SDP and/or LSID according to the seventh embodiment of the present invention.

The low level signaling data is signaling information supporting bootstrapping of fast channel scan and service acquisition by a receiver. Bootstrapping of service acquisition may refer to a procedure for acquiring a service. Accordingly, information for bootstrapping may include path information for acquiring the service. For example, the low level signaling data can include an FIC and/or RRD.

The FIC may be referred to as a service list table (SLT). The SLT may include service layer signaling (SLS) bootstrapping information. The SLS bootstrapping information may include service signaling channel (SSC) bootstrapping information for at least one service.

For example, the SSC can be a channel through which the SLS and/or service layer signaling data is transmitted. SSC bootstrapping may refer to a procedure for acquiring the SSC (or service layer signaling data). Accordingly, the SSC bootstrapping information can include path information for acquiring the service layer signaling data.

The contents of the low level signaling data according to the seventh embodiment of the present invention can include the contents of the aforementioned low level signaling data.

The contents of the service layer signaling data according to the seventh embodiment of the present invention can include the contents of the aforementioned service layer signaling data. The following description is based on a difference between the service layer signaling data according to the seventh embodiment of the present invention and the aforementioned service layer signaling.

The service layer signaling data may include USD, AppSvc MPD, eMBMS MPD and/or 3GPP SDP. In addition, the service layer signaling data may include ATSC SDP, full MPD and/or LSID. The service layer signaling data may include a plurality of ATSC SDPs. The USD, AppSvc MPD, eMBMS MPD, 3GPP SDP, ATSC SDP, full MPD and/or LSID may be signaling data for normal broadcast networks and/or the Internet as well as mobile broadcast networks.

The USD may include transport path information for the AppSvc MPD, eMBMS MPD and/or 3GPP SDP.

In addition, the USD may include an atscServiceDescription element containing attributes of a service and/or information about a path through which the service can be acquired. For example, the atscServiceDescription element can include information about a path through which the ATSC SDP can be acquired.

The USD may include a DeliveryMethod element which indicates a container of transport related information associated with service content transmitted through a broadcast access mode and/or a broadband access mode. For example, the DeliveryMethod element can include an atscAppService element for normal broadcast networks. The atscAppService element can include a basePattern element containing unique mapping information of a component transmitted through the atscAppService element.

Furthermore, the USD may include an appService element containing information for mapping a component transmitted through a normal broadcast network (ATSC broadcast or DVB broadcast) to media presentation description information of the corresponding component. For example, the appService element can include path information for acquiring the full MPD.

Each ATSC SDP may include at least one ROUTE session element which provides information about at least one ROUTE session for a service and/or a component included in the service. The ROUTE session element may include transport path information for the corresponding ROUTE session. For example, the transport path information for the ROUTE session can be used as information about a transport path through which LSID is transmitted.

The LSID may include information about a transport session (LCT session) through which a component for a service is transmitted. The LSID may be included in each ROUTE session. The LSID may be transmitted through a specific transport session included in the corresponding ROUTE session.

A broadcast reception apparatus according to the seventh embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP and/or LSID).

FIG. 60 illustrates the USD according to the seventh embodiment of the present invention.

The extended USD according to the seventh embodiment of the present invention may include the atscServiceDescription element C600100, DeliveryMethod element C600200 and/or appService element C600300.

The atscServiceDescription element C600100 may include information about a service transmitted through a normal broadcast network. The atscServiceDescription element C600100 may include a ProtocolVersion attribute, an atscServiceId attribute, a GlobalServiceId attribute, an atscSdpURI element, a CapabilityDescription element, a TargetingDescription element, a ContentAdvisoryDescription element and/or a ProgramTitleDescription element.

The atscSdpURI element according to the seventh embodiment of the present invention refers to information (URL information or URI information) which indicates an SDP (or ATSC SDP) including information about a ROUTE session through which a service (ATSC service or DVB service) is transmitted. The atscSdpURI element refers to information (URL information or URI information) used to refer to S-TSID (or ATSC_SDP) which provides access related parameters for transport sessions through which service content is transmitted.

Cardinality of the atscSdpURI element may be defined as 0 or unbounded. The SDP corresponding to the atscSdpURI element indicates a ROUTE session which constitutes an ATSC service and describes session description information of the LSID. Accordingly, when the ATSC service is transmitted through one or more ROUTE sessions, as many atscSdpURI elements as the number of ROUTE sessions can be provided, and each URI indicates corresponding SDP data.

The contents of the atscServiceDescription element C600100 according to the seventh embodiment of the present invention may include the contents of the aforementioned atscServiceDescription element.

The DeliveryMethod element C600200 may be a container of transport related information associated with service content transmitted through the broadcast access mode and/or the broadband access mode. The DeliveryMethod element C600200 may include an atscAppService element for normal broadcast networks. The atscAppService element may include information about DASH representation including configuration media content components belonging to a service, which are transmitted through a normal broadcast network (ATSC broadcast or DVB broadcast) over all periods of affiliated media presentation. For example, the atscAppService element can include information about data which uses the ATSC broadcast delivery method. The atscAppService element can include a basePattern element. The basePattern element refers to segment URL information to which each component is mapped in MPD. For example, the basePattern element can include unique mapping information of a component transmitted through the atscAppService element.

The appService element C600300 may indicate DASH representation including configuration media content components belonging to a service, which are transmitted through a normal broadcast network (ATSC broadcast or DVB broadcast) over all periods of affiliated media presentation. For example, the appService element C600300 can include information for mapping a component transmitted through ATSC broadcast to media presentation description information of the corresponding component. The appService element C600300 may include an identicalContent element, an alternativeContent element, an appServiceDescriptionURI attribute and/or a mimeType attribute.

The appServiceDescription URI attribute refers to information (URL information or URI information) used to refer to MPD including information about all content components of a service transmitted through a mobile broadcast network (LTE broadcast), the Internet and/or a normal broadcast network (ATSC broadcast or DVB broadcast).

FIG. 61 illustrates the ATSC SDP and/or the LSID according to the seventh embodiment of the present invention.

FIG. 61(a) shows the ATSC SDP according to the seventh embodiment of the present invention.

Definition of the ATSC SDP can be extended as follows. The ATSC SDP may have a unique URI value. For example, the ATSC SDP can have a URI value of "sdpUri". When FLUTE 15 used, the URI value can be designated through Content-Location of an FDT. When ROUTE 15 used, the URI value can be designated through Content-Location described in an extended file delivery table (EFDT). The URI value may have a unique value mapped to an atscSdpURI element value of the USD/atscServiceDescription.

The ATSC SDP may include component information (s), an originator and session identifier (o), a source filter (a), connection information (c), media description (m), an ATSC mode (a, atsc-mode) and/or TSI information (a, route-tsi).

The component information (s) may include information about a component. For example, the component information (s) can have a value of "robust-audio".

The originator and session identifier (o) may indicate the source IP address of a ROUTE session. For example, the originator and session identifier (o) can be represented as "o=jdoe 2890844526 2890842807 IN IP4 sourceIPaddress".

The source filter (a) may indicate a source IP address. The source filter (a) may be represented using "o=" or "source-filter attribute". For example, the source filter (a) can be represented as "incl IN (Ipver) (sourceIPaddress)" and/or "incl IN IP6*(sourceIPaddress)".

The connection information (c) may indicate the destination IP address of the ROUTE session. For example, the connection information (c) can be represented as "IN IP4 destinationIPaddress".

The media description (m) may indicate the destination port of the ROUTE session. For example, the media description (m) can be represented as m=APPLICATION (destinationPort) ROUTE/UDP 0".

The ATSC mode (a, atsc-mode) may indicate the ID of a transport stream through which LSID of the ROUTE session is transmitted and/or the ID of a data pipe (or PLP) through which LSID of the ROUTE session is transmitted when the ATSC broadcast mode is used. For example, the atsc mode (a) can be represented as "a=atsc-mode: transportstream_id, DP_id".

The TSI information (a, route-tsi) may indicate the transport session identifier of an LCT session through which the LSID of the ROUTE session is transmitted. This value is optionally described in the SDP and indicates transmission with "tsi 0" when the value is not described. When a specific tsi value is described, this value indicates that the LSID is transmitted with the described tsi. For example, the TSI information (a) can be represented as "a=route-tsi: tsi".

FIG. 61(b) shows the LSID according to the seventh embodiment of the present invention.

The LSID may include information about an LCT session included in a ROUTE session. For example, the LSID can include a version attribute, a validFrom attribute, an expiration attribute and/or a TransportSession element.

The version attribute indicates the version of the LSID.

The validFrom attribute indicates time from which the LSID is valid.

The expiration attribute indicates time at which the LSID expires.

The TransportSession element may include information about one or more transport sessions (or LCT sessions) which form a ROUTE session. The transport sessions (or LCT session) may be used to carry audio, video and/or data and may be transmitted through the same data pipe (or PLP) or different data pipes (or PLPs). The LSID may be included in each ROUTE session. The LSID may be transmitted through a specific transport session in the corresponding ROUTE session. For example, the TransportSession element may include a tsi attribute, a DP_id attribute, a SourceFlow element and/or a RepairFlow element.

The tsi attribute may specify a transport session through which a content component for a service is transmitted.

The DP_id attribute may indicate the identifier of a physical layer pipe (or data pipe) associated with the transport session through which the content component for the service is transmitted. The DP_id attribute may indicate a data pipe (or physical layer pipe) through which the transport session described in the corresponding LSID is transmitted. The DP_id is optionally described. If the corresponding DP_id is not present, this means that the transport session is transmitted through the data pipe having the same DP_id as the DP_id corresponding to the atsc mode value described in the ATSC SDP.

The SourceFlow element may include information about a source flow transmitted through an LCT session. The source flow may carry source data including a core component of ROUTE. For example, the source flow can carry at least one delivery object through a unidirectional channel.

The RepairFlow element may include information about a repair flow transmitted through an LCT session. The repair flow may carry repair data which protects at least one delivery object.

FIG. 62 illustrates service layer signaling according to the seventh embodiment of the present invention.

A broadcast signal C620100 having a specific frequency may include service data and/or signaling data for a service. For example, the broadcast signal C620100 can be identified by "BCStreamID1". "BCStreamID1" can identify the broadcast signal in a specific area and/or at the specific frequency.

The broadcast signal C620100 may include a first ROUTE session. The service data for the service may be transmitted through the first ROUTE session. For example, the identifier of the service can have a value of "SrvcID1".

The service data may include a video component and/or an audio component for the service. The video component may include at least one video segment including video data. The audio component may include at least one audio segment including audio data. The video component may be transmitted through a specific transport session of the first ROUTE session. The audio component may be transmitted through another transport session of the first ROUTE session.

The signaling data may include low level signaling data and/or service layer signaling data. For example, the low level signaling data can include an FIC and/or an SLT. The low level signaling data may be included in an IP/UDP packet and transmitted. The service layer signaling data may be referred to as SLS. The service layer signaling data may include USD, MPD (or full MPD), SDP (or ATSC SDP) and/or LSID. The USD, MPD and/or SDP may be transmitted through a service signaling channel (SSC). The SSC and/or LSID may be transmitted through a specific transport session of the first ROUTE session.

The first ROUTE session may be identified by a combination of a source IP address (sIPAdrs1), a destination IP address (IPAdrs1) and a destination port number (Port1). In addition, the first ROUTE session may be transmitted through a first DP BaseBand Packet (BBP) SID1 (BBPSID1) and/or a second DP (BBPSID2). Furthermore, the first ROUTE session may include an SSC transport session (tsi-s), an LSID transport session (tsi-0), a first transport session (tsi-v) and/or a second transport session (tsi-ra).

The SSC transport session (tsi-s) may include at least one SSC fragment. The at least one SSC fragment may be identified by a transport object identifier. For example, the transport object identifier for the SSC fragment can have a value of "toi-s-bundl". The USD, MPD and/or SDP may be transmitted through the SSC transport session.

The LSID transport session (tsi-0) may include at least one LSID fragment. For example, a transport object identifier for the LSID can have a value of "toi-0". The LSID may be transmitted through the LSID transport session.

The first transport session (tsi-v) may include a video component. For example, the video component can include at least one video segment. A transport object identifier for the video segment may have a specific value.

The second transport session (tsi-ra) may include an audio component. For example, the audio component can include at least one audio segment. A transport object identifier for the audio segment may have a specific value.

A description will be given of the FIC.

The FIC may include SSC bootstrapping information for acquiring service layer signaling data transmitted through an SSC. For example, the SSC bootstrapping information can include a source IP address (sIPAdres1), a destination IP address (IPAdrs1), a destination port number (Port1), a transport session identifier (tsi0-s), a transport object identifier (toi-s-bundl) and/or USD path information (usdUri), which are associated with the SSC.

A description will be given of the SSC.

The SSC C620200 may be identified by a transport session identifier having a value of "tsi-s" and/or a transport object identifier having a value of "toi-s-bundl". The SSC C620200 may include USD C620210, MPD C620230 and/or an SDP C620240.

A description will be given of the USD.

The USD C620210 may describe service layer properties. In addition, the USD C620210 may include reference information (or URI) used to refer to the MPD C620230 and/or the SDP C620240. For example, the USD (bundleDescription/userServiceDescription) C620210 may include an atscServiceDescription element, a deliveryMethod element and/or an appService element. The contents of the USD C620210 can include the contents of the aforementioned USD. A description will be given of the USD with reference to the attached drawing.

The atscServiceDescription element may include an atscSdpURI element. The atscSdpURI element may include information (URL information or URI information) used to refer to an SDP (or S-TSID) which provides access related parameters for transport sessions through which service content is transmitted. For example, the atscSdpURI element can have a value of "sdpUri" for referring to the SDP C620240.

The deliveryMethod element may include an atscAppService element. The atscAppService element may include a basePattern element. The basePattern element may refer to segment URL information to which each component is mapped in the MPD.

The appService element may include an appServiceDescriptionURI attribute. The appServiceDescriptionURI attribute refers to information (URL information or URI information) used to refer to MPD including information about all content components transmitted through a mobile broadcast network (LTE broadcast), the Internet (unicast) and/or a normal broadcast network (ATSC broadcast or DVB broadcast). For example, the appServiceDescriptionURI attribute can have a value of "fullMpdUri" referring to the MPD C620230.

A description will be given of the MPD.

The MPD C620230 may include resource identifiers for individual media components of a linear/streaming service. The contents of the MPD according to the seventh embodiment of the present invention can include the contents of the aforementioned MPD.

The MPD may include a Period element. The Period element may include a first AdaptationSet element containing information about at least one video component and a second AdaptationSet element containing information about at least one audio component.

Each of the first AdaptationSet element and the second AdaptationSet element may include a SegmentTemplate element and/or a Representation element. The SegmentTemplate element may include default segment template information. The SegmentTemplate element may include a media attribute which contains template information for generating a media segment list. The Representation element may include information about representation associated with a component. The Representation element may include an id attribute (or Rep_ID attribute) which specifies representation.

For example, a media attribute value for a video component can be "v-segUrl-$NumS.mp4". An id attribute value for the video component can be "RepresentationID-v".

For example, a media attribute value for an audio component can be "ra-segUrl-$NumS.mp4". An id attribute value for the audio component can be "RepresentationID-ra".

A description will be given of the SDP.

The SDP C620240 may include a first ROUTE session element which provides information about a ROUTE session for a service and/or a component included in the service. The first ROUTE session element may include transport path information for a first ROUTE session. For example, the first ROUTE session element can include a bsid attribute indicating the identifier of a broadcast stream through which a content component of the service is transmitted, an sIdAddr attribute indicating the source IP address of the first ROUTE session, a dIpAddr attribute indicating the destination IP address of the first ROUTE session, a dport attribute indicating the destination port number of the first ROUTE session and/or a DP-ID attribute (or PLP_ID attribute) indicating the identifier of a data pipe (physical layer pipe) for the first ROUTE session. The bsid attribute, sIpAddr attribute, dIpAddr attribute, dport attribute and/or DP_ID attribute may be used as information on a transport path through which LSID is transmitted. The SDP may be referred to as S-TSID. The S-TSID is a kind of service layer signaling (SLS) XML fragment which provides all session description information for at least one transport session through which at least one content component of the service is transmitted.

Specifically, the SDP C620240 may include component information (s), an originator and session identifier (o), connection information (c), media description (m), an ATSC mode (a, atsc-mode) and/or TSI information (a, route-tsi). The contents of the SDP according to the seventh embodiment of the present invention can include the contents of the aforementioned SDP.

For example, the component information (s) can have a value of "robust-audio". The originator and session identifier (o) can have a value of "jdoe 2890844526 2890842807 IN IP4 sIPAdrs1". The connection information (c) can have a value of "c=IN IP4 IPAdrs1". The media description (m) can have a value of "APPLICATION port1 ROUTE/UDP 0". The ATSC mode (a, atsc-mode) can have a value of "a=atsc-mode: BCStreamID1,BBPSID1". The TSI information (a, route-tsi) can have a value of "route-tsi: tsi-0".

A description will be given of the LSID.

The LSID C620300 may include information about an LCT session included in a ROUTE session. The LSID may include information identifying a transport session through which a component for a service is transmitted. The LSID may be included in each ROUTE session. The LSID may be transmitted through a specific transport session in the corresponding ROUTE session. For example, the LSID C620300 can be identified by a transport session identifier having a value of "tsi-0", a transport object identifier having a value of "toi-0" and/or URI information having a value of "lsidUri".

The LSID C620300 may include an SSC transport session element containing information about a transport session through which an SSC is transmitted, a first transport session element containing information about a transport session through which a video component is transmitted and/or a second transport session element containing information about a transport session through which an audio component is transmitted.

Each of the SSC transport session element, the first transport session element and the second transport session element may include a tsi attribute which specifies a transport session through which a content component for a service is transmitted and/or a DP_ID attribute (or PLP_ID attribute) which indicates the identifier of a data pipe (or physical layer pipe) associated with the transport session through which the content component for the service is transmitted.

In addition, each of the SSC transport session element, the first transport session element and the second transport session element may include a SourceFlow element which provides information about a source flow included in the corresponding transport session.

The SourceFlow element may include an extended file delivery table (EFDT) element. The EFDT element may include the contents of file delivery data in the form of an extended FDT instance including nominal FDT instance parameters. The EFDT element may include a FileTemplate element. The FileTemplate element may indicate a file URL. The file URL has the same value as the Content-Location attribute of an FDT. In addition, the FileTemplate element may indicate a template format for derivation of the file URI.

The SourceFlow element may include an ApplicationIdentifier element and/or a PayloadFormat element.

The ApplicationIdentifier element may be referred to as a ContentInfo element. The ContentInfo element may include additional information mapped to the service (or application service) transmitted through the corresponding transport session. For example, the ContentInfo element can include a representation ID of DASH content and/or adaptation set parameters of DASH media representation in order to select an LCT transport session for rendering. The representation ID is an identifier associated with a component for the service and may be referred to as a Rep_ID attribute.

The PayloadFormat element may be referred to as a Payload element. The Payload element may include information about a payload of a ROUTE packet (or LCT packet) carrying objects of the source flow. The Payload element may include a CP attribute. The CP attribute may be referred to as a codePoint attribute. The codePoint attribute is a numerical representation of a combination of values specified for the child elements and attributes of the Payload element. That is, the codePoint attribute can indicate the type of payload transmitted by the corresponding packet. In addition, the CP attribute may be referred to as a formatID attribute. The format ID attribute may specify a payload format of a delivery object. For example, the formatID attribute can indicate one of File Mode, Entity Mode and Package.

For example, the tsi attribute and the DP_ID attribute included in the first transport session element can respectively have a value of "tsi-v" and a value of "BBPSID2". The FileTemplate element included in the first transport session element can have a value of http://bc/v-segUrl-$TOI$.mp4, the Rep_ID attribute can have a value of "RepresentationID-v" and the CP attribute can indicate "EntityMode".

In addition, the tsi attribute and the DP_ID attribute included in the second transport session element can respectively have a value of "tsi-ra" and a value of "BBPSID1". The FileTemplate element included in the second transport session element can have a value of http://bc/ra-segUrl-$TOI$.mp4, the Rep_ID attribute can have a value of "RepresentationID-ra" and the CP attribute can indicate "EntityMode".

The tsi attribute included in the SSC transport session element can have a value of "tsi-s" and the DP_ID attribute can have a value of "BBPSID1". The EFDT element may include a File element. The File element may include a Content_Location attribute and a TOI attribute. The Content_Location attribute may indicate a URL associated with an object having a specific TOI value in the corresponding transport session. For example, the Content_Location attribute can have a value of "usdUri". The TOI attribute may identify an object transmitted through the transport session. For example, the TOI attribute can have a value of "toi-s-bundl". The CP attribute included in a third transport session element may indicate "FileMode(Meta)".

A broadcast reception apparatus according to the seventh embodiment of the present invention can acquire a service on the basis of signaling data. Specifically, the broadcast reception apparatus can acquire low level signaling data and obtain service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (SDP and/or LSID). Subsequently, the broadcast reception apparatus can acquire service data for the service on the basis of the information on the transport path.

FIG. 63 illustrates a method for reducing a signaling size according to an eighth embodiment of the present invention.

When a corresponding session is transmitted using ROUTE/DASH transmission and the session description protocol in a hybrid broadcast network, the eighth embodiment of the present invention can reduce redundancy and configure minimum necessary signaling information using the relationship shown in FIG. 63.

Session time information may be optionally included in LSID. The session time information may be mandatorily included in the SDP. Accordingly, the session time information can be included in the SDP using "t=" value of the SDP.

IP/Port information is not included in the LSID. Since the SDP describes an IP/Port value at a session level, an ATSC SDP is defined such that the ATSC SDP describes the IP/Port information related to transmission of a ROUTE session for ATSC signaling.

As to TSI information, the LSID describes TSI information of all transport sessions constituting a ROUTE session. The SDP describes transport information or TSI information about one ROUTE session. When a component is transmitted through ATSC broadcast, information about a data pipe (or physical layer pipe) to which a transport session through which the component is transmitted belongs is needed. In this case, a DP_ID (or PLP_ID) may be added to the SDP and/or the LSID by being mapped thereto on the basis of the TSI information described in the LSID and/or the SDP. When the DP_ID is added to the SDP, the DP_ID needs to be described per TSI.

FEC information may be included in the LSID. Although the FEC information is described in the SDP, the FEC information is described in Repair Flow of the LSID when the ROUTE/DASH transmission scheme is used and thus the value of the FEC information can be used.

Language information is described in the SDP. However, when the ROUTE/DASH transmission scheme is used, the language information is described in MPD. Accordingly, the language information is not defined in the SDP and values of MPD can be used.

Data rate information is described in the SDP. However, when the ROUTE/DASH transmission scheme is used, the data rate information is described in MPD. Accordingly, the data rate information is not defined in the SDP and values of MPD can be used.

FIG. 64 illustrates USD according to a ninth embodiment of the present invention.

The ninth embodiment of the present invention can provide a method for describing additional attributes for reference information of session description of the USD (or SMT) and a method for including additional description information in the USD.

Referring to FIG. 64(*a*), the USD (or SMT) may include a protocolVersion attribute, an atscServiceId attribute, a globalServiceId attribute, a fullMpdURI attribute, an atscSdpURI element, a CapabilityDescription element, a TargetingDescription element, a ContentAdvisoryDescription element, a ProgramTitleDescription element, a ContentLabelDescription element and/or an Original ServiceIdDescription element.

The protocolVersion attribute may indicate the protocol version of an SSC (service signaling channel or service layer signaling data). For example, the protocolVersion attribute can include a major_protocol_version attribute which indicates the major version number of a protocol used to transmit an SSC (service signaling channel, S-TSID and/or service layer signaling data) for a service and/or a minor_protocol_version attribute which indicates the minor version number of the protocol.

The atscServiceId attribute is a unique identifier for identifying a service. The atscServiceId attribute may refer to a service entry corresponding to low level signaling data (LLS, FIC or SLT). The atscServiceId attribute may have the same value as a service identifier (serviceID) allocated to the service entry corresponding to the low level signaling data (LLS, FIC or SLT).

The globalServiceId attribute is a globally unique identifier used for service mapping between 3GPP USD and an ESG. The globalServiceId attribute may have the same value as the service identifier (service_id) of the 3GPP USD and the service identifier (service_id) of the ESG. The globalServiceId attribute is a globally unique uniform resource identifier (URI) for identifying a service. The globalServiceId attribute is a unique value within the range of broadcast stream identifiers (BSID). In addition, the globalServiceId attribute may be used to access ESG data.

The fullMpdURI attribute indicates information (URL information or URI information) referring to MPD including information about all content components of a service transmitted through at least one of a mobile broadcast network (LTE broadcast), the Internet (unicast) and a normal broadcast network (ATSC broadcast or DVB broadcast).

The atscSdpURI element refers to information (URL information or URI information) indicating an SDP including information about a ROUTE session through which a service (ATSC service or DVB service) is transmitted. The atscSdpURI element represents information (URL information or URI information) referring to an S-TSID (or ATSC_SDP) which provides access related parameters with respect to transport sessions through which service content is delivered. The atscSdpURI element may include an essentialSdp attribute. Since an ATSC service can be composed of two or more ROUTE sessions, two or more SDPs describing a single ROUTE session can be referred to. In this case, since a receiver cannot be aware of an SDP and a ROUTE session that need to be received first, the ninth embodiment of the present invention provides the essentialSdp attribute such that the receiver preferentially receives an SDP corresponding to an essentialSdp attribute value of "true" and preferentially acquires a ROUTE session corresponding to the SDP. When the value of the essentialSdp attribute is not described, the essentialSdp attribute is defined as a default value of "true".

The CapabilityDescription element refers to a descriptor which describes capability that the receiver needs to have in order to provide services. The CapabilityDescription attribute may specify capabilities and/or capability groups necessary for the receiver to achieve meaningful reproduction of service content.

The TargetingDescription element may indicate a target device to which a service will be provided.

The ContentAdvisoryDescription element may refer to information about content advisory related to a provided service. The ContentAdvisoryDescription element may specify content advisory rating with respect to the provided service.

The ProgramTitleDescription element may refer to information about the title of a service. The ProgramTitleDescription element may indicate the name of a service in a specific language.

The ProgramTitleDescription element may include a current_program_start_time attribute, a current_program_duration attribute and/or a title_text element.

The current_program_start_time attribute indicates a program start time. The current_program_start_time attribute may indicate a program start time represented as NTP time.

The current_program_duration attribute may indicate a program duration from the program start time. The program duration may be represented in seconds.

The title_text element represents actual text which indicates the name of a service. The title_text element may include a lang attribute. The lang attribute may indicate the language of the service name. The ContentLabelDescription element may refer to a content label of a service. The ContentLabelDescription element may indicate the name of a component.

The OriginalServiceIdDescription element refers to the original service of the corresponding service. The OriginalServiceIdDescription element may include an originalServiceId attribute. The originalServiceId attribute may refer to an ID assigned to the original service of the corresponding service.

FIG. 64(*b*) shows an example of the CapabilityDescription element.

The CapabilityDescription element is composed of a code and a string which indicate capability, and a CapabilityDescription element value can be represented as a string. A regular expression of the string may be configured in the same form as the format used in service announcement.

Figure 65:
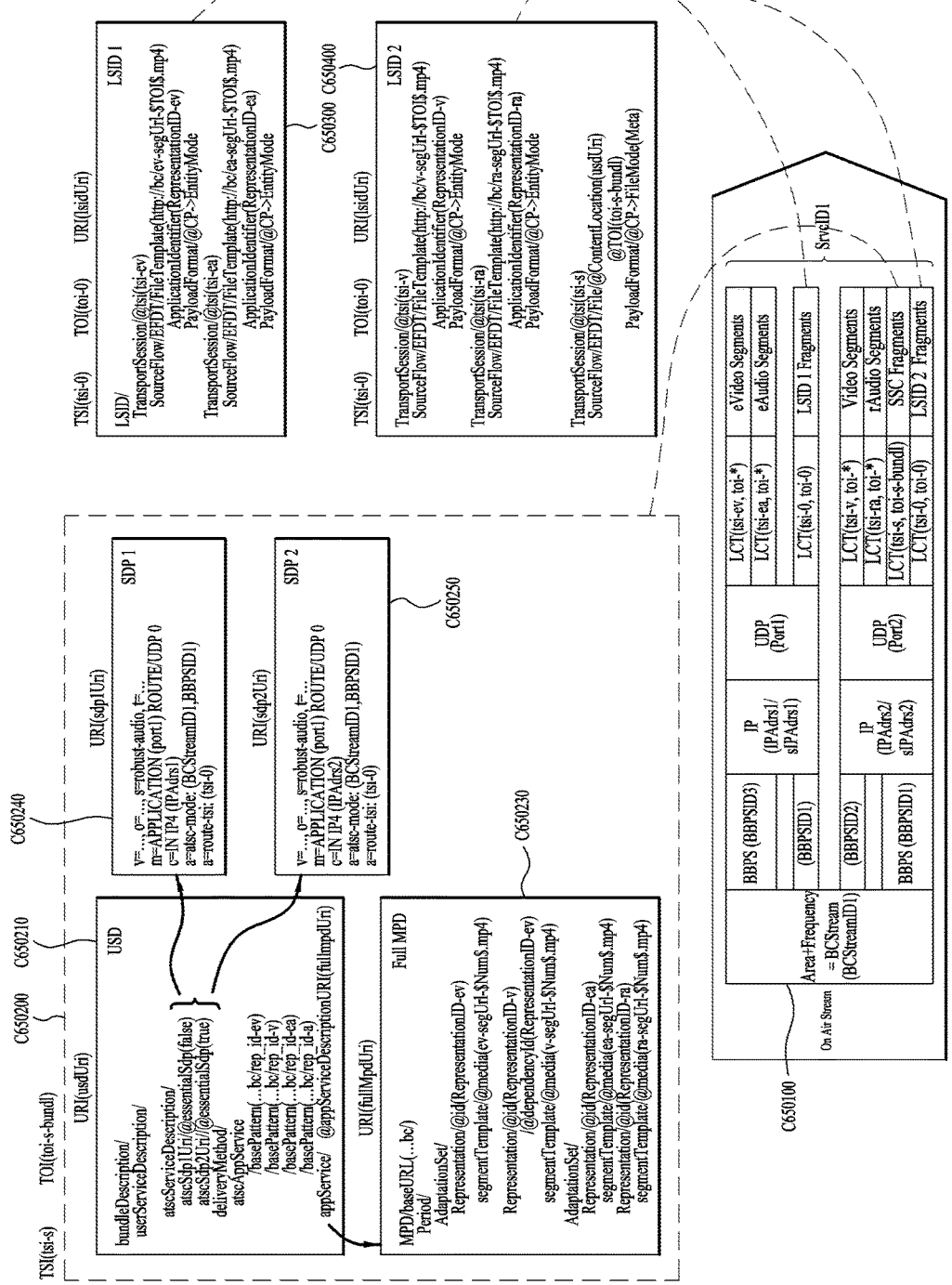
FIG. 65 illustrates service layer signaling according to a ninth embodiment of the present invention.

FIG. 65 illustrates service layer signaling according to the ninth embodiment of the present invention.

A broadcast signal C650100 having a specific frequency may include service data and/or signaling data for a service. For example, the service can have an identifier of "SrvcID1". The broadcast signal C650100 can be identified by "BCStreamID1".

The service data may include base service data for a base service and/or enhanced service data for an enhanced service. The base service may refer to a service of a specific level. The enhanced service may refer to a service of a higher level than the base service. For example, the base service can be an HD service and the enhanced service can be a UHD service. The base service can be a 2D service and the enhanced service can be a 3D service.

The base service data may include a base video component and/or a base audio component for the base service. The enhanced service data may include an enhanced video component and/or an enhanced audio component for the enhanced service. Each of the base video component and the enhanced video component may include at least one video segment including video data. Each of the base audio component and the enhanced audio component may include at least one audio segment including audio data.

The broadcast signal C650100 may include a base ROUTE session and/or an enhanced ROUTE session. The base service data may be transmitted through the base ROUTE session and the enhanced service data may be transmitted through the enhanced ROUTE session. Each of the base video component and the base audio component may be transmitted through a specific transport session (e.g. LCT session) in the base ROUTE session. Each of the enhanced video component and the enhanced audio component may be transmitted through a specific transport session (e.g. LCT session) in the enhanced ROUTE session.

The signaling data may include low level signaling data and/or service layer signaling data. For example, the low level signaling data can include an FIC and/or an SLT. The low level signaling data may be included in an IP/UDP packet and transmitted. The service layer signaling data may be referred to as SLS. The service layer signaling data may include USD, MPD (or full MPD), SDP (or ATSC SDP) and/or LSID. The USD, MPD and/or SDP may be transmitted through a service signaling channel (SSC). An SSC and/or LSID may be transmitted through a specific transport session of the base ROUTE session.

The base ROUTE session may be identified by a combination of a source IP address (sIPAdrs2), a destination IP address (IPAdrs2) and a destination port number (Port2). In addition, the base ROUTE session may be transmitted through a first DP (BBPSID1) and/or a second DP (BBPSID2). Furthermore, the base ROUTE session may include a base SSC transport session (tsi-s), a base LSID transport session (tsi-0), a base video transport session (tsi-v) and/or a base audio transport session (tsi-ra).

The base SSC transport session (tsi-s) may include at least one SSC fragment. The at least one SSC fragment may be identified by a transport object identifier. For example, the transport object identifier for the SSC fragment can have a value of "toi-s-bundl". The USD, MPD and/or SDP may be transmitted through the SSC transport session.

The base LSID transport session (tsi-0) may include at least one base LSID fragment. For example, a transport object identifier for the base LSID can have a value of "toi-0". The base LSID may be transmitted through the base LSID transport session.

The base video transport session (tsi-v) may include a base video component. For example, the base video component can include at least one video segment. A transport object identifier for the video segment may have a specific value.

The base audio transport session (tsi-ra) may include a base audio component. For example, the base audio component can include at least one audio segment. A transport object identifier for the audio segment may have a specific value.

The enhanced ROUTE session may be identified by a combination of a source IP address (sIPAdrs1), a destination IP address (IPAdrs1) and a destination port number (Port1). In addition, the enhanced ROUTE session may be transmitted through a first DP (BBPSID1) and/or a third DP (BBPSID3). Furthermore, the enhanced ROUTE session may include an enhanced LSID transport session (tsi-0), an enhanced video transport session (tsi-ev) and/or an enhanced audio transport session (tsi-re).

The enhanced LSID transport session (tsi-0) may include at least one enhanced LSID fragment. For example, a transport object identifier for the enhanced LSID can have a value of "toi-0". The enhanced LSID may be transmitted through the enhanced LSID transport session.

The enhanced video transport session (tsi-ev) may include an enhanced video component. For example, the enhanced video component can include at least one video segment. A transport object identifier for the video segment may have a specific value.

The enhanced audio transport session (tsi-ea) may include an enhanced audio component. For example, the enhanced audio component can include at least one audio segment. A transport object identifier for the audio segment may have a specific value.

A description will be given of the FIC.

The FIC may include SSC bootstrapping information for acquiring service layer signaling data transmitted through an SSC. For example, the SSC bootstrapping information can include a source IP address (sIPAdres2), a destination IP address (IPAdrs2), a destination port number (Port2), a transport session identifier (tsi0-s), a transport object identifier (toi-s-bundl) and/or USD path information (usdUri), which are associated with the SSC.

A description will be given of the SSC.

The SSC C650200 may be identified by a transport session identifier having a value of "tsi-s" and/or a transport object identifier having a value of "toi-s-bundl". The SSC C650200 may include USD C650210, full MPD C650230, an enhanced SDP C650240 and/or a base SDP C650250.

A description will be given of the USD.

The USD C650210 may describe service layer attributes. In addition, the USD C650210 may include reference information (or URI) referring to the full MPD C650230, the enhanced SDP C650240 and/or the base SDP C650250. For example, the USD (bundleDescription/userServiceDescription) C650210 can include an atscServiceDescription element, a deliveryMethod element and/or an appService element. The contents of the USD C650210 can include the contents of the aforementioned USD. A description will be given of the USD with reference to the attached drawing.

The atscServiceDescription element may include an atscSdp1Uri element for the enhanced SDP and/or an atscSdp2Uri element for the base SDP. The atscSdp1Uri element and/or the atscSdp2Uri element may include information (URL information or URI information) referring to an SDP (or S-TSID) which provides access related parameters for transport sessions through which service content is transmitted. For example, the atscSdp1Uri element can have a value of "sdp1Uri" for referring to the enhanced SDP C650240 and the atscSdp2Uri element can have a value of "sdp2Uri" for referring to the base SDP C650250.

In addition, each of the atscSdp1Uri element and the atscSdp2Uri element may include an essentialSdp attribute. For example, the essentialSdp attribute included in the atscSdp1Uri element can have a value of "false" and the essentialSdp attribute included in the atscSdp2Uri element can have a value of "true". That is, a broadcast reception apparatus can acquire the base SDP first on the basis of the essentialSdp attribute and preferentially receive components transmitted through the base ROUTE session.

The deliveryMethod element may include an atscAppService element. The atscAppService element may include a first basePattern element for an enhanced video component, a second basePattern element for a base video component, a third basePattern element for an enhanced audio component and a fourth basePattern element for a base audio component. Each basePattern element may refer to segment URL information to which each component is mapped in MPD. For example, the first basePattern element can have a value of " . . . bc/rep_id-ev", the second basePattern element can have a value of " . . . bc/rep_id-v", the third basePattern element can have a value of " . . . bc/rep_id-ea" and the fourth basePattern element can have a value of " . . . bc/rep_id-a".

The appService element may include an appServiceDescriptionURI attribute. The appServiceDescriptionURI attribute indicates information (URL information or URI information) referring to MPD including information about all content components transmitted through a mobile broadcast network (LTE broadcast), the Internet (unicast) and/or a normal broadcast network (ATSC broadcast or DVB broadcast). For example, the appServiceDescriptionURI attribute can have a value of "fullMpdUri" referring to the MPD C650230.

A description will be given of the full MPD.

The full MPD C650230 may include resource identifiers for individual media components of a linear/streaming service. The contents of the full MPD according to the ninth embodiment of the present invention can include the contents of the aforementioned MPD and/or full MPOD.

The full MPD may include a Period element. The Period element may include a first AdaptationSet element containing information about at least one video component and a second AdaptationSet element containing information about at least one audio component.

The first AdaptationSet element may include a Representation element for the enhanced video component and/or a Representation element for the base video component. The second AdaptationSet element may include a Representation element for the enhanced audio component and/or a Representation element for the base audio component.

Each Representation element may include an id attribute (or Rep_ID attribute) identifying a representation, a SegmentTemplate element including segment template information and/or a dependencyId attribute indicating at least one complementary representation on which corresponding representation depends in decoding and/or presentation processes. The SegmentTemplate element may include a media attribute including template information for generating a media segment list.

For example, an id attribute for the enhanced video component can have a value of "RepresentationID-ev" and a media attribute for the enhanced video component can have a value of "ev-segUrl-$Num$.mp4".

For example, an id attribute for the base video component can have a value of "RepresentationID-v", a dependencyId attribute for the base video component can have a value of "RepresentationID-ev" and a media attribute for the base video component can have a value of "v-segUrl-$Num$.mp4".

For example, an id attribute for the enhanced audio component can have a value of "RepresentationID-ea" and a media attribute for the enhanced audio component can have a value of "ea-segUrl-$Num$.mp4".

For example, an id attribute for the base audio component can have a value of "RepresentationID-ra" and a media attribute for the base audio component can have a value of "ra-segUrl-$Num$.mp4".

A description will be given of the enhanced SDP (SDP1) C650240.

The enhanced SDP C650240 may include an enhanced ROUTE session element which provides information about an enhanced ROUTE session for a service and/or a component included in the service. The enhanced ROUTE session element may include transport path information for the enhanced ROUTE session.

Specifically, the enhanced SDP C650240 can include component information (s), an originator and session identifier (o), connection information (c), media description (m), an ATSC mode (a, atsc-mode) and/or TSI information (a, route-tsi). The contents of the enhanced SDP according to the ninth embodiment of the present invention can include the contents of the aforementioned SDP.

For example, the component information (s) can have a value of "robust-audio". The media description (m) can have a value of "APPLICATION (port1) ROUTE/UDP 0". The connection information (c) can have a value of "IN IP4 (IPAdrs1)". The ATSC mode (a, atsc-mode) can have a value of "atsc-mode: (BSStreamID1,BBPSID1)". The TSI information (a, route-tsi) can have a value of "route-tsi: (tsi-0).

A description will be given of the base SDP (SDP2) C650250.

The base SDP C650250 may include a base ROUTE session element which provides information about a base ROUTE session for a service and/or a component included in the service. The base ROUTE session element may include transport path information for the base ROUTE session.

Specifically, the base SDP C650250 can include component information (s), an originator and session identifier (o), connection information (c), media description (m), an ATSC mode (a, atsc-mode) and/or TSI information (a, route-tsi). The contents of the base SDP according to the ninth embodiment of the present invention can include the contents of the aforementioned SDP.

For example, the component information (s) can have a value of "robust-audio". The media description (m) can have a value of "APPLICATION (port1) ROUTE/UDP 0". The connection information (c) can have a value of "IN IP4 (IPAdrs2)". The ATSC mode (a, atsc-mode) can have a value of "atsc-mode: (BSStreamID1,BBPSID1)". The TSI information (a, route-tsi) can have a value of "route-tsi: (tsi-0).

A description will be given of the enhanced LSID (LSID1) C650300.

The enhanced LSID (LSID1) C650300 may include information about an LCT session included in an enhanced ROUTE session. For example, the enhanced LSID C650300 can be identified by a transport session identifier having a value of "tsi-0", a transport object identifier having a value of "toi-0" and/or URI information having a value of "lsidUri".

The enhanced LSID C650300 may include an enhanced video transport session element containing information about a transport session through which an enhanced video component is transmitted and/or an enhanced audio transport session element containing information about a transport session through which an enhanced audio component is transmitted.

Each of the enhanced video transport session element and the enhanced audio transport session element may include a tsi attribute, a DP_ID attribute (or PLP_ID attribute) and/or a SourceFlow element. The SourceFlow element may include an extended file delivery table (EFDT) element, an ApplicationIdentifier element and/or a PayloadFormat element. The EFDT element may include a FileTemplate element. The ApplicationIdentifier element may be referred to as a ContentInfo element. A representation identifier is related to a component for a service and may be referred to as a Rep_ID attribute.

The PayloadFormat element may be referred to as a Payload element. The Payload element may include a CP attribute. The CP attribute may be referred to as a codePoint attribute and/or a formatID attribute.

For example, the tsi element included in the enhanced video transport session element can have a value of "tsi-ev", the FileTemplate element can have a value of http://bc/ev-segUrl-$TOI$.mp4, the Rep_ID attribute can have a value of "RepresentationID-ev" and the CP attribute can indicate "EntityMode".

The tsi element included in the enhanced audio transport session element can have a value of "tsi-ea", the FileTemplate element can have a value of http://bc/ea-segUrl-$TOI$.mp4, the Rep_ID attribute can have a value of "RepresentationID-ea" and the CP attribute can indicate "EntityMode".

A description will be given of the base LSID (LSID2) C650400.

The base LSID (LSID2) C650400 may include information about an LCT session included in a base ROUTE session. For example, the base LSID C650400 can be identified by a transport session identifier having a value of "tsi-0", a transport object identifier having a value of "toi-0" and/or URI information having a value of "lsidUri".

The base LSID C650400 may include an SSC transport session element containing information about a transport session through which an SSC is transmitted, a base video transport session element containing information about a transport session through which a base video component is transmitted and/or a base audio transport session element containing information about a transport session through which a base audio component is transmitted.

Each of the SSC transport session element, the base video transport session element and the base audio transport session element may include a tsi attribute, a DP_ID attribute (or PLP_ID attribute) and/or a SourceFlow element. The SourceFlow element may include an EFDT element, an ApplicationIdentifier element and/or a PayloadFormat element. The EFDT element may include a FileTemplate element. The ApplicationIdentifier element may be referred to as a ContentInfo element. A representation identifier is related to a component for a service and may be referred to as a Rep_ID attribute. The PayloadFormat element may be referred to as a Payload element. The Payload element may include a CP attribute. The CP attribute may be referred to as a codePoint attribute and/or a formatID attribute.

For example, the tsi element included in the base video transport session element can have a value of "tsi-v", the FileTemplate element can have a value of http://bc/v-segUrl-$TOI$.mp4, the Rep_ID attribute can have a value of "RepresentationID-v" and the CP attribute can indicate "EntityMode".

The tsi element included in the base audio transport session element can have a value of "tsi-ra", the FileTemplate element can have a value of http://bc/ra-segUrl-$TOI$.mp4, the Rep_ID attribute can have a value of "RepresentationID-ra" and the CP attribute can indicate "EntityMode".

In addition, the tsi element included in the SSC transport session element can have a value of "tsi-s". The EFDT element may include a File element. The File element may include a Content_Location attribute and a TOI attribute. For example, the Content_Location attribute can have a value of "usdUri". The TOI attribute can have a value of "toi-s-bundl". In addition, the CP attribute included in the SSC transport session element can indicate "FileMode (Meta)".

A broadcast reception apparatus according to the ninth embodiment of the present invention can acquire a service on the basis of signaling data. Specifically, the broadcast reception apparatus can acquire low level signaling data and obtain service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID (or id attribute) of the MPD. Then, the broadcast reception apparatus can acquire information on a transport path through which the selected at least one component is transmitted using service layer signaling data (SDP and/or LSID). Subsequently, the broadcast reception apparatus can acquire service data for the service on the basis of the information on the transport path.

The broadcast reception apparatus according to the ninth embodiment of the present invention can determine an SDP, which should be preferentially acquired, through the essentialSDP attribute of the atscSdpURI and receive a component transmitted through a ROUTE session corresponding to the SDP. The broadcast reception apparatus according to the ninth embodiment of the present invention can perform fast channel change since the broadcast reception apparatus can preferentially receive information (LCT session through which A/V components are transmitted) which is essential for A/V rendering in case of channel change. In addition, the ninth embodiment of the present invention can affect memory buffer management of the broadcast reception apparatus or operation of the broadcast reception apparatus according to capabilities.

Figures 66, 67:
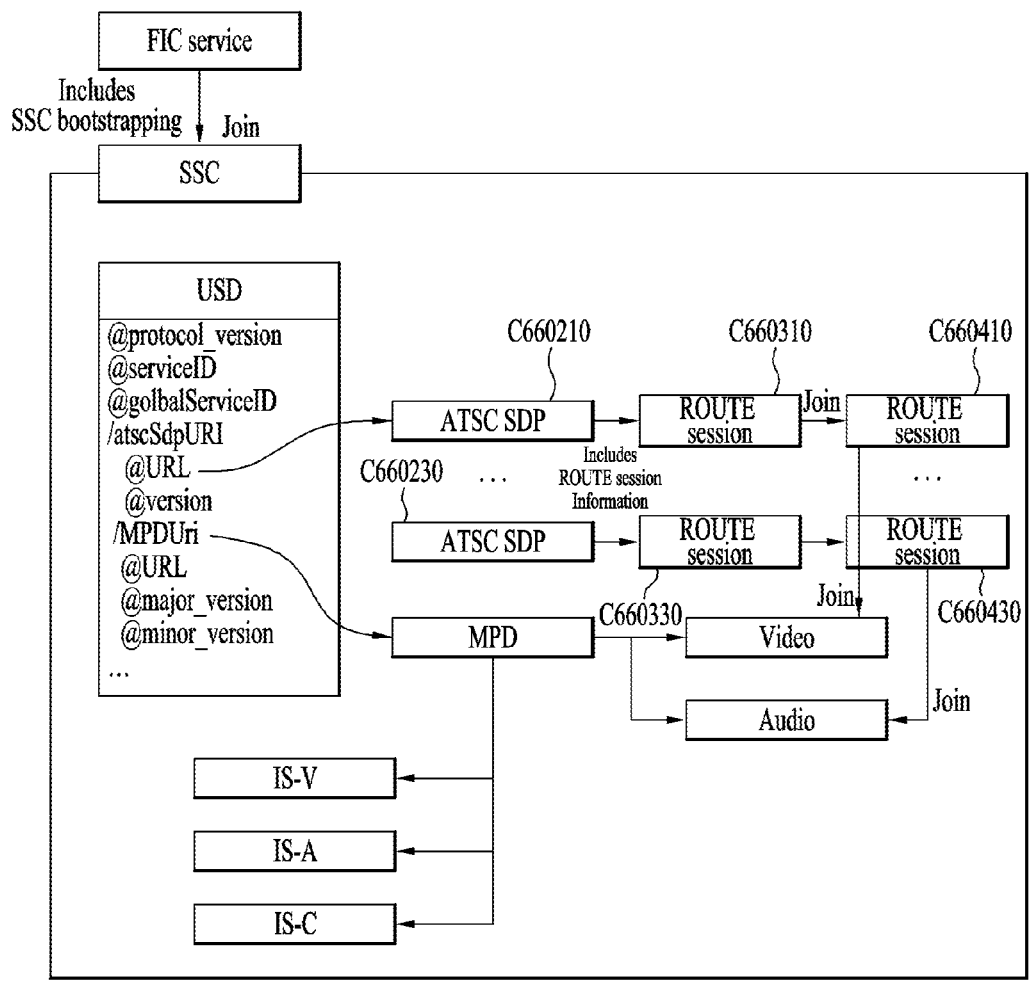
FIG. 66 illustrates a configuration of signaling data according to a tenth embodiment of the present invention.
FIG. 67 illustrates a configuration of signaling data according to the tenth embodiment of the present invention.

FIG. 66 illustrates a configuration of signaling data according to a tenth embodiment of the present invention.

A simple service refers to a case in which service signaling, audio and video are transmitted in a single data pipe (or physical layer pipe) and service signaling/LSID are transmitted through a single LCT session. Services other than the simple service are referred to as full services.

When service signaling is provided in a full service structure, an SSC can include USD, an SDP, MPD, LSID and/or signaling data such as InitSegment. A broadcast reception apparatus can render at least one of an audio component, a video component and a caption component on a screen on the basis of the SSC. Service signaling data has the following relationship.

The signaling data according to the tenth embodiment of the present invention may include low level signaling data and/or service layer signaling data.

The low level signaling data may include an FIC and/or RRD. The FIC may be referred to as a service list table (SLT). The FIC may include SSC bootstrapping information (or SLS bootstrapping information). A broadcast reception apparatus may participate in a transport session through which the SSC is transmitted and acquire the SSC on the basis of the FIC. The contents of the low level signaling data according to the tenth embodiment of the present invention can include the contents of the aforementioned low level signaling data.

The contents of the service layer signaling data according to the tenth embodiment of the present invention can include the contents of the aforementioned service layer signaling data. The following description is based on a difference between the service layer signaling data according to the tenth embodiment of the present invention and the aforementioned service layer signaling data.

The service layer signaling data may include USD (or ATSC_USD), SDP (or ATSC SDP), MPD, LSID and/or an initialization segment.

The USD may include a protocol_version attribute, a serviceID attribute, a globalServiceID attribute, a first atscSdpURI element, a second atscSdpURI element and/or an MPDUri element.

Each of the first atscSdpURI element and the second atscSdpURI element may include a URL attribute containing information about a path through which the ATSC SDP can be acquired and a version attribute containing version information of the ATSC SDP. For example, the URL attribute included in the first atscURI element can include information about a path through which a first ATSC SDP C660210 can be acquired and the URL attribute included in the second atscURI element can include information about a path through which a second ATSC SDP C660230 can be acquired.

The MPDUri element may include a URL attribute containing information about a path through which the MPD can be acquired, a major_version attribute containing major version information of the MPD and/or a minor_version attribute containing minor version information of the MPD.

The MPD may include information (URL) about a path through which the initialization segment can be accessed. The initialization segment may include initialization information for accessing representation. For example, the initialization segment can include a video initialization segment IS-V for a video component, an audio initialization segment IS-A for an audio component and/or a caption initialization segment IS-C for a caption component.

In addition, the MPD may include information (URL) about a path through which a media segment can be accessed. The media segment may include encoded media content components. For example, the media segment can include a media segment containing data of an encoded video component and/or a media segment containing data of an encoded audio component.

The first ATSC SDP C660210 may include a first ROUTE session element which provides information about a first ROUTE session C660310 containing information about a service and/or a component included in the service. The first ROUTE session element may include transport path information for the first ROUTE session C660310. For example, the transport path information for the first ROUTE session C660310 can be used as information on a path through which a first LSID C660410 is transmitted. The broadcast reception apparatus can participate in a transport session through which the first LSID C660410 is transmitted and acquire the first LSID C660410.

The second ATSC SDP C660230 may include a second ROUTE session element which provides information about a second ROUTE session C660330 containing information about a service and/or a component included in the service. The second ROUTE session element may include transport path information for the second ROUTE session C660330. For example, the transport path information for the second ROUTE session C660330 can be used as information on a path through which a second LSID C660430 is transmitted. The broadcast reception apparatus can participate in a transport session through which the second LSID C660430 is transmitted and acquire the second LSID C660430.

The first LSID C660410 may include information about a transport session (LCT session) in which a video component is transmitted through the first ROUTE session C660310. The first LSID C660410 may be transmitted through a specific transport session in the first ROUTE session C660310. The broadcast reception apparatus can participate in a specific transport session on the basis of the first LSID C660410 and acquire the video component.

The second LSID C660430 may include information about a transport session (LCT session) in which an audio component is transmitted through the second ROUTE session C660330. The second LSID C660430 may be transmitted through a specific transport session in the second ROUTE session C660330. The broadcast reception apparatus can participate in a specific transport session on the basis of the second LSID C660430 and acquire the audio component.

A broadcast reception apparatus according to the tenth embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using the service layer signaling data (initialization segment, SDP and/or LSID). Subsequently, the broadcast reception apparatus can acquire service data for the service on the basis of the information on the transport path.

FIG. 67 illustrates a configuration of the signaling data according to the tenth embodiment of the present invention.

When a service transmitted through ATSC broadcast is fully signaled, the tenth embodiment of the present invention can provide extended USD for reducing channel change time.

The USD according to the tenth embodiment of the present invention may include a protocolVersion attribute, an atscServiceId attribute, a globalServiceId attribute, an atscSdpUri element and/or a fullMpdUri element.

The protocolVersion attribute may indicate the protocol version of an SSC (service signaling channel or service layer signaling data).

The atscServiceId attribute is an identifier which uniquely identifies a service.

The globalServiceId attribute is a globally unique identifier identifying a service.

The atscSdpUri element refers to information (URL information or URI information) indicating an ATSC SDP referred to in the USD. The atscSdpUri element indicates information (URL information or URI information) referring to S-TSID (or ATSC SDP) which provides access related parameters for transport sessions through which service content is transmitted. The atscSdpUri element may include a version attribute and/or a URL attribute. The version attribute may indicate the version information of the ATSC SDP referred to by the atscSdpUri. The URL attribute may represent the URL indicating the unique URI of the atscSdpUri.

The fullMpdUri element may indicate the URL address of full MPD referred to in the USD. The fullMpdUri element is information (URL information or URI information) referring to MPD including information about all content components of a service transmitted through a mobile broadcast network (LTE broadcast), the Internet (unicast) and/or a normal broadcast network (ATSC broadcast or DVB broadcast). The fullMpdUri element may include a URL attribute containing information about a path through which the MPD can be acquired, a major_version attribute containing major version information of the MPD and/or a minor_version attribute containing minor version information of the MPD. When configuration information of the MPD is changed and thus the broadcast reception apparatus cannot perform A/V rendering using previously received MPD and LCT header additional information, the value of the major_version attribute can increase. If the broadcast reception apparatus can perform audio rendering and/or video rendering using previously received and cached MPD and LCT header additional information (e.g. EXT_PRESENTATION_TIME header), the major_version attribute value is not changed and the minor_version attribute value can increase.

Figure 68:
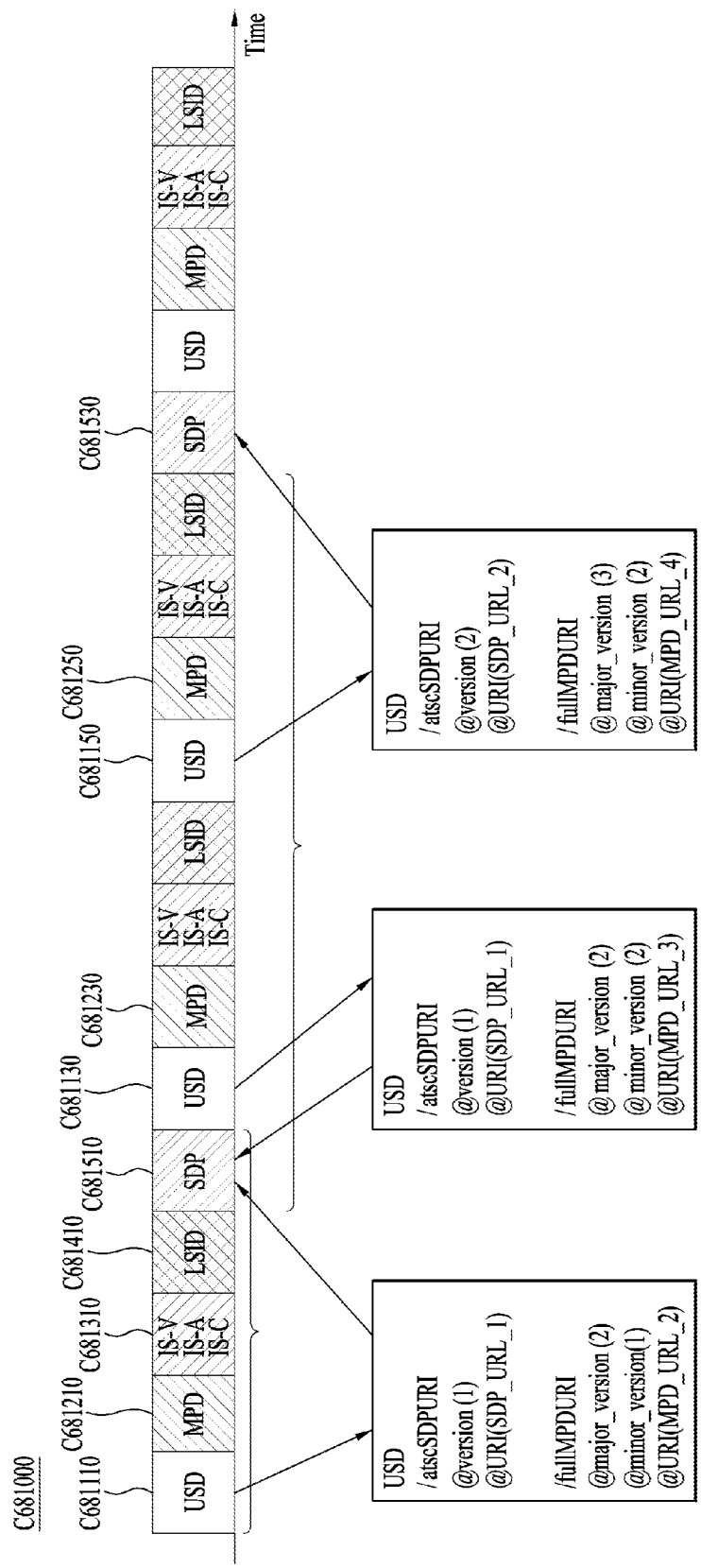
FIG. 68 illustrates an example of transmission according to service layer signaling data transmission intervals according to the tenth embodiment of the present invention.

FIG. 68 illustrates an example of transmitting service layer signaling data according to transmission intervals thereof according to the tenth embodiment of the present invention.

FIG. 68 shows service layer signaling data C681000 according to the tenth embodiment of the present invention. The service layer signaling data C681000 may include USD, MPD, SDP, LSID and/or an initialization segment.

According to the tenth embodiment of the present invention, transmission intervals of service layer signaling data, USD, MPD, LSID and/or the initialization segment, which are necessary to render, are shorter than that of the SDP which describes only transmission information of the LSID.

Accordingly, a broadcast reception apparatus according to the tenth embodiment of the present invention can reduce channel change time using version information and/or URI information of the USD.

A description will be given of a method for managing version information of the SDP by the broadcast reception apparatus according to the tenth embodiment of the present invention.

The broadcast reception apparatus may receive and/or acquire the service layer signaling data C681000.

The broadcast reception apparatus may compare version information (version attribute value) of the SDP mapped to the corresponding uri (uri attribute value) with cached SDP version information upon reception of the USD.

If the version information of the SDP mapped to the corresponding uri differs from the cached SDP version information, the broadcast reception apparatus may newly receive and/or cache the SDP.

If the version information of the SDP mapped to the corresponding uri is identical to the cached SDP version information, the broadcast reception apparatus may not receive and/or cache the SDP.

Accordingly, the broadcast reception apparatus may not compare the version information in the header of Metadata_envelope or parse the SDP, and thus the broadcast reception apparatus can reduce channel change time by checking whether the SDP has been changed on the basis of the USD.

For example, the atscSDPURI element of USD C681110 can include path information and/or version information related to an SDP C681510. The version attribute included in the atscSDPURI element can have a value of "1" and the uri attribute can have a value of "SDP_URL_1".

In addition, the atscSDPURI element of USD C681130 can also include path information and/or version information related to the SDP C681510. The version attribute included in the atscSDPURI element can have a value of "1" and the uri attribute can have a value of "SDP_URL_1".

The atscSDPURI element of USD C681150 can include path information and/or version information related to an SDP C681530. The version attribute included in the atsc-SDPURI element can have a value of "2" and the uri attribute can have a value of "SDP_URL_2".

Here, it is assumed that the broadcast reception apparatus receives and/or caches the SDP C681510.

The USD C681110 and the USD C681130 refer to the same SDP C681510. That is, the broadcast reception apparatus does not re-receive and/or cache the SDP C681510 since the version information of the SDP C681510 mapped to the corresponding uri is identical to the version information of the cached SDP C681510 when the USD C681130 is received.

However, the USD C681130 and the USD C681150 respectively refer to SDP C681510 and SDP C681530. That is, the broadcast reception apparatus can receive and/or cache the SDP C681530 since the version information of the SDP C681530 mapped to the corresponding uri differs from the version information of the cached SDP C681510 when the USD C681150 is received.

A description will be given of a method for managing version information of MPD by the broadcast reception apparatus according to the tenth embodiment of the present invention.

The broadcast reception apparatus may compare version information (version attribute value) of MPD mapped to the corresponding MPD uri (uri attribute value) with cached MPD version information upon reception of the USD.

If the major version (major_version attribute value) of the MPD is changed, the broadcast reception apparatus may receive, acquire and/or parse new MPD.

If the major version (major_version attribute value) of the MPD is not changed and only the minor version (minor_version attribute value) thereof is changed, the broadcast reception apparatus can re-process the MPD using only the previously cached MPD and LCT header additional attribute information.

If both the major version and the minor version are not changed, the broadcast reception apparatus may not receive, acquire and/or parse the MPD.

Accordingly, the broadcast reception apparatus can reduce channel change time by checking whether the MPD is changed on the basis of the USD without comparing versions in the header of Metadata_envelope or parsing the MPD.

For example, the fullMPDURI element of the USD C681110 can include path information and/or version information related to MPD C681210. The major_version attribute included in the fullMPDURI element can have a value of "2", the minor_version attribute can have a value of "1" and the uri attribute can have a value of "MPD_URL 2".

In addition, the fullMPDURI element of the USD C681130 can include path information and/or version information related to MPD C681230. The major_version attribute included in the fullMPDURI element can have a value of "2", the minor_version attribute can have a value of "2" and the uri attribute can have a value of "MPD_URL 3".

The fullMPDURI element of the USD C681150 can include path information and/or version information related to MPD C681250. The major_version attribute included in the fullMPDURI element can have a value of "3", the minor_version attribute can have a value of "2" and the uri attribute can have a value of "MPD_URL_4".

Here, it is assumed that the broadcast reception apparatus receives and/or caches the MPD C681210.

The major version (major_version attribute=2) of the MPD C681210 referred to in the USD C681110 is identical to the major version (major_version attribute=2) of the MPD C681230 referred to in the USD C681130. However, minor version (minor_version attribute=1) of the MPD C681210 referred to in the USD C681110 differs from the minor version (minor_version attribute=2) of the MPD C681230 referred to in the USD C681130. Accordingly, the broadcast reception apparatus can re-process (or newly generate) MPD using only the previously cached MPD C681210 and/or LCT header additional attribute information when the USD C681130 is received. For example, the re-processed MPD can be identical to the MPD C681230. Then, the broadcast reception apparatus may cache the re-processed MPD.

The major version (major_version attribute=2) of the MPD C681230 referred to in the USD C681130 differs from the major version (major_version attribute=3) of the MPD C681250 referred to in the USD C681150. Accordingly, the broadcast reception apparatus can receive, acquire and/or parse the new MPD C681250 when the USD C681150 is received.

Figure 69:
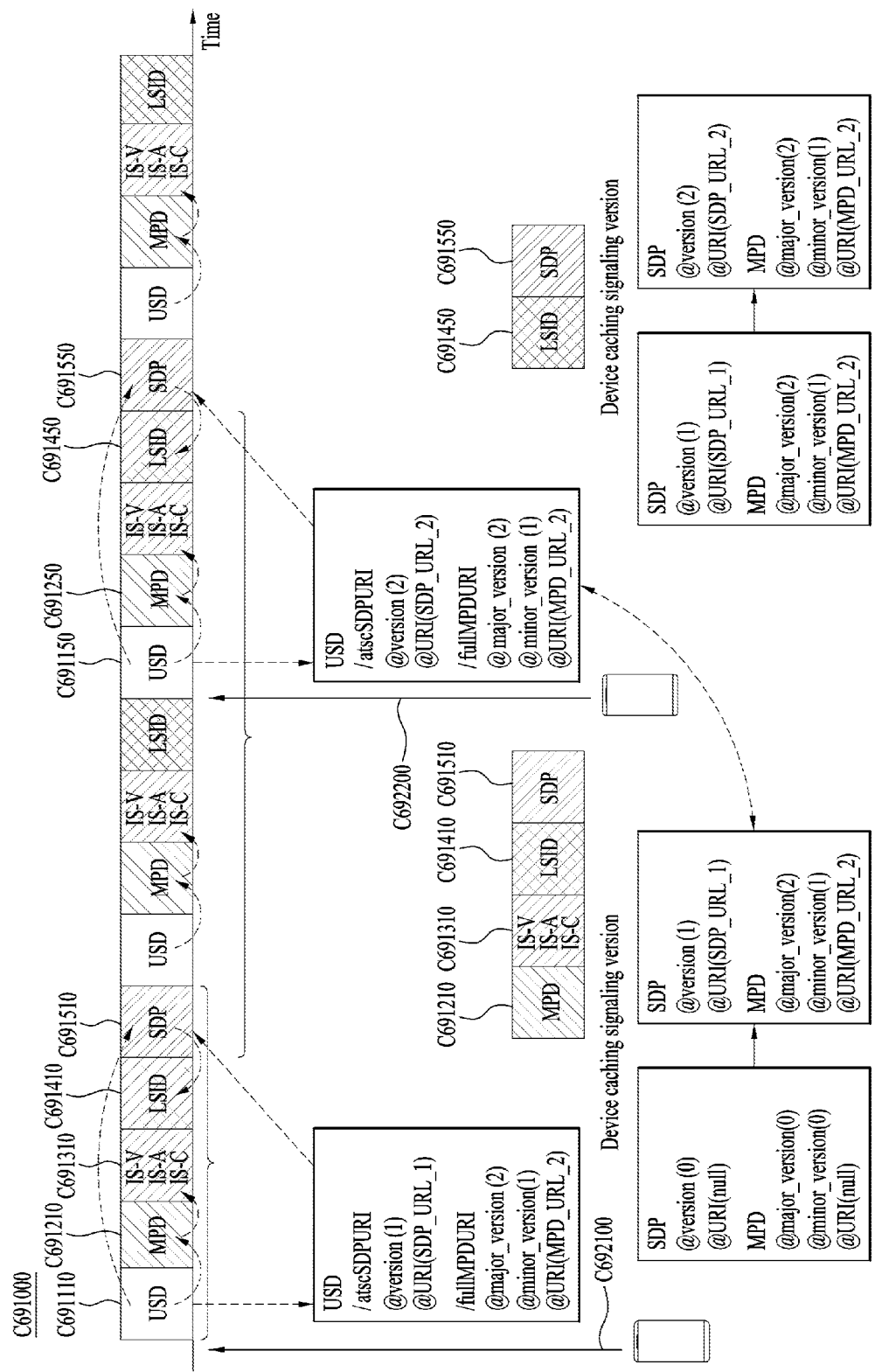
FIG. 69 illustrates an example of transmission according to the service layer signaling data transmission intervals according to the tenth embodiment of the present invention.

FIG. 69 illustrates an example of transmitting service layer signaling data according to transmission intervals thereof according to the tenth embodiment of the present invention.

FIG. 68 shows service layer signaling data C691000 according to the tenth embodiment of the present invention. The service layer signaling data C691000 may include USD, MPD, SDP, LSID and/or an initialization segment.

According to the tenth embodiment of the present invention, transmission intervals of service layer signaling data, USD, MPD, LSID and/or the initialization segment, which are necessary to render, are shorter than the SDP which describes only transmission information of the LSID.

Accordingly, the broadcast reception apparatus according to the tenth embodiment of the present invention can reduce channel change time using version information of the USD.

It is assumed that the broadcast reception apparatus according to the tenth embodiment of the present invention does not cache the service layer signaling data before first time C692100. Accordingly, the broadcast reception apparatus may have no SDP and MPD cached therein. Otherwise, all SDPs and MPDs cached in the broadcast reception apparatus may have a default value (0 or null). For example, version information of an SDP can be "0" and URI information thereof can be "null". Major version information of MPD can be "0", minor version information thereof can be "0" and URI information thereof can be "null".

The broadcast reception apparatus according to the tenth embodiment of the present invention may join in the corresponding channel at the first time C692100. For example, the broadcast reception apparatus can participate in a transport session in which the service layer signaling data C691000 is transmitted on the basis of SSC bootstrapping information of low level signaling data.

The broadcast reception apparatus may acquire the USD C691110 from the service layer signaling data.

Then, the broadcast reception apparatus may acquire the MPD C691210 and/or the SDP C691510 on the basis of the USD C691110.

For example, the broadcast reception apparatus can compare version information of the MPD C691210 mapped to the corresponding MPD uri (uri attribute value) with version information of MPD cached therein on the basis of the USD C691110. The fullMPDURI element of the USD C691110 may include the path information and/or version information related to the MPD C691210. The major_version attribute included in the fullMPDURI element may have a value of "2", the_minor version attribute may have a value of "1" and the uri attribute may have a value of "MPD_URL_2". Since the major version information (major_version attribute value) has been changed when the broadcast reception apparatus joins the channel at the first time C692100, the broadcast reception apparatus can receive and/or cache the new MPD C691210.

For example, the broadcast reception apparatus can compare version information (version attribute value) of the SDP C691510 mapped to the corresponding uri (uri attribute value) with version information of an SDP cached therein on the basis of the USD C691110. The atscSDPURI element of the USD C691110 may include the path information and/or version information related to the SDP C691510. The version attribute included in the atscSDPURI element may have a value of "1" and the uri attribute may have a value of "SDP_URL_1". Since the version information of the SDP C691510 mapped to the corresponding uri differs from the version information of the cached SDP when the broadcast reception apparatus joins the channel at the first time C692100, the broadcast reception apparatus can receive and/or cache the new SDP C691510.

Subsequently, the broadcast reception apparatus may acquire an initialization segment C691310 on the basis of the MPD C691210.

In addition, the broadcast reception apparatus may acquire LSID C691410 on the basis of the SDP C691510.

Then, the broadcast reception apparatus may acquire service data (e.g. a video component and an audio component) for the corresponding service on the basis of the initialization segment C691310 and/or the LSID C691410.

The broadcast reception apparatus joining the channel at the first time C692100 may receive and/or cache the MPD C691210, the initialization segment C691310, the LSID C691410 and/or the SDP C691510 on the basis of the USD C691110. Consequently, the version information of the SDP cached in the broadcast reception apparatus can be "1" and the URI information thereof can be "SDP⁺ URL_1". In addition, the major version information of the MPD cached in the broadcast reception apparatus can be "2", the minor version information thereof can be "1" and the URI information thereof can be "MPD_URL_2".

The broadcast reception apparatus according to the tenth embodiment of the present invention may rejoin the corresponding channel at second time C692200. For example, the broadcast reception apparatus can participate in a transport session in which the service layer signaling data C691000 is transmitted on the basis of the SSC bootstrapping information of the low level signaling data.

The broadcast reception apparatus may acquire the USD C691150 from the service layer signaling data.

Then, the broadcast reception apparatus may acquire the MPD C691250 and/or the SDP C691550 on the basis of the USD C691150.

For example, the broadcast reception apparatus can compare version information of the MPD C691250 mapped to the corresponding MPD uri (uri attribute value) with version information of MPD cached therein on the basis of the USD C691150. The fullMPDURI element of the USD C691150 may include the path information and/or version information related to the MPD C691250. The major_version attribute included in the fullMPDURI element may have a value of "2", the minor_version attribute may have a value of "1" and the uri attribute may have a value of "MPD_URL_2". Since both the major version information (major_version attribute value) and the minor version information (minor_version attribute) have not been changed when the broadcast reception apparatus joins the channel at the second time C692200, the broadcast reception apparatus does not receive and/or cache the new MPD C691250.

For example, the broadcast reception apparatus can compare version information of the SDP C691550 mapped to the corresponding uri (uri attribute value) with version information of the SDP cached therein on the basis of the USD C691150. The atscSDPURI element of the USD C691150 may include the path information and/or version information related to the SDP C691550. The version attribute included in the atscSDPURI element may have a value of "2" and the uri attribute may have a value of "SDP_URL_2". Since the version information of the SDP C691550 mapped to the corresponding uri differs from the version information of the cached SDP when the broadcast reception apparatus joins the channel at the second time C692200, the broadcast reception apparatus can receive and/or cache the new SDP C691550.

Subsequently, the broadcast reception apparatus may acquire LSID C691450 on the basis of the SDP C691550.

Then, the broadcast reception apparatus may acquire service data (e.g. a video component and an audio component) for the corresponding service on the basis of the LSID C691450.

The broadcast reception apparatus joining the channel at the second time C692200 may receive and/or cache the LSID C691450 and/or the SDP C691550 on the basis of the USD C691150. Consequently, the version information of the SDP cached in the broadcast reception apparatus can be "2" and the URI information thereof can be "SDP_URL_2". In addition, the major version information of the MPD cached in the broadcast reception apparatus can be "2", the minor version information thereof can be "1" and the URI information thereof can be "MPD_URL_2". That is, the broadcast reception apparatus does not additionally receive the MPD C691250 and/or an initialization segment C691350 since version information thereof is identical to the version information of the cached MPD and initialization segment.

Consequently, the broadcast reception apparatus can reduce channel change time on the basis of version information.

Figure 70:
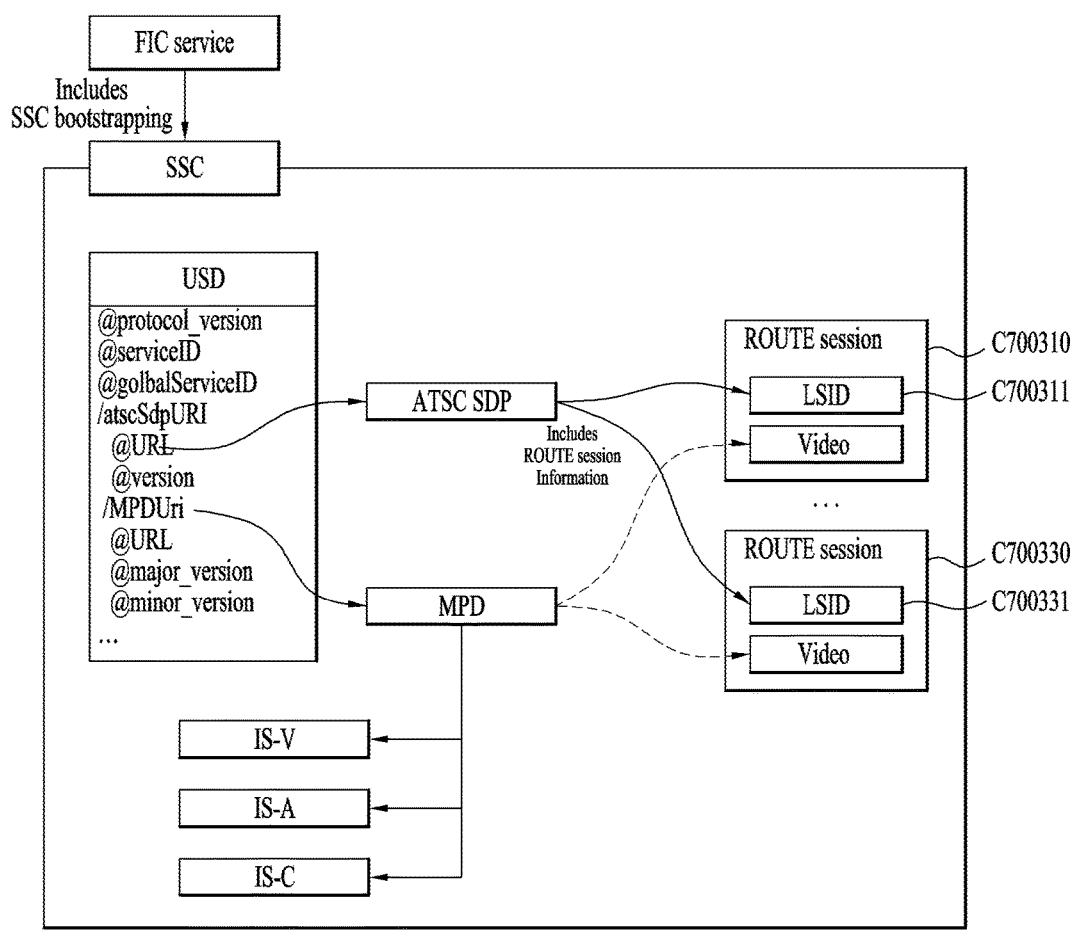
FIG. 70 illustrates a configuration of signaling data according to a thirteenth embodiment of the present invention.

FIG. 70 illustrates a configuration of signaling data according to a thirteenth embodiment of the present invention.

Service layer signaling data for ATSC broadcast transmission according to the thirteenth embodiment of the present invention may include USD, SDP, MPD, LSID and/or an initialization segment (or InitSegment). A broadcast reception apparatus can render an audio component, a video component and/or a caption component on a screen on the basis of an SSC. The thirteenth embodiment of the present invention can provide a method for transmitting bootstrapping information of two or more ROUTE sessions which form a single service and/or service layer signaling data in a modified structure by extending the SDP.

The signaling data according to the thirteenth embodiment of the present invention may include low level signaling data and/or service layer signaling data.

The low level signaling data may include an FIC. The contents of the low level signaling data according to the thirteenth embodiment of the present invention can include the contents of the aforementioned low level signaling data.

The contents of the service layer signaling data according to the thirteenth embodiment of the present invention can include the contents of the aforementioned service layer signaling data. The following description is based on a difference between the service layer signaling data according to the thirteenth embodiment of the present invention and the aforementioned service layer signaling data.

The service layer signaling data may include USD (or ATSC_USD), SDP (or ATSC SDP), MPD, LSID and/or an initialization segment.

The USD may include a protocol_version attribute, a serviceID attribute, a globalServiceID attribute, an atscSdpURI element and/or an MPDUri element.

The atscSdpURI element may include a URL attribute containing information about a path through which the ATSC SDP can be acquired and a version attribute containing version information of the ATSC SDP. For example, the URL attribute included in the atscURI element can include information about a path through which the ATSC SDP can be acquired.

The MPDUri element may include a URL attribute containing information about a path through which the MPD can be acquired, a major_version attribute containing major version information of the MPD and/or a minor_version attribute containing minor version information of the MPD.

The MPD may include information (URL) about a path through which the initialization segment can be accessed. The MPD may include information (URL) about a path through which a media segment can be accessed. For example, the media segment can include a media segment containing data of an encoded video component and/or a media segment containing data of an encoded audio component. The media data including the data of the encoded video component may be transmitted through a first ROUTE session C700310. The media data including the data of the encoded audio component may be transmitted through a second ROUTE session C700330.

The ATSC SDP may include bootstrapping (LSID transport) information of at least one ROUTE session constituting an ATSC service. The bootstrapping information of the ROUTE session may be information for acquiring information about the ROUTE session. For example, the information about the ROUTE session can be LSID. The bootstrapping information of the ROUTE session may be information for acquiring LSID. The ATSC SDP may include a first ROUTE session element and/or a second ROUTE session element.

The first ROUTE session element may include information about the first ROUTE session C700310 containing information about a service and/or a component included in the service. The first ROUTE session element may include transport path information for the first ROUTE session C700310. For example, the transport path information for the first ROUTE session C700310 can be used as information on a path through which a first LSID C700311 is transmitted. The broadcast reception apparatus can participate in a transport session through which the first LSID C700311 is transmitted and acquire the first LSID C700311.

The second ROUTE session element may include information about the second ROUTE session C700330 containing information about a service and/or a component included in the service. The second ROUTE session element may include transport path information for the second ROUTE session C700330. For example, the transport path information for the second ROUTE session C700330 can be used as information on a path through which a second LSID C700331 is transmitted. The broadcast reception apparatus can participate in a transport session through which the second LSID C700331 is transmitted and acquire the second LSID C700331.

The first LSID C700311 may include information about at least one transport session (LCT session), which is transmitted through the first ROUTE session C700310. The first LSID C700311 may be transmitted through a specific transport session in the first ROUTE session C700310. The broadcast reception apparatus can participate in a specific transport session on the basis of the first LSID C700311 and acquire a component.

The second LSID C700331 may include information about at least one transport session (LCT session), which is transmitted through the second ROUTE session C700330. The second LSID C700331 may be transmitted through a specific transport session in the second ROUTE session C700330. The broadcast reception apparatus can participate in a specific transport session on the basis of the second LSID C700331 and acquire a component.

The broadcast reception apparatus according to the tenth embodiment of the present invention can acquire a service on the basis of signaling data. Specifically, the broadcast reception apparatus can acquire low level signaling data and acquire service layer signaling data on the basis of the low level signaling data. Then, the broadcast reception apparatus can determine properties of a service using service layer signaling data (USD). Subsequently, the broadcast reception apparatus can select at least one component for the service using service layer signaling data (MPD). For example, the broadcast reception apparatus can select at least one component for the service using at least one representation ID of the MPD. Then, the broadcast reception apparatus can acquire information on a transport path through which the selected at least one component is transmitted using service layer signaling data (initialization segment, SDP and/or LSID). Subsequently, the broadcast reception apparatus can acquire service data for the service on the basis of the information on the transport path.

Figure 71:
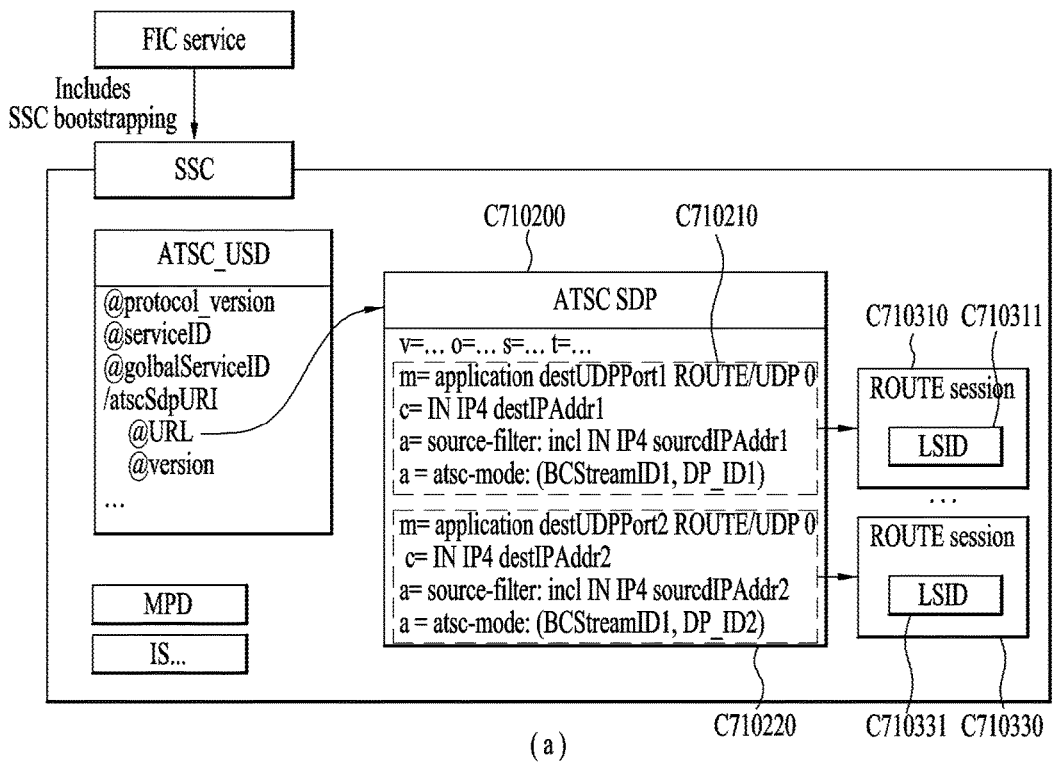
FIG. 71 illustrates an SDP according to the thirteenth embodiment of the present invention.

FIG. 71 illustrates an SDP according to the thirteenth embodiment of the present invention.

Referring to FIG. 71(a), an ATSC SDP C710200 may include bootstrapping (LSID transport) information of at least one ROUTE session constituting an ATSC service. The ATSC SDP C710200 may include a first ROUTE session element C710210 and/or a second ROUTE session element C710220.

For example, the ROUTE session element can include a bsid attribute which indicates the identifier of a broadcast stream in which a content component of a service is transmitted, an sIpAddr attribute which indicates the source IP address of a corresponding ROUTE session, an dIpAddr attribute which indicates the destination IP address of the ROUTE session, a dport attribute which indicates the destination port number of the ROUTE session and/or a PLPID attribute which indicates a physical layer parameter for the ROUTE session.

Referring to FIG. 71(b), the ROUTE session element may include media description (m), connection information (c), a source filter (a, source-filter) and/or an ATSC mode (a, atsc-mode) according to another embodiment.

The media description (m) may indicate the name of media and/or the description port of the corresponding ROUTE session. For example, the media description (m) can be represented as "application (Port) ROUTE/UDP 0".

The connection information (c) may indicate the destination IP address of the ROUTE session. For example, the connection information (c) can be represented as "IN (version) (destinationIPaddress)".

The source filter (a, source-filter) may indicate a source IP address. For example, the source filter (a) can be represented as "source-filter: incl IN (version) (sourceIPaddress)".

The ATSC mode (a, atsc-mode) may indicate the ID of a transport stream in which LSID of the ROUTE session is transmitted and/or the ID of a data pipe (or PLP) through which the LSID of the ROUTE session is transmitted when the ATSC broadcast mode is used. For example, the ATSC mode (a, atsc-mode) can be represented as "atsc-mode: (broadcastStreamID, dataPipeID)".

Referring back to FIG. 71(a), the first ROUTE session element C710210 may include information about a first ROUTE session C710310. The first ROUTE session element C710210 may include transport path information for the first ROUTE session C710310. For example, the transport path information for the first ROUTE session C710310 can be used as information on a path through which first LSID C710311 is transmitted. The broadcast reception apparatus can participate in a transport session in which the first LSID C710311 is transmitted on the basis of the transport path information and acquire the first LSID C710311.

For example, the media description (m) included in the first ROUTE session element C710210 can have a value of "application destUDPPort1 ROUTE/UDP 0", the connection information (c) included therein can have a value of "IN IP4 destIPAddr1", the source filter (a) included therein can have a value of "source-filter: incl IN IP4 sourceIPAddr1" and the ATSC mode (a, atsc-mode) included therein can have a value of "atsc-mode: (BCStreamID1, DP_ID1)".

The second ROUTE session element C710220 may include information about a second ROUTE session C710330. The second ROUTE session element C710220 may include transport path information for the second ROUTE session C710330. For example, the transport path information for the second ROUTE session C710330 can be used as information on a path through which second LSID C710331 is transmitted. The broadcast reception apparatus can participate in a transport session in which the second LSID C710331 is transmitted on the basis of the transport path information and acquire the second LSID C710331.

For example, the media description (m) included in the second ROUTE session element C710220 can have a value of "application destUDPPort2 ROUTE/UDP 0", the connection information (c) included in the second ROUTE session element C710220 can have a value of "IN IP4 destIPAddr2", the source filter (a) included in the second ROUTE session element C710220 can have a value of "source-filter: incl IN IP4 sourceIPAddr2" and the ATSC mode (a, atsc-mode) included in the second ROUTE session element C710220 can have a value of "atsc-mode: (BCStreamID1, DP_ID2)".

Figure 72:
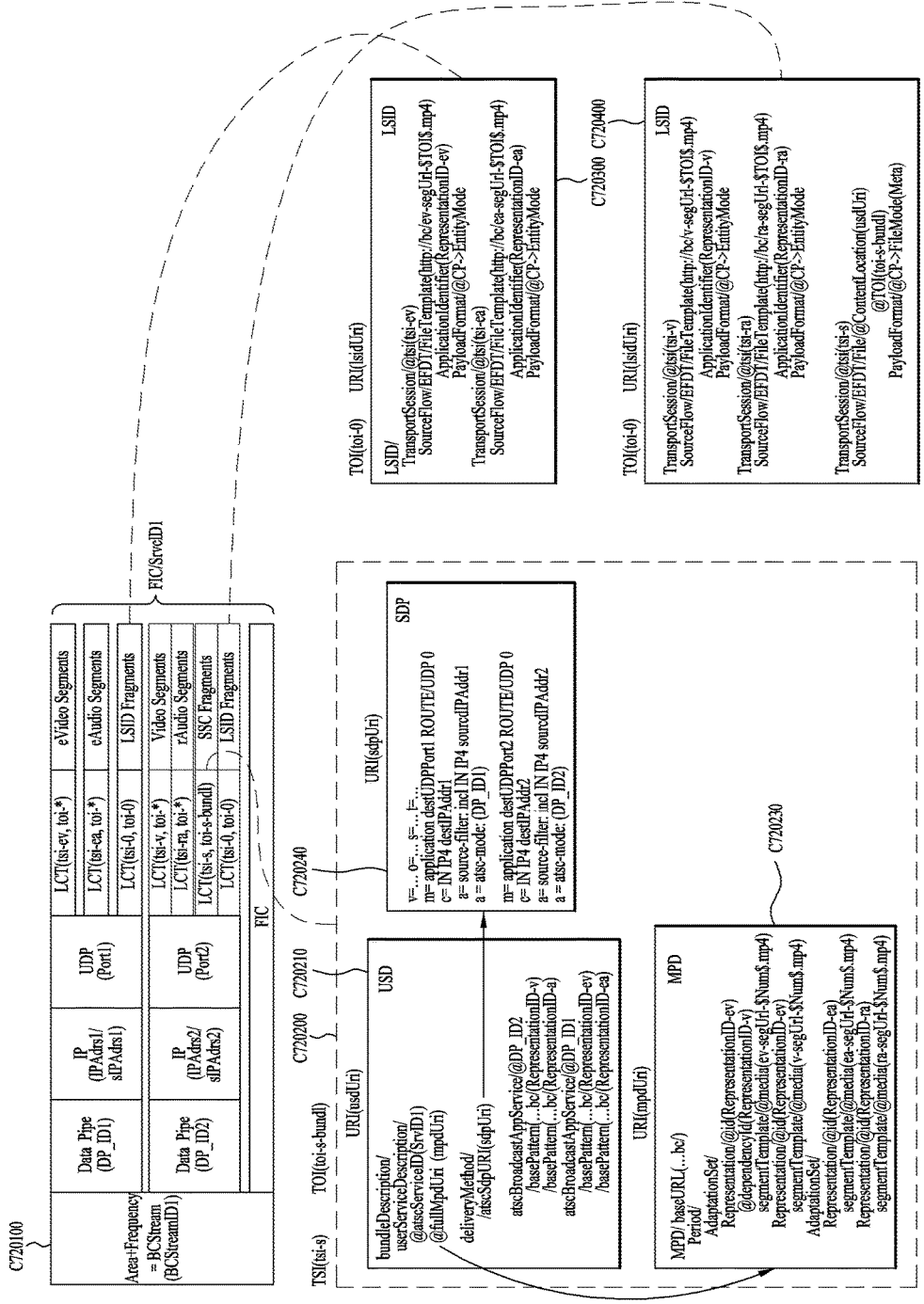
FIG. 72 illustrates service layer signaling according to the thirteenth embodiment of the present invention.

FIG. 72 illustrates service layer signaling according to the thirteenth embodiment of the present invention.

A broadcast signal C720100 having a specific frequency may include service data and/or signaling data for a service. For example, the service can have an identifier of "SrvcID1". The broadcast signal C720100 can be identified by "BCStreamID1".

The service data may include base service data for a base service and/or enhanced service data for an enhanced service.

The broadcast signal C720100 may include a base ROUTE session and/or an enhanced ROUTE session. The base service data may be transmitted through the base ROUTE session and the enhanced service data may be transmitted through the enhanced ROUTE session.

The signaling data may include low level signaling data and/or service layer signaling data. For example, the low level signaling data can include an FIC. The service layer signaling data may include USD, MPD (or full MPD), SDP (or ATSC SDP) and/or LSID.

The base ROUTE session may be identified by a combination of a source IP address (sIPAdrs2), a destination IP address (IPAdrs2) and a destination port number (Port2). In addition, the base ROUTE session may be transmitted through a first DP (DP_ID2). Furthermore, the base ROUTE session may include a base SSC transport session (tsi-s), a base LSID transport session (tsi-0), a base video transport session (tsi-v) and/or a base audio transport session (tsi-ra).

The enhanced ROUTE session may be identified by a combination of a source IP address (sIPAdrs1), a destination IP address (IPAdrs1) and a destination port number (Port1). In addition, the enhanced ROUTE session may be transmitted through a first DP (DP_ID1). Furthermore, the enhanced ROUTE session may include an enhanced LSID transport session (tsi-0), an enhanced video transport session (tsi-ev) and/or an enhanced audio transport session (tsi-re).

The contents of the broadcast signal C720100 can include the contents of the aforementioned broadcast signal. The following description is based on a difference between the broadcast signal C720100 and the aforementioned broadcast signal.

A description will be given of the FIC.

The FIC may include SSC bootstrapping information for acquiring service layer signaling data transmitted through an SSC.

A description will be given of the SSC.

The SSC C720200 may be identified by a transport session identifier having a value of "tsi-s" and/or a transport object identifier having a value of "toi-s-bundl". The SSC C720200 may include USD C720210, MPD C720230 and/or an SDP C720240.

A description will be given of the USD (bundleDescription/userServiceDescription).

The USD C720210 may describe service layer attributes. In addition, the USD C720210 may include reference information (or URI) referring to the MPD C720230 and/or the SDP C720240. For example, the USD C720210 can include an atscServiceID attribute, fullMpdUri attribute and/or a deliveryMethod element.

The atscServiceId attribute is an identifier uniquely identifying a service. For example, the atscServiceId attribute can have a value of "SrvID1".

The fullMpdUri attribute represents information (URL information or URI information) referring to MPD, including information about all content components of a service, transmitted through a mobile broadcast network (LTE broadcast), the Internet (unicast) and/or a normal broadcast network (ATSC broadcast or DVB broadcast). For example, the fullMpdUri attribute can have a value of "mpdUri".

The deliveryMethod element may include an atscSdpURI element, a first atscBroadcastAppService element and/or a second atscBroadcastAppService element.

The atscSdpURI element may include information (URL information or URI information) referring to an SDP (or S-TSID) which provides access related parameters for transport sessions delivering service content. For example, the atscSdpURI element can have a value of "sdpUri" referring to the SDP C720240.

The first atscBroadcastAppService element may include a DP_ID attribute which identifies a data pipe through which component data for a service is transmitted, a first basePattern element for a base video component and/or a second basePattern element for a base audio component. For example, the DP_ID attribute can have a value of "DP_ID2", the first basePattern element can have a value of " . . . bc/(RepresentationID-v)" and the second basePattern element can have a value of " . . . bc/(RepresentationID-a)".

The second atscBroadcastAppService element may include a DP_ID attribute which identifies a data pipe through which component data for a service is transmitted, a third basePattern element for an enhanced video component and/or a fourth basePattern element for an enhanced audio component. For example, the DP_ID attribute can have a value of "DP_ID1", the third basePattern element can have a value of " . . . bc/(RepresentationID-ev)" and the fourth basePattern element can have a value of " . . . bc/(RepresentationID-ea)".

A description will be given of the MPD.

The MPD C720230 may include a Period element. The Period element may include a first AdaptationSet element containing information about at least one video component and a second AdaptationSet element containing information about at least one audio component.

The first AdaptationSet element may include a Representation element for the enhanced video component and/or a Representation element for the base video component. The second AdaptationSet element may include a Representation element for the enhanced audio component and/or a Representation element for the base audio component.

Each Representation element may include an id attribute (or Rep_ID attribute) identifying a representation, a SegmentTemplate element including segment template information and/or a dependencyId attribute indicating at least one complementary representation on which corresponding representation depends in decoding and/or presentation processes. The SegmentTemplate element may include a media attribute including template information for generating a media segment list.

For example, an id attribute for the enhanced video component can have a value of "RepresentationID-ev", a dependencyId attribute for the enhanced video component can have a value of "RepresentationID-v" and a media attribute for the enhanced video component can have a value of "ev-segUrl-$Num$.mp4".

For example, an id attribute for the base video component can have a value of "RepresentationID-v" and a media attribute for the base video component can have a value of "v-segUrl-$Num$.mp4".

For example, an id attribute for the enhanced audio component can have a value of "RepresentationID-ea" and a media attribute for the enhanced audio component can have a value of "ea-segUrl-$Num$.mp4".

For example, an id attribute for the base audio component can have a value of "RepresentationID-ra" and a media attribute for the base audio component can have a value of "ra-segUrl-$Num$.mp4".

A description will be given of the SDP C720240.

The SDP 720240 may include an enhanced ROUTE session element which provides information about an enhanced ROUTE session and/or a base ROUTE session element which provides information about a base ROUTE session.

The enhanced ROUTE session element and/or the base ROUTE session element may include media description (m), connection information (c), a source filter (a, source-filter) and/or an ATSC mode (a, atsc-mode).

For example, media description (m) for the enhanced ROUTE session can have a value of "application destUDPPort1 ROUTE/UDP 0", the connection information (c) for the enhanced ROUTE session can have a value of "IN IP4 destIPAddr1", the source filter (a) for the enhanced ROUTE session can have a value of "source-filter: incl IN IP4 sourceIPAddr1" and the ATSC mode (a, atsc-mode) for the enhanced ROUTE session can have a value of "atsc-mode: (DP_ID1)".

For example, media description (m) for the base ROUTE session can have a value of "application destUDPPort2 ROUTE/UDP 0", the connection information (c) for the base ROUTE session can have a value of "IN IP4 destIPAddr2", the source filter (a) for the base ROUTE session can have a value of "source-filter: incl IN IP4 sourceIPAddr2" and the ATSC mode (a, atsc-mode) for the base ROUTE session can have a value of "atsc-mode: (DP_ID2)".

A description will be given of the enhanced LSID 720300.

For example, a tsi attribute included in an enhanced video transport session element can have a value of "tsi-ev", a FileTemplate element included in the enhanced video transport session element can have a value of http://bc/ev-segUri-$TOI$.mp4, a Rep_ID attribute included in the enhanced video transport session element can have a value of "RepresentationID-ev" and a CP attribute included in the enhanced video transport session element can indicate "EntityMode".

A tsi attribute included in an enhanced audio transport session element can have a value of "tsi-ea", a FileTemplate element included in the enhanced audio transport session element can have a value of http://bc/ea-segUri-$TOI$.mp4, a Rep_ID attribute included in the enhanced audio transport session element can have a value of "RepresentationID-ea" and a CP attribute included in the enhanced audio transport session element can indicate "EntityMode".

A description will be given of base LSID C720400.

For example, a tsi attribute included in a base video transport session element can have a value of "tsi-v", a FileTemplate element included in the base video transport session element can have a value of http://bc/v-segUri-$TOI$.mp4, a Rep_ID attribute included in the base video transport session element can have a value of "RepresentationID-v" and a CP attribute included in the base video transport session element can indicate "EntityMode".

A tsi attribute included in a base audio transport session element can have a value of "tsi-ra", a FileTemplate element included in the base audio transport session element can have a value of http://bc/ra-segUri-$TOI$.mp4, a Rep_ID attribute included in the base audio transport session element can have a value of "RepresentationID-ra" and a CP attribute included in the enhanced audio transport session element can indicate "EntityMode".

A tsi attribute included in an SSC transport session element may have a value of "tsi-s". An EFDT element may include a File element. The File element may include a Content-Location attribute and a TOI attribute. For example, the Content-Location attribute can have a value of "usdUri". The TOI attribute can have a value of "toi-s-bundl". A CP attribute included in the SSC transport session element can have a value of "FileMode(Meta).

Figure 73:
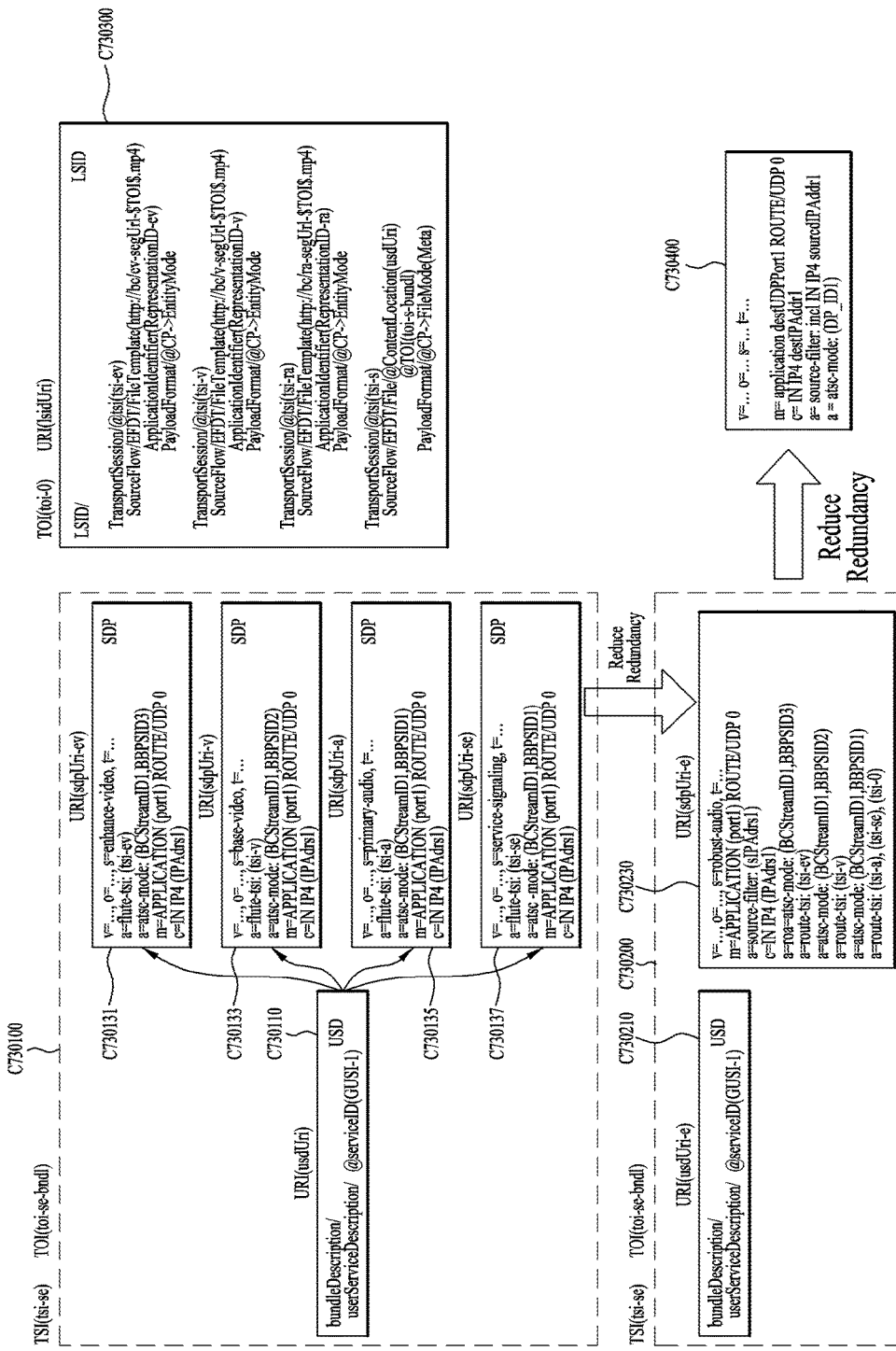
FIG. 73 illustrates service layer signaling according to the thirteenth embodiment of the present invention.

FIG. 73 illustrates service layer signaling according to the thirteenth embodiment of the present invention.

Service layer signaling according to the thirteenth embodiment of the present invention can provide a method for reducing SDP redundancy.

An SSC C730100 may include USD C730110, an enhanced video SDP C730131, a base video SDP C730133, a base audio SDP C730135 and/or an SSC SDP C730137.

The USD C730110 may include a serviced attribute. For example, the serviceID attribute can have a value of "GUSI-1".

In addition, the USD C730110 may include path information for the enhanced video SDP C730131, the base video SDP C730133, the base audio SDP C730135 and/or the SSC SDP C730137.

Each of the enhanced video SDP C730131, the base video SDP C730133, the base audio SDP C730135 and the SSC SDP C730137 may include component information (s), an originator and session identifier (o), a source filter (a), connection information (c), media description (m), an ATSC mode (a, atsc-mode) and/or TSI information (a, route-tsi or flute-tsi).

A description will be given of LSID 730300.

The LSID C730300 may include an enhanced video transport session element, a base video transport session element, a base audio transport session element and/or an SSC transport session element. The contents of the LSID C730300 can include the contents of the aforementioned LSDI.

An SSC C730200 according to the thirteenth embodiment of the present invention may include USD C730210 and/or an SDP C730230. The SSC C730200 can reduce redundancy by including a single SDP C730230, compared to the SSC C730100.

For example, the SDP C730230 can include component information (s), an originator and session identifier (o), a source filter (a), connection information (c), media description (m), an ATSC mode (a, atsc-mode) and/or TSI information (a, route-tsi or flute-tsi).

The SDP C730230 may include an ATSC mode (a=atsc-mode: BCStreamID1,BBPSID3) and/or TSI information (a=route-tsi: (tsi-ev)) for an enhanced video component. In addition, the SDP C730230 may include an ATSC mode (a=atsc-mode: BCStreamID1,BBPSID2) and/or TSI information (a=route-tsi: (tsi-v)) for a base video component. Furthermore, the SDP C730230 may include an ATSC mode (a=atsc-mode: BCStreamID1,BBPSID1) and/or TSI information (a=route-tsi: (tsi-a), (tsi-se), (tsi-0)) for an SSC component.

An SSC C730400 according to the thirteenth embodiment of the present invention can further reduce redundancy by including an SDP modified from the SDP C730230. The modified SDP may include only bootstrapping information of a ROUTE session. The broadcast reception apparatus can further reduce SDP redundancy by discovering a transport session ID (tsi) list, which is described per transport DP, in LSID and matching the tsi list to data pipes.

For example, the modified SDP can include media description (m=application destUDPPort1 ROUTE/UDP 0), connection information (c=IN IP4 destIPAddr1), a source filter (a=source-filter: incl IN IP4 sourceIDAddr1) and/or an ATSC mode (a=atsc-mode: (DP_ID1).

FIG. 74 illustrates a signaling structure for signaling capabilities of a receiver for using broadcast services/content according to an embodiment of the present invention.

According to an embodiment of the present invention, USD may include CapabilityDescription. Capability information which is signaled by signaling information may include essential capability information indicating capabilities that need to be essentially described to render a specific broadcast service or broadcast content (broadcast service/content). While the capability information is non-essential for broadcast service/content rendering, a receiver having supportable capability may include information about normal capability for enabling execution of a specific function. That is, the capability information can be classified into essential capability information and normal capability information.

Unless the capability information is classified into essential capability information and normal capability information, the broadcast receiver can receive and render specific broadcast services/content but the receiver may skip the broadcast service/content. To solve this problem, the present invention can additionally signal essential_flag information, which indicates whether corresponding capability information is essential capability information, for capability_code information.

Referring to FIG. 74(a), USD according to an embodiment of the present invention may include @protocolVersion information, @atscServiceId information, @fullMpdUri information, a CapabilityDescription element, a capability_code element, @essential_flag information, a TargetingDescription element, a ContentAdvisoryDescription element, a ProgramTitleDescription element, a name element, @lang information, a serviceLanguage element, a requiredCapabilities element and/or a feature element.

The @protocolVersion information indicates the protocol version of the USD.

The @atscServiceId information identifies a broadcast service.

The @fullMpdUri information indicates the URI of the location to which full MPD is provided.

The CapabilityDescription element may include information which specifies capability required for a receiver for meaningful presentation of broadcast services/content.

The capability_code element may include information indicating capability required for the receiver to enable meaningful presentation of broadcast services/content. The capability_code element may include information specifying capability type and/or information indicating standards of required capability per capability.

The @essential_flag information indicates whether specific capability is essential for broadcast service/content rendering. The @essential_flag information may correspond to information indicating whether capability specified by the capability_code element corresponds to essential capability information or normal capability information. The @essential_flag information may indicate whether capability information corresponds to essential capability information about capability essentially necessary to render a broadcast service or broadcast content or normal capability information about capability which is not essential for rending the broadcast service or broadcast content but is necessary to process a specific element included in the broadcast service or broadcast content.

The TargetingDescription element may include data and/or information about a target to which broadcast services will be provided.

The ContentAdvisoryDescription element may include data and/or information for conditional access.

The ProgramTitleDescription may include information indicating the title of a broadcast program.

The name element may indicate the name of a service, provided by the @lang information. The name element may include the @lang information indicating the language of the service name. The language may be specified according to XML data type.

The serviceLanguage element includes information specifying a language in which a broadcast service is provided.

The requiredCapabilities element may include information indicating receiver capability required for a specific service.

The feature element may include information specifying a specific service included in broadcast services.

Referring to FIG. 74(b), a capability code specifies capability that supports HD (High Definition) and the essential_flag with respect to the capability code is set to "true". Accordingly, the receiver needs to have HD processing capability in order to render a corresponding broadcast service/content. However, when a capability code specifies capability supporting HDR (High Dynamic Range) and the essential_flag with respect to the capability code is set to "false", the receiver can process HDR for the corresponding broadcast service/content when the receiver supports HDR capability.

When a capability code specifies capability that supports UHD (Ultra High Definition) and the essential_flag with respect to the capability code is set to "true", the receiver needs to have capability to process UHD in order to render the corresponding broadcast service/content According to the present invention, the receiver can control the quality and property of a broadcast service/content provided thereto in consideration of device capability and capability information according to CapabilityDescription upon reception of signaling information.

When the essential_flag is not present, a receiver having capability lower than capability indicated by capability information cannot receive a corresponding broadcast service/content or has to skip the broadcast service/content even if the receiver receives the same irrespective of whether the capability information is essential capability information or normal capability information. When the essential_flag is used, however, a receiver which has no capability indicated by normal capability information but has capability indicated by essential capability information can receive and render a corresponding broadcast service/content.

Figure 75:
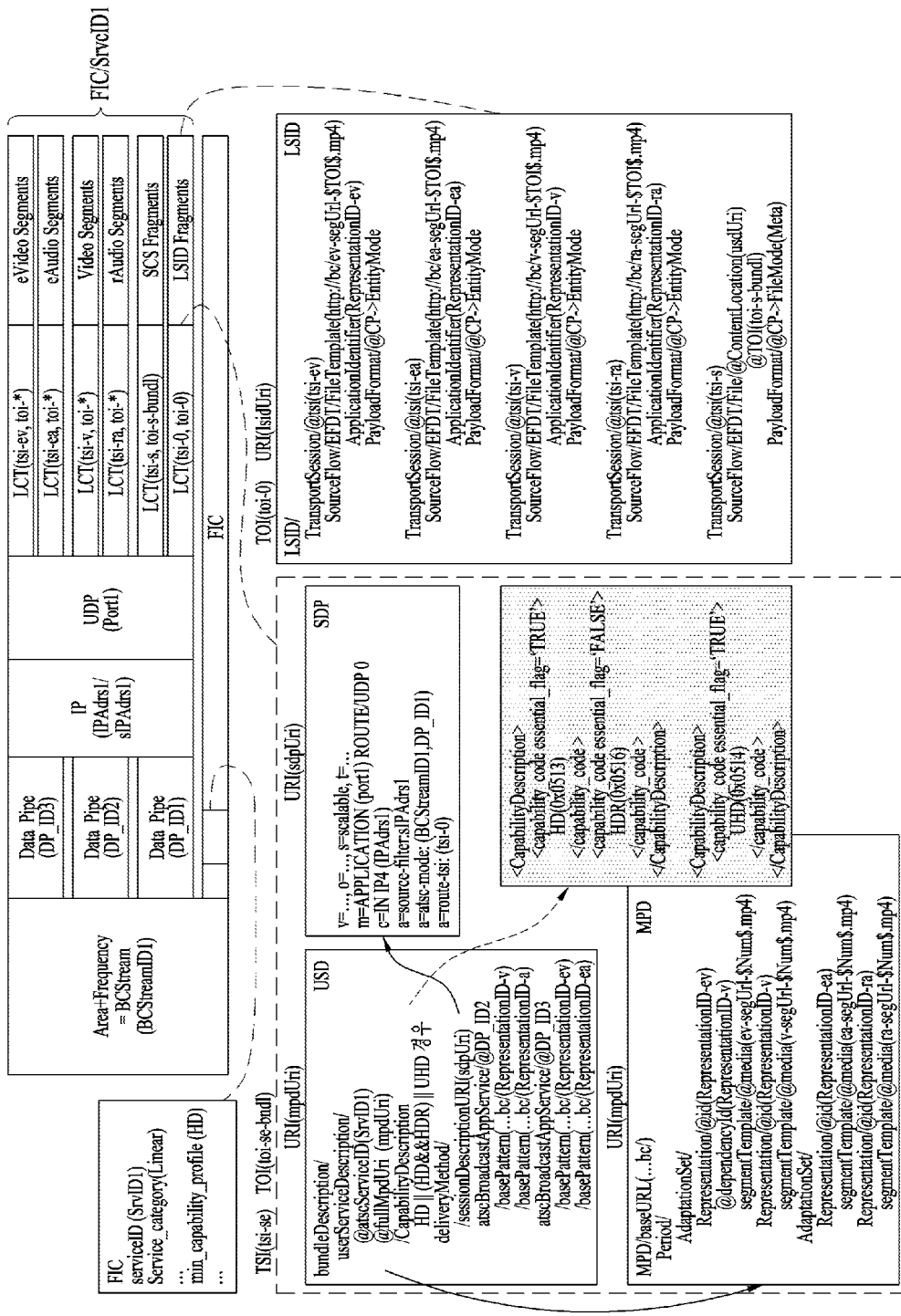
FIG. 75 illustrates a procedure through which the receiver accesses broadcast services/content using the signaling structure according to an embodiment of the present invention.

FIG. 75 illustrates a procedure by which a receiver accesses a broadcast service/content using a signaling structure according to an embodiment of the present invention.

The receiver acquires an FIC (or SLT) from a broadcast signal. Data specified by a specific IP address and UDP number may correspond to the FIC in the broadcast signal, and the receiver may acquire the FIC by obtaining the data provided with the IP address and UDP number. The receiver may acquire minimum capability information (min_capability_profile information) required for the receiver for a broadcast service specified by serviceID information. The minimum capability information may specify minimum capability of the receiver, which is necessary to decode one or more broadcast services belonging to the range of the FIC. In the present embodiment, HD processing capability corresponds to the minimum capability required for the receiver.

The receiver may recognize a session or location at which service level signaling information (service layer signaling information or a service signaling channel) is transmitted using information included in the FIC. The receiver may recognize that data delivered through a transport session identified by specific TSI information and/or TOI information correspond to service level signaling information.

The receiver acquires MPD using @fullMpdUri information contained in USD included in the service level signaling information. The receiver presents the corresponding broadcast service/content using information included in the MPD.

The receiver may acquire an SDP using information included in the USD.

The receiver acquires a CapabilityDescription element in the USD included in the service level signaling information. The receiver may be aware that capability for rendering the broadcast service/content corresponds to HD or UHD and capability indicated by normal capability information for the corresponding broadcast service/content corresponds to HDR processing capability using information contained in the CapabilityDescription element.

The receiver may access a transport session delivering data provided for corresponding specifications according to whether to process the broadcast service/content as HD service/content or UHD service/content. The receiver may access a transport session delivering specific data using information such as LSID.

In the present embodiment, when RepresentationId is "ev", this indicates a component for UHD. When RepresentationId is "v", this indicates a component for HD.

FIG. 76 illustrates USD which provides information about a transport session in which data of a broadcast service/content is transmitted according to an embodiment of the present invention.

Referring to FIG. 76(a), when information contained in a deliveryMethod element of the USD indicates transmission of a component of the broadcast service/content using the ROUTE protocol of ATSC broadcast, information about location at which LSID including information for accessing a ROUTE session is transmitted may be additionally included in the USD.

According to the present invention, a unified signaling method can be used for a broadcast system since information necessary for a receiver to acquire a component can be signaled through information of the USD. In addition, when the value of atsc-mode, which is an attribute added to the SDP, is defined, the present invention can indicate the attribute value of atsc-mode using a corresponding broadcast stream id only although the attribute value should be set by combining the broadcast stream id and the corresponding DP_ID in conventional schemes.

Referring to FIG. 76(a), the USD may include the deliveryMethod element, an r7:unicastAccessURI element, a basePattern element, an r8:alternativeAccessDelivery element, a unicastAccessURI element, timeShiftBuffer attribute information, an r12:broadcastApp Service element, @serviceArea information, r12:unicastAppservice element, an atscBroadcastAppService element, @DP_ID information, @BroadcastStreamID information, @IPAddr information, @UDPPort information, @TSI information, an atsc-SdpURI element and/or @LSID_DP_ID information in addition to the information and/or elements included in the aforementioned USD.

The deliveryMethod element may include data and/or information about a method for delivering broadcast services.

The r7:unicastAccessURI element may include URI information for accessing a broadcast service transmitted through a broadband network.

The basePattern element may include the aforementioned base URI information. The basePattern element may be a character pattern used by a receiver to be matched to all parts of a segmented URL used by a DASH client to request media segmentation of parent representation in a corresponding period. Matching refers to delivery of the requested media segmentation through broadcast transport. The basePattern element may indicate a base pattern used to recognize the location of a specific service in a method of transmitting the specific service according to transport mode.

The r8:alternativeAccessDelivery element includes data and/or information about an alternative method for delivering a broadcast service.

The unicastAccessURI element includes information indicating the URI of the location to which a broadcast service delivered by the alternative method is provided when the broadcast service is transmitted through a broadband network.

The timeShiftBuffer attribute information includes information about data and/or information about a buffer for time shifting.

The r12:broadcastAppService element includes data and/or information about a service delivered through a broadcast network.

The serviceArea element may include information specifying an area to which a service is provided or the type of the service.

The r12:unicastAppService element may include data and/or information about a service delivered through a broadband network.

The atscBroadcastAppService element includes information and/or an element about a service delivered through the broadcast network.

The @DP_ID information identifies a data pipe delivering a service.

The @BroadcastStreamID information identifies a broadcast stream (or broadcasting station) delivering a service.

The @IPAddr information indicates the IP address of the location to which a service is provided.

The @UDPPort information indicates the UDP number of the location to which data included in a service is transmitted.

The @TSI information identifies a transport session through which data included in a service is transmitted.

The atscSdpURI element may include information which identifies a URI indicating the location to which an ATSC SDP is provided.

The @LSID_DP_ID information identifies a data pipe including LSID.

Referring to FIG. 76(b), the receiver may acquire an SDP or LSID from a data pipe indicated by the @LSID_DP_ID information included in the USD.

Figure 77:
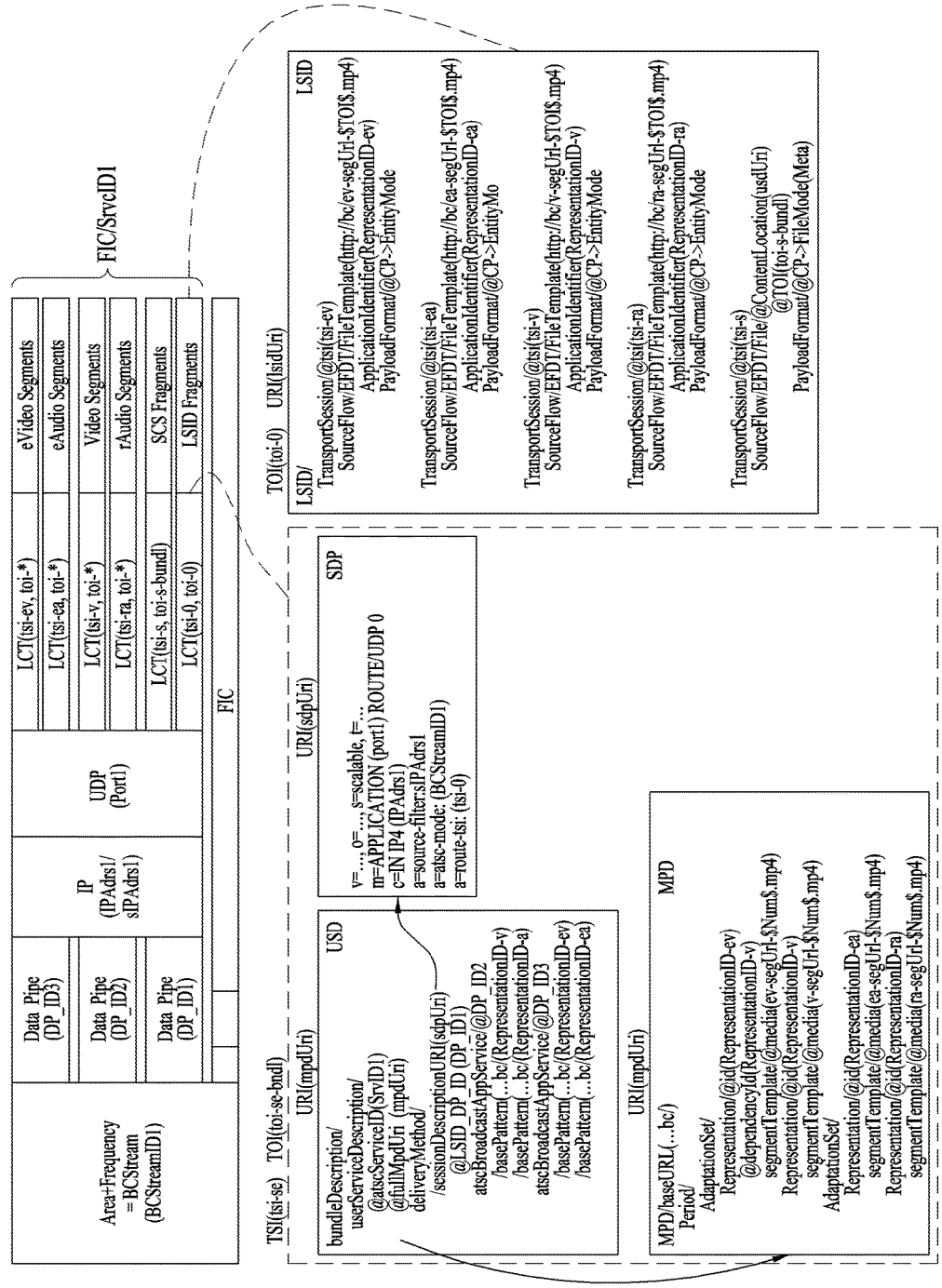
FIG. 77 illustrates a procedure through which the receiver accesses broadcast services/content using a signaling structure according to an embodiment of the present invention.

FIG. 77 illustrates a procedure by which a receiver accesses a broadcast service/content using a signaling structure according to an embodiment of the present invention.

The receiver acquires an FIC (or SLT) from a broadcast signal. Data specified by a specific IP address and UDP number may correspond to the FIC in the broadcast signal, and the receiver may acquire the FIC by obtaining the data.

The receiver may recognize a session or location at which service level signaling information (service layer signaling information or a service signaling channel) is transmitted using information included in the FIC. The receiver may recognize that data delivered through a transport session identified by specific TSI information and/or TOI information corresponds to service level signaling information.

The receiver acquires MPD using @fullMpdUri information contained in USD included in the service level signaling information. The receiver presents the corresponding broadcast service/content using information included in the MPD.

The receiver may acquire an SDP using information included in the USD. The USD may include the @LSID_DP_ID information, as described above, and the receiver may acquire LSID by obtaining data transmitted through a data pipe identified by the @LSID_DP_ID information.

The receiver may access a transport session through which a component included in the corresponding broadcast service/content is transmitted using information contained in the LSID to acquire related data.

Figure 78:
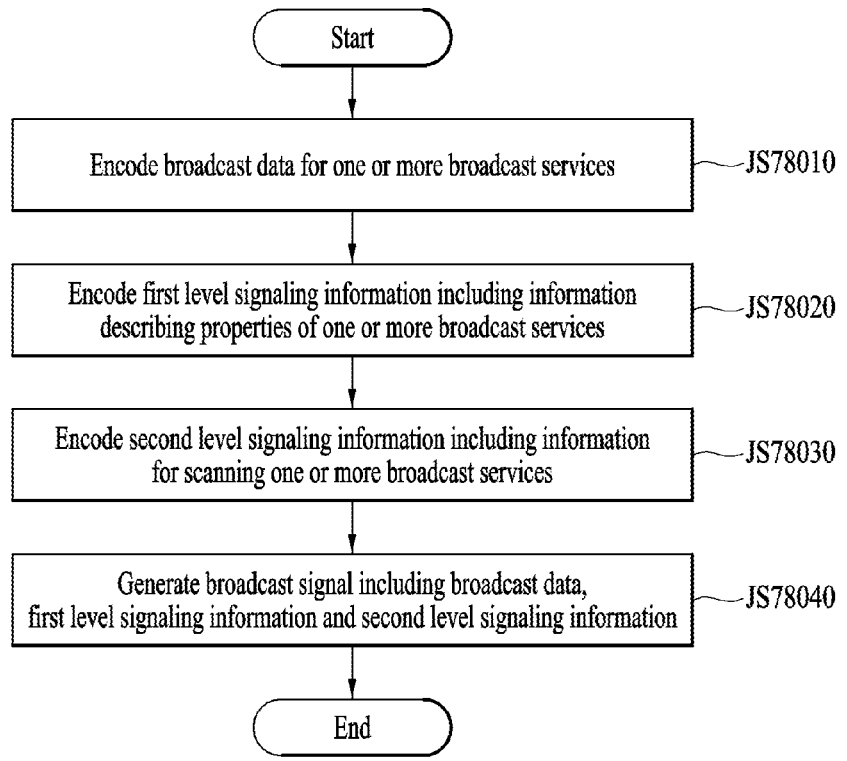
FIG. 78 is a flowchart illustrating a method for generating and processing a broadcast signal according to an embodiment of the present invention.

FIG. 78 is a flowchart illustrating a method for generating and processing a broadcast signal according to an embodiment of the present invention.

A transmitter encodes broadcast data for one or more broadcast services (JS78010).

The transmitter encodes first level signaling information including information which describes properties of the one or more broadcast services (JS78020).

The transmitter encodes second level signaling information including information for scanning the one or more broadcast services (JS78030).

The transmitter generates a broadcast signal including the first level signaling information and the second level signaling information (JS78040).

According to an embodiment of the present invention, the first level signaling information may include USD information which describes service layer properties with respect to the broadcast services.

According to an embodiment of the present invention, the USD information may include capability information specifying capabilities necessary to present broadcast content of the broadcast services.

Figure 79:
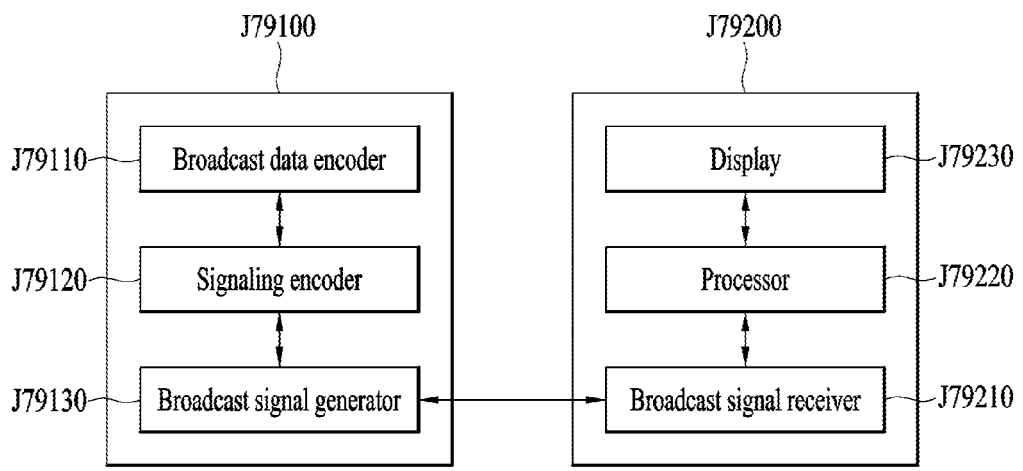
FIG. 79 is a block diagram of a broadcast system according to an embodiment of the present invention.

FIG. 79 is a block diagram illustrating a broadcast system according to an embodiment of the present invention.

The broadcast system according to an embodiment of the present invention may include a broadcast transmitter J79100 and/or a broadcast receiver J790200.

The broadcast transmitter J79100 may include a broadcast data encoder J79110, a signaling encoder J79120 and/or a broadcast signal generator J79130.

The broadcast receiver J790200 may include a broadcast signal receiver J79210, a processor J79220 and/or a display J79230.

The broadcast data encoder J79110 encodes broadcast data for one or more broadcast services.

The signaling encoder J79120 encodes first level signaling information including information which describes properties of the one or more broadcast services and second level signaling information including information for scanning the one or more broadcast services.

The broadcast signal generator J79130 generates a broadcast signal including the broadcast data, the first level signaling information and the second level signaling information.

According to an embodiment of the present invention, the first level signaling information may include USD information which describes service layer properties with respect to the broadcast services.

According to an embodiment of the present invention, the USD information may include capability information specifying capabilities necessary to present broadcast content of the broadcast services.

The broadcast signal receiver J79210 receives the broadcast signal including the broadcast data for the one or more broadcast services, the first level signaling information including information which describes properties of the one or more broadcast services and the second level signaling information including information for scanning the one or more broadcast services. The first level signaling information may include USD information which describes service layer properties with respect to the broadcast services and the USD information may include capability information specifying capabilities necessary to present broadcast content of the broadcast services.

The processor J79220 controls the broadcast receiver J79200 to present the broadcast services by acquiring the broadcast services using the second level signaling information and/or the first level signaling information. The processor J79220 may control the broadcast receiver J79200 to skip the corresponding broadcast services/content when capabilities of the broadcast receiver are lower than capabilities indicated by capability information.

The display J79230 displays the broadcast services/content.

FIG. 80 illustrates extended USBD/USD for indicating a full MPD URI according to an embodiment of the present invention.

The USBD or USD may include URI information for referring to MPD which is a fragment of SLS, as described above. There are various types of MPD as described above. Full MPD may be MPD including reproduction related information about all service components included in a corresponding service. eMBMS MPD may be MPD including reproduction related information about a service component delivered by an eMBMS bearer. AppService MPD may be MPD including reproduction related information about broadcast or unicast service components of mobile broadcasting. As described above, the eMBMS MPD or AppService MPD can be used for genuine mobile broadcast network services.

The full MPD can be used for genuine normal broadcast network services and hybrid services (ATSC/3GPP) as described above. The USBD or USD can include information referring to various types of MPD, and it is possible to propose methods of including URI information referring to the full MPD in the USBD/USD by extending/modifying the USBD/USD.

Here, the USBD or USD may be extended/modified on the basis of one of USBDs/USDs according to the aforementioned embodiments. That is, the USBD/USD extended in the present embodiment may have one of the structures and fields of the USBDs/USDs according to the aforementioned embodiments.

The illustrated embodiment t80010 of USBD may further include URI information for indicating the full MPD. The illustrated embodiment t80010 of the USBD may include @fullMpdUri field. The @fullMpdUri field is a lower filed of the USBD/USD element and may describe the URI of the full MPD to be used in a service in the present embodiment. The @fullMpdUri field may be located under other elements according to embodiments. The @fullMpdUri field may be added to another type of USBD/USD to extend the corresponding USBD/USD. The @fullMpdUri field may be identical to the aforementioned @atsc:fullMPDUri field and @fullMpdUri information.

Other fields included in the illustrated embodiment t80010 of the USBD may be identical to the aforementioned corresponding ones. For example, name, @lang, serviceLanguage, requiredCapability, feature, deliveryMethod, r7unicastAccessURI, basePattern, r8:alternativeAccessDelivery, unicastAccessURI, timeShiftingBuffer, r12:broadcastAppService, serviceArea and/or r12:unicastAppService shown in the figure can be identical to the aforementioned corresponding ones.

The illustrated diagram t80020 shows a process of referring to MPDs according to the present embodiment. The full MPD can be indicated by the @fullMpdUri field added to the USBD. r9:MPD can be indicated by information contained in r9:mediaPresentationDescription of the USBD. r12:MPD can be indicated by information included in r12:appService of the USBD. Here, r9:MPD may correspond to the aforementioned eMBMS MPD and r12:MPD may correspond to the aforementioned AppSvc MPD.

It is possible to clearly discriminate the full MPD from other MPDs while maintaining the structures and syntaxes of previously used USBDs/USDs through the aforementioned extension/modification.

FIG. 81 illustrates extended USBD/USD for indicating a full MPD URI according to an embodiment of the present invention.

To refer to the full MPD, r9:mediaPresentationDescription information included in conventional USBD/USD and profile information in MPD may be combined and used.

The r9:mediaPresentationDescription information may include information related to MPD used in conventional mobile broadcasting (e.g. 3GPP). mpdUri information under the r9:mediaPresentationDescription may include URI information of the MPD of mobile broadcasting. This MPD may correspond to the aforementioned eMBMS MPD or r9:MPD.

In addition, the MPD may include @profiles information. The @profiles information may indicate profile information of the MPD. The @profiles information can be used to check the type of the corresponding MPD by serving as the profile identifier of the MPD. This profile information can indicate one of MPD profiles defined in DASH. In addition, the MPD may further include @id information for identifying the MPD.

The present invention can discriminate the full MPD from other MPDs by combining the r9:mediaPresentationDescription information and the profile information of MPD. Specifically, the MPD can be referred to by the mpdUri information in the r9:mediaPresentationDescription. Whether the corresponding MPD is full MPD or a different type of MPD can be indicated by the profile information of the referred MPD. For example, the corresponding MPD may be full MPD or r9:MPD according to the profile information. As described above, normal broadcast services and hybrid services can use the full MPD and mobile broadcast services can use r9:MPD and eMBMS MPD according to embodiments.

In the illustrated USBD/USD t81010, other fields may be identical to the aforementioned corresponding ones, and information other than r9:mediaPresentationDescription may be extended and the aforementioned operation may be performed. In addition, the type of corresponding MPD may be indicated using ID information instead of the profile information of the MPD.

In the illustrated diagram t81020, MPD is referred to by mpdUri information of r9:mediaPresentationDescription. Whether the corresponding MPD is full MPD can be indicated by the profile attribute of the MPD. Here, one MPD can be used in normal broadcast services (ATSC) as full MPD and another MPD can be used in mobile broadcast services (3GPP) as eMBMS MPD. r12:MPD may be referred to by information included in r12:appService of the USBD/USD. According to an embodiment, full MPD may be referred to using profile information of MPD referred to by r12:MPD.

It is possible to clearly discriminate the full MPD from other MPDs while maintaining the structures and syntaxes of previously used USBDs/USDs through the aforementioned extension/modification.

FIG. 82 illustrates extended USBD/USD for indicating a full MPD URI according to an embodiment of the present invention.

To refer to full MPD, the USBD/USD can be extended by including information related to the full MPD in the r12:appService element in the conventional USBD/USD.

The r12:appService element may include information related to MPD used in conventional mobile broadcasting (e.g. 3GPP). The USBD/USD may further include URI information for referring to the full MPD as lower information of the r12:appService element. The URI information may be included in @fullMpdUri field. The @fullMpdUri field has been described above. Accordingly, information of the r12:appService element can be used to refer to r12:MPD and the @fullMpdUri field added to the r12:appServiece element can be used to refer to the full MPD. r12:MPD may correspond to the aforementioned AppSvc MPD.

In the illustrated USBD/USD t82010, other fields are identical to the aforementioned corresponding fields, and the @fullMpdUri field may be added to information other than the r12:appService element according to an embodiment.

In the illustrated diagram t82020, the full MPD is referred to by the @fullMpdUri field of the r12:appService element. In addition, r12:MPD is referred to by the information of the r12:Service element and r9:MPD is referred to by mpdUri information of r9:mediaPresentationDescription.

It is possible to clearly discriminate the full MPD from other MPDs while maintaining the structures and syntaxes of previously used USBDs/USDs through the aforementioned extension/modification.

FIG. 83 illustrates extended USBD/USD for indicating a full MPD URI according to an embodiment of the present invention.

To refer to the full MPD, a separate element may be added to the conventional USBD/USD. The element may include information related to the full MPD. The full MPD can be referred to using information of the element.

An atsc:appService element can be added to the aforementioned USBD/USD. This element may include information related to normal broadcast services and may further include URI information for referring to the full MPD. @appServiceDescriptionURI field of the atsc:appService element may include information referring to the full MPD. The full MPD can be referred to using this information.

In addition, the atsc:appService element may further include identicalContent, basePattern, alternativeContent and/or @mimeType fields. These fields have been described above and may include information about normal broadcast services described by the added atsc:appService element.

In the illustrated USBD/USD t83010, other fields have been described above. The atsc:appService element may be added to location different from the aforementioned one in the USBD/USD.

In the illustrated diagram t83020, the full MPD is referred to by the @appServiceDescriptionURI field of the added atsc:appService element. In addition, r:9MPD is referred to using reference information included in r9:mediaPresentationDescription and r12:MPD is referred to using information of the r12:appService element.

It is possible to clearly discriminate the full MPD from other MPDs while maintaining the structures and syntaxes of previously used USBDs/USDs through the aforementioned extension/modification.

Figure 84:
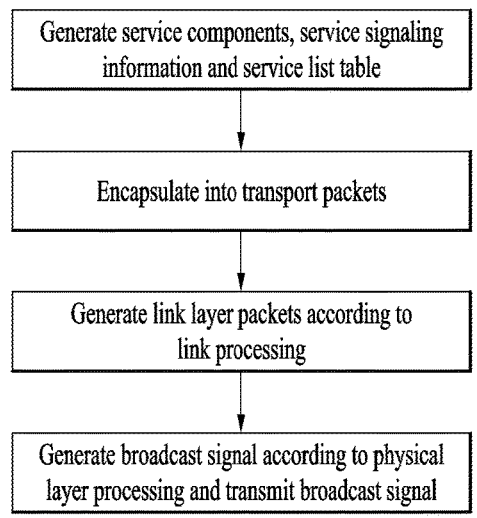
FIG. 84 is a flowchart illustrating a method for transmitting a broadcast signal according to an embodiment of the present invention.

FIG. 84 illustrates a method for transmitting a broadcast signal according to an embodiment of the present invention.

The method for transmitting a broadcast signal according to an embodiment of the present invention may include the steps of generating service components, service signaling information and a service list table, encapsulating the service components, the service signaling information and the service list table into transport packets, generating link layer packets by link-processing the transport packets, and generating a broadcast signal by physical-layer-processing the link layer packets and transmitting the broadcast signal.

Specifically, a first module of a transmitting side may generate service components of at least one service. The service components may be included in each service. A service component may include information such as audio/video information or closed captioning. The first module may also generate service signaling information signaling such service data. The service signaling information may correspond to the aforementioned SLS. The first module may generate a service list table. The service list table may correspond to the aforementioned SLT. The SLT may be included in low level signaling (LLS) and delivered, as described above. This step may correspond to an upper stack of IP/UDP in the protocol stack. The first module may be a hardware module associated with generation of media data for reproduction as a service provider.

The generated service components, SLS and/or SLT may be encapsulated into transport packets. Here, the transport packets may correspond to IP packets. This step may be performed by a second module of the transmitting side. The second module may be a hardware module associated with generation of IP packets in the UDP/IP layer. The packets including the SLS and the service components may be delivered through a ROUTE or MMTP transport session. Specifically, the packets may be transmitted through a sub-session of the corresponding transport session, that is, an LCT session of the ROUTE session or an MMTP packet flow of the MMTP session. Packets delivering the SLT (that is, packets delivering the LLS) may be transmitted through a predetermined transport session. The SLT may be delivered through a transport session identified by a pre-designated IP address and UDP port number.

A third module of the transmitting side is a module managing the link layer and may perform the aforementioned operations such as header compression and/or link layer packet encapsulation in the link layer. The third module may generate one or more link layer packets by processing the generated transport packets in the link layer.

A fourth module of the transmitting side is a module managing the physical layer and may physical-layer-process the link layer packets. Physical layer processing can include the aforementioned encoding, interleaving, framing and waveform generation operations. In addition, the fourth module may transmit a broadcast signal generated according to physical layer processing. The third module of the transmitting side may be included in the fourth module according to an embodiment. The third module and the fourth module may be integrated into one module according to an embodiment.

In the present embodiment, the aforementioned SLT may include information indicating a transport session through which SLS per service is delivered. Here, the information indicating a transport session may refer to the aforementioned IP/UDP information as bootstrap information in the SLT.

In a method for transmitting a broadcast signal according to another embodiment of the present invention, the service signaling information may include user service bundle description (USBD) and the USBD may serve as a signaling hub which describes technical information about a corresponding service. As described above, the SLS may include the USBD.

In a method for transmitting a broadcast signal according to another embodiment of the present invention, the service signaling information may further include media presentation description (MPD) and the USBD may include URI information referring to the MPD. As described above, the SLS may include the MPD. The USBD includes URI information referring to the MPD. Here, the MPD may be full MPD, r9:MPD or r12:MPD according to embodiments. The MPD may be full MPD in the case of normal broadcast services. In this case, the MPD referred to by the USBD may be full MPD, and the URI information referring to the MPD may refer to URI information referring to the full MPD included in the USBD. The USBD may also include information referring to r9 MPD and r12 MPD. The MPD may include reproduction related information about service components of the corresponding service delivered through a broadcast network or a broadband network.

In a method for transmitting a broadcast signal according to another embodiment of the present invention, the MPD may be full MPD which describes reproduction related information about all service components included in the corresponding service. The full MPD has been described above and may be used in normal broadcast services and hybrid broadcast services rather than mobile broadcast services.

In a method for transmitting a broadcast signal according to another embodiment of the present invention, the USBD may further include transmission related information about the service components of the corresponding service. Here, the transmission related information may correspond to the aforementioned deliveryMethod field. As described above, the deliveryMethod field may be a container of transmission information about service data which can be accessed through a broadcast network or a broadband network.

The deliveryMethod field may include broadcast information, and the broadcast information may include transmission related information about a service component of a service transmitted through the broadcast network. Here, the broadcast information may correspond to the broadcastAppService and r12:broadcastAppService fields included in the deliveryMethod field. The broadcast information may include information about DASH representation including a service component contained in a normal broadcast service. Here, DASH representation may be a service component delivered through the broadcast network. This field may correspond to the aforementioned r12:AppService field according to an embodiment. This field may further include the basePattern field.

In a method for transmitting a broadcast signal according to another embodiment of the present invention, the transmission related information may include unicast information, and the unicast information may include transmission related information about a service component of a service delivered through a broadband network. Here, the unicast information may correspond to the unicastAppService and r12:unicastAppService fields included in the deliveryMethod field. The unicast information may include information about DASH representation including a service component contained in a normal broadcast service. Here, DASH representation may be a service component delivered through the broadband network. This field may correspond to the aforementioned r12:AppService field according to an embodiment. This field may further include the basePattern field.

In a method for transmitting a broadcast signal according to another embodiment of the present invention, the service signaling information may further include transport session description, and the USBD may further include URI information referring to the transport session description. Here, the transport session description may correspond to the aforementioned S-TSID. The transport session description may correspond to the aforementioned LSID according to an embodiment. The transport session description may include session identifier information identifying sub-sessions of a transport session through which service components of a corresponding service are delivered. The transport session may correspond to a ROUTE or MMTP session and a sub-session may correspond to an LCT sessions or an MMTP packet flow. The session identifier information may correspond to TSI information or an MMTP packet ID.

A description will be given of a method for receiving a broadcast signal according to an embodiment of the present invention, which is not shown in the drawings.

The method for receiving a broadcast signal according to an embodiment of the present invention may include the steps of receiving and physical-layer-processing a broadcast signal by a first module of a receiving side, deencapsulating/decompressing link layer packets acquired according to physical layer processing into transport packets by a second module of the receiving side, acquiring an SLT, SLS and service data by a third module of the receiving module through a reverse process of IP/UDP processing and/or providing a service using the acquired service data by a fourth module of the receiving side. Here, physical layer processing, link processing and IP/UDP layer processing of the receiving side may correspond to reverse processes of those of the transmitting side. The step of acquiring the service data may be subdivided into bootstrapping of the SLT into SLS and a process of acquiring service components using information of the SLS, as described above. Details have been described above.

Methods for receiving a broadcast signal according to embodiments of the present invention may correspond to the methods for transmitting a broadcast signal according to the aforementioned embodiments of the present invention. The methods for receiving a broadcast signal may be performed by hardware modules corresponding to the modules (e.g. the first, second, third and fourth modules of the transmitting side) used in the methods for transmitting a broadcast signal. The methods for receiving a broadcast signal may have embodiments corresponding to the aforementioned embodiments of the methods for transmitting a broadcast signal.

The aforementioned steps may be omitted or replaced by steps of performing similar/identical operations according to an embodiment.

Figure 85:
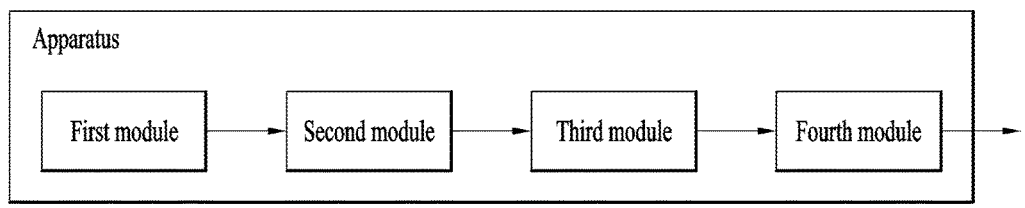
FIG. 85 is a block diagram of an apparatus for transmitting a broadcast signal according to an embodiment of the present invention.

FIG. 85 illustrates an apparatus for transmitting a broadcast signal according to an embodiment of the present invention.

The apparatus for transmitting a broadcast signal according to an embodiment of the present invention may include the aforementioned first, second, third and/or fourth modules of the transmitting side. The blocks and modules have been described above.

The apparatus for transmitting a broadcast signal and internal modules/blocks thereof according to an embodiment of the present invention may perform the methods for transmitting a broadcast signal according to the aforementioned embodiments of the present invention.

A description will be given of an apparatus for receiving a broadcast signal according to an embodiment of the present invention, which is not shown in the drawings.

The apparatus for receiving a broadcast signal according to an embodiment of the present invention may include the aforementioned first, second, third and/or fourth modules of the receiving side. The blocks and modules have been described above.

The apparatus for receiving a broadcast signal and internal modules/blocks thereof according to an embodiment of the present invention may perform the methods for receiving a broadcast signal according to the aforementioned embodiments of the present invention.

The internal blocks/modules of the aforementioned apparatuses may be processors which perform consecutive processes stored in a memory and may be hardware elements located inside/outside of the apparatuses according to an embodiment.

The aforementioned modules may be omitted or replaced by other modules performing similar/identical operations according to embodiments.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

MODE FOR INVENTION

Various embodiments have been described in the best mode for carrying out the invention.

INDUSTRIAL APPLICABILITY

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

The invention claimed is:

1. A method for transmitting a broadcast signal, the method comprising:
   generating, by a hardware processor, service components of a broadcast service, service signaling information signaling the broadcast service and a service list table; and
   generating, by a broadcast transmitter, a broadcast signal including the service components, the service signaling information and the service list table, and transmitting, by the broadcast transmitter, the broadcast signal,
   wherein the service list table includes information for bootstrapping the service signaling information for the broadcast service,
   wherein the service components are delivered through a first Real-Time Object Delivery over Unidirectional Transport (ROUTE) session and a second ROUTE session,
   wherein the service signaling information includes a User Service Bundle Description (USBD), a Media Presentation Description (MPD), first session description data and second session description data,
   wherein the first session description data includes both first Internet Protocol (IP)/User Datagram Protocol (UDP) information and second IP/UDP information, the first IP/UDP information identifies the first ROUTE session, and the second IP/UDP information identifies the second ROUTE session, and
   wherein the second session description data for the first ROUTE session includes Transport Session Identifiers (TSIs) for identifying Layered Coding Transport (LCT) channels that carry service components delivered through the first ROUTE session, and the second session description data for the second ROUTE session includes TSIs for identifying LCT channels that carry service components delivered through the second ROUTE session.

2. The method according to claim 1, wherein the USBD serves as a signaling hub describing technical information about the broadcast service.

3. The method according to claim 2, wherein the USBD further includes transmission related information about the service components of the broadcast service, and wherein the transmission related information includes broadcast information, including transmission related information about service components delivered through a broadcast network.

4. The method according to claim 3, wherein the transmission related information includes unicast information including transmission related information about service components delivered through a broadband network.

5. The method according to claim 1, wherein the MPD includes media representation related information for the service components of the broadcast service.

6. The method according to claim 5, wherein the MPD is a full MPD describing media representation related information about all service components included in the broadcast service regardless of delivery paths of the service components.

7. An apparatus for transmitting a broadcast signal, the apparatus comprising:

a hardware processor configured to generate service components of a broadcast service, service signaling information signaling the broadcast service and a service list table; and a broadcast transmitter configured to generate a broadcast signal including the service components, the service signaling information and the service list table, and transmit the broadcast signal, wherein the service list table includes information for bootstrapping the service signaling information for the broadcast service, wherein the service components are delivered through a first Real-Time Object Delivery over Unidirectional Transport (ROUTE) session and a second ROUTE session, wherein the service signaling information includes a User Service Bundle Description (USBD), a Media Presentation Description (MPD), first session description data and second session description data, wherein the first session description data includes both first IP/UDP information and second IP/UDP information, the first IP/UDP information identifies the first ROUTE session, and the second IP/UDP information identifies the second ROUTE session, and wherein the second session description data for the first ROUTE session includes Transport Session Identifiers (TSIs) for identifying Layered Coding Transport (LCT) channels that carry service components delivered through the first ROUTE session, and the second session description data for the second ROUTE session includes TSIs for identifying LCT channels that carry service components delivered through the second ROUTE session.

8. The apparatus according to claim 7, wherein the USBD serves as a signaling hub describing technical information about the broadcast service.

9. The apparatus according to claim 8, wherein the USBD further includes transmission related information about the service components of the broadcast service, and wherein the transmission related information includes broadcast information including transmission related information about service components, delivered through a broadcast network.

10. The apparatus according to claim 9, wherein the transmission related information includes unicast information including transmission related information about service components delivered through a broadband network.

11. The apparatus according to claim 7, wherein the MPD includes media representation related information for the service components of the broadcast service.

12. The apparatus according to claim 11, wherein the MPD is a full MPD describing media representation related information about all service components included in the broadcast service regardless of delivery paths of the service components.

* * * * *